United States Patent
Yoshida et al.

(10) Patent No.: US 7,273,653 B2
(45) Date of Patent: *Sep. 25, 2007

(54) RESIN FILM AND MANUFACTURING METHOD FOR THE SAME, AND RESIN LAMINATED METAL SHEET USING SAID RESIN FILM AND MANUFACTURING METHOD FOR THE SAME

(75) Inventors: Yasuhide Yoshida, Fukuyama (JP); Hiroki Iwasa, Fukuyama (JP); Hiroshi Kubo, Fukuyama (JP); Takeshi Suzuki, Fukuyama (JP); Akihiro Furuta, Yokohama (JP); Keiji Sugawara, Yokohama (JP); Masaaki Yamashita, Fukuyama (JP)

(73) Assignee: JFE Steel Corporation, Tokyo (JP)

(*) Notice: Subject to any disclaimer, the term of this patent is extended or adjusted under 35 U.S.C. 154(b) by 0 days.

This patent is subject to a terminal disclaimer.

(21) Appl. No.: 11/283,347

(22) Filed: Nov. 18, 2005

(65) Prior Publication Data

US 2006/0083908 A1 Apr. 20, 2006

Related U.S. Application Data

(63) Continuation of application No. 10/665,459, filed on Sep. 18, 2003, now Pat. No. 7,063,889, which is a continuation of application No. PCT/JP02/12222, filed on Nov. 22, 2002.

(30) Foreign Application Priority Data

Nov. 27, 2001 (JP) ............................. 2001-360494
Oct. 31, 2002 (JP) ............................. 2002-317162

(51) Int. Cl.
  B32B 15/09 (2006.01)
  B32B 27/08 (2006.01)
  B32B 27/18 (2006.01)
  B32B 27/36 (2006.01)
  B32B 37/15 (2006.01)

(52) U.S. Cl. ..................... 428/327; 428/213; 428/215; 428/216; 428/323; 428/334; 428/338; 428/339; 428/458; 428/480; 525/63; 525/69; 525/165; 525/173; 525/174; 525/176; 264/165; 264/171.1; 264/173.11; 264/173.12; 264/173.14; 264/173.16; 156/244.11; 156/308.2; 427/407.1; 427/409

(58) Field of Classification Search ................... None
See application file for complete search history.

(56) References Cited

U.S. PATENT DOCUMENTS

| 4,362,775 | A | 12/1982 | Yabe et al. |
| 4,525,529 | A | 6/1985 | Ohmura et al. |
| 4,720,425 | A | 1/1988 | Hattori et al. |
| 4,957,820 | A | 9/1990 | Heyes et al. |
| 4,980,210 | A | 12/1990 | Heyes |
| 5,093,208 | A | 3/1992 | Heyes et al. |
| 5,149,389 | A | 9/1992 | Heyes et al. |
| 5,444,119 | A | 8/1995 | Fujita et al. |
| 5,585,177 | A | 12/1996 | Okamura et al. |
| 5,714,220 | A | 2/1998 | Kage et al. |
| 5,885,689 | A | 3/1999 | Hasegawa et al. |
| 6,054,209 | A | 4/2000 | Imanishi et al. |
| 6,183,863 | B1 | 2/2001 | Kawachi et al. |
| 6,270,888 | B1 | 8/2001 | Rutter et al. |
| 6,326,435 | B1 | 12/2001 | Takayama et al. |
| 6,579,935 | B1 | 6/2003 | Tanaka et al. |
| 6,663,974 | B2 | 12/2003 | Kelch et al. |
| 6,723,441 | B1* | 4/2004 | Yamanaka et al. .......... 428/457 |
| 6,780,482 | B2* | 8/2004 | Majima et al. ............ 428/35.8 |
| 6,835,269 | B1* | 12/2004 | Miharu et al. ......... 156/244.11 |
| 7,063,889 | B2* | 6/2006 | Yoshida et al. ............. 428/327 |
| 2004/0101698 | A1* | 5/2004 | Yamanaka et al. .......... 428/461 |
| 2006/0147733 | A1* | 7/2006 | Yamanaka et al. .......... 428/458 |

FOREIGN PATENT DOCUMENTS

| JP | 59-232852 A | 12/1984 |
| JP | 1-180336 A | 7/1989 |
| JP | 5-269920 A | 10/1993 |
| JP | 6-320669 A | 11/1994 |
| JP | 7-195617 A | 8/1995 |
| JP | 7-195618 A | 8/1995 |
| JP | 7-290643 A | 11/1995 |
| JP | 7-290644 A | 11/1995 |
| JP | 2001-172481 A | 6/2001 |
| JP | 2001-342333 A | 12/2001 |
| JP | 2001-353814 A | 12/2001 |
| WO | WO99/27026 A | 6/1999 |

* cited by examiner

*Primary Examiner*—Vivian Chen
(74) *Attorney, Agent, or Firm*—Frsihauf, Holtz, Goodman & Chick, P.C.

(57) ABSTRACT

A resin film of a two-layer-construction comprising: (a) a resin layer R1 including a non-stretched resin film which contains a thermoplastic polyester resin containing 3 to 30 percent by weight in a weight fraction in the entire resin of a granular resin with a grain diameter of 0.1 to 5 μm, the granular resin being a modified polyolefin resin containing 2 to 20 percent by weight of a functional group derived from carboxylic acid in terms of carboxylic acid, and (b) a polyester resin layer R0 containing at least one of polyethylene terephthalate and isophthalic acid copolymerized polyethylene terephthalate, as a basic skeleton, wherein the resin layer R1 and the resin layer R2 are laminated to each other.

21 Claims, No Drawings

RESIN FILM AND MANUFACTURING METHOD FOR THE SAME, AND RESIN LAMINATED METAL SHEET USING SAID RESIN FILM AND MANUFACTURING METHOD FOR THE SAME

CROSS-REFERENCE TO RELATED APPLICATIONS

This application is a continuation application of application Ser. No. 10/665,459 filed Sep. 18, 2003 (U.S. Pat. No. 7,063,889), which is a continuation application of International Application PCT/JP02/12222 filed Nov. 22, 2002.

BACKGROUND OF THE INVENTION

1. Technical Field

The present invention relates to a resin film for a resin laminated metal sheet, more particularly, a resin film having high formability, impact resistance, adhesion, flavor property, and retort resistance, and a manufacturing method for the same, and a resin laminated metal sheet using the resin film and a manufacturing method for the same.

2. Background Art

Conventionally, as a metallic can that is subjected to severe forming, such as a thin-wall deep drawn can or a drawn and ironed can (DI can), a can provided with a resin layer on the internal surface thereof is generally used to prevent a decrease in taste and flavor and hence a change in property of the content due to dissolution of metal from a metal sheet. As such a can that is provided with a resin layer on the internal surface thereof and a resin-coated metal sheet capable of forming such a can, a metal sheet to which polyester resin is laminated is used as a substitute for epoxy coating layer of which danger of endocrine disrupter has recently been pointed out.

The polyester resin used in such an application is required to provide the following performance: The adhesion to a metal sheet is good, so that deformation such as elongation and compression of film caused by forming at the can manufacturing time and deterioration of film and decrease in adhesion due to friction do not occur; a polyester resin film is not crystallized or deteriorated after heat treatment such as drying, printing, and retorting, and hence-separation and shrinkage of film, cracks, pinholes, etc. do not occur; a polyester film is not cracked or separated by a impact to a can; corrosion or peeling does not occur when polyester resin comes into contact with various kinds of contents; a film is not whitened; and so on. Furthermore, it is required that flavor components of content in a can be not adsorbed or absorbed to a polyester film, or the flavor of content be not impaired by the dissolved components of polyester film and smell (hereinafter referred to as flavor property).

For example, in Unexamined Japanese Patent Publication No. 59-232852, a metal sheet coated with polyethylene terephthalate resin is proposed from a viewpoint of formability, heat resistance, corrosion resistance, flavor property, etc. Also, in Unexamined Japanese Patent Publication No. 1-180336, a metal sheet coated with polybutylene terephthalate resin is proposed. Furthermore, excellent formability that withstands drawing and ironing is required, and also excellent adhesion such that a resin film does not separate from a steel sheet and impact resistance such as to withstand shocks at the can manufacturing time, the canning time, and transportation time are required. To meet the requirements, Unexamined Japanese Patent Publication Nos. 5-269920 and 6-320669 have disclosed a manufacturing method in which excellent formability, adhesion, and impact resistance can be obtained in addition to food sanitation property and flavor property, which a polyethylene terephthalate resin film inherently has, by controlling the crystalline orientation of film by means of laminating technology or the like. Such a technology can be applied to the present requirement level for formability, adhesion, and impact resistance.

However, in the concerned field, the decrease in sheet thickness is progressing year by year, and this tendency is thought to continue in the future as well. In the above-described manufacturing method for polyethylene terephthalate resin, it is difficult to achieve both formability and impact resistance when the resin film is subjected to severer forming. The reason for this is that formability and impact resistance depend greatly on the crystalline orientation (plane orientation), and have a mutually contradictory tendency. Specifically, if a crystalline orientation component increases in a resin layer, plastic deformation is hindered by a crystalline portion, and hence formability is deteriorated. Therefore, from the viewpoint of formability, the smaller amount of oriented crystals is, the better formability is. However, since this crystalline portion acts as a portion for stopping the progress of crack, from the viewpoint of impact resistance, the larger amount of oriented crystals is, the higher impact resistance is. Thus, formability and impact resistance are designed by regulating the amount of oriented crystals so that both properties are in the allowable region. However, the region in which both properties are compatible is the present limit of required performance, so that it has been expected that a new highly formable film that can respond to an increase in the degree of forming in the future, and a resin laminated metal sheet coated with this film will be developed.

In order to satisfy such a need, studies have been conducted earnestly on a technology in which both high formability and impact resistance are achieved by mixing polyolefin resin with polyester resin. Unexamined Japanese Patent Publication Nos. 7-195617 and 7-195618 have disclosed a technology in which a film consisting of a composition of saturated polyester resin and ionomer resin is laminated to a metal sheet. Although these publications indicate that impact resistance can be kept even in an amorphous state, the impact resistance obtained merely by addition of ionomer is insufficient, and inversely, the orientation of polyester resin is actually hindered by the addition of ionomer, which poses a problem in that the mechanical strength that polyester resin inherently has decreases, and resin is broken at the forming time. Also, the adhesion to a substrate metal after forming or after heating is also inferior.

Furthermore, Japanese Patent Publication Nos. 7-290643 and 7-290644 have disclosed that impact resistance can be improved by laminating a ternary composition of polyester resin, polyester elastomer, and ionomer resin to a metal sheet. However, the mixture of this composition also has low capability for relaxing impact stress of polyester elastomer, so that the effect of improving impact resistance of polyester resin is very little. Also, as in the case where elastomer is not added, the adhesion to a substrate metal after forming or after heating is also inferior.

On the other hand, WO 99/27026 Publication has disclosed a technology in which an elastomer resin encapsulated by a vinyl polymer having a polar group is finely dispersed in polyester resin. Such fine dispersion of elastomer resin improves impact resistance, so that the level of formability and impact resistance is high. However, the control of process for manufacturing such a capsule state is difficult to carry out, and the dispersed state of elastomer resin changes greatly depending on the resin forming conditions, and is unstable. Therefore, there arises a problem in that the performance of the resultantly obtained resin film is not always constant. It is found that if such a dispersed state deviates from the optimum conditions, the performance decreases greatly. Even if a resin of such a composition is actually manufactured, a portion where the resin performance is low is produced partially, so that the obtained performance such as formability and impact resistance is insufficient as a whole. Furthermore, there arise problems of decreased adhesion to a substrate metal due to forming or impact and decreased adhesion after heating.

Furthermore, Unexamined Japanese Patent Publication No. 2001-172481 has disclosed a technology in which the decomposition of vinyl polymer is restrained by adding an appropriate amount of an oxidation inhibitor (free radical inhibitor) to a mixed resin in which a vinyl polymer having a polar group is finely dispersed in polyester resin. However, in a particular mixture of vinyl polymer and polyester resin, when a polymerization catalyst of polyester resin and an oxidation inhibitor coexist, resin is liable to be deteriorated. In particular, polyester resin is deteriorated, and performance such as impact resistance and flavor property is decreased.

Still further, Unexamined Japanese Patent Publication No. 2001-353814 has disclosed a technology in which a resin layer in which fine ionomer resin exists in polyester resin as a dispersion phase is coated, by which the impact resistance and adhesion are enhanced. However, the compositions of dispersed modified polyolefin resin and polyester resin are improper, so that the performance is insufficient.

Also, a can using a metal sheet to which such a resin film is laminated has a problem in that the film is whitened after retorting and thereby the appearance is deteriorated. In particular, a can lid and a can bottom, which come-into direct contact with retort steam, remarkably is whitened, and such a phenomenon cannot be prevented by means of the above-described prior art.

SUMMARY OF THE INVENTION

An object of the present invention is to provide a resin film having high formability, impact resistance, adhesion, flavor property, and retort resistance, and a manufacturing method for the same, and a resin laminated metal sheet using the resin film and a manufacturing method for the same.

The inventors carried out studies on the construction of resin layer that withstands severer forming and keeps performance such as impact resistance and adhesion without losing advantages of high formability and flavor property that polyester resin inherently has. Further, we pursued a resin composition by which that construction can be obtained stably regardless of the forming conditions. As a result, we found that a metal sheet coated with a resin film consisting of a mixed resin in which granular modified polyolefin resin having a specific composition is dispersed in polyester resin provides dramatically high formability, impact resistance, and flavor property, and also has adhesion after forming and after heating. Moreover, this resin construction can be obtained stably regardless of the forming conditions. Further, it was verified that in this resin composition, necessary characteristics such as corrosion resistance are also sufficient.

The optimum resin construction of mixed resin layer can be obtained when granular modified polyolefin resin containing a specific amount of a functional group derived from carboxylic acid is dispersed in polyester resin. The modified polyolefin resin having such a functional group composition is dispersed in polyester resin most stably, and moreover the mechanical properties of the modified polyolefin resin itself are optimal, so that high formability and impact resistance can be provided.

As the reason that both formability and impact-resistance can be achieved, the following mechanism is presumed. When a destructive force acts on resin by means of severe forming or impact, a craze or crack is generated in polyester resin, and grows, resulting in breakage. However, if granular modified polyolefin resin having a proper composition and grain size is dispersed in polyester resin, the progress of such a craze or crack is restrained by stress relaxation of modified polyolefin resin, so that final occurrence of breakage can be prevented. Further, there appears an effect that the plastic deformation of polyester resin is accelerated in the surroundings in which modified polyolefin resin is in contact with polyester resin, and hence stress concentration that results in breakage is relaxed, and the resin is less liable to be broken.

A resin film obtained by mixing modified polyolefin resin containing carboxylic acid with polyester resin has higher adhesion to a substrate metal than the ordinary polyester resin, but may have insufficient adhesion when being subjected to severer forming. Also, a film having such a resin composition exhibits high formability and impact resistance, and also exhibits flavor property high enough to ordinary use. However, it is true that many persons are very sensitive to a change in flavor depending on the recent applications, and impose very rigid requirements. Contrary to such requirements, polyester resin in which modified olefin is dispersed may have an insufficient flavor property because it contains an olefin compound.

Thereupon, as the result of earnest studies, it was found that a layer of modified polyolefin resin containing carboxylic acid is made a layer that is in contact with a metal sheet, by which adhesion after forming and after heating is improved dramatically. Further, this modified polyolefin resin layer has high adhesion to mixed resin layer, so that there occurs no separation between layers, and thus high adhesion can be kept as a whole. Also, it was found that by lapping a polyester resin layer containing no polyolefin resin on a modified olefin dispersed polyester resin, the flavor property can be enhanced to a level higher than the required one.

The present invention has been made based on the above-described knowledge, and the gist thereof is as described below.

(1) A resin film consisting of a mixed resin in which a granular resin mainly existing in a granular state in which the grain diameter is 0.1 to 5 μm is dispersed in thermoplastic polyester resin in the range of 3 to 30% by weight in weight fraction in entire resin, characterized in that the granular resin is modified polyolefin resin containing 2 to 20% by weight of a functional group derived from carboxylic acid in terms of carboxylic acid.

(2) The resin film described in item (1), characterized in that the amount of the modified polyolefin resin existing in a film in a granular state in which the grain diameter is 0.1 to 5 μm is in the range of 3 to 25% by volume in volume fraction in entire resin.

(3) The resin film described in item (1) or (2), characterized in that the thermoplastic polyester resin is polyester containing polyethylene terephthalate and/or isophthalic acid copolymerized polyethylene terephthalate as a main basic skeleton.

(4) The resin film described in any one of items (1) to (3), characterized in that the ratio of terephthalic acid to isophthalic acid, which are dicarboxylic acid components constituting the thermoplastic polyester resin, is 97:3 to 85:15 in molar ratio.

(5) The resin film described in any one of items (1) to (4), characterized in that in a monomer component mainly constituting the thermoplastic polyester resin, dicarboxylic acid is terephthalic acid, and diol components are ethylene glycol and 1,4-butanediol, the ratio thereof being 20:80 to 80:20 in molar ratio.

(6) The resin film described in any one of items (1) to (5), characterized in that the ratio X/Y of the amount X of polyester polymerization catalyst to the amount Y of oxidation inhibitor in the mixed resin is 0.2 or higher in weight ratio.

(7) The resin film described in any one of items (1) to (6), characterized in that the content of oxidation inhibitor in the mixed resin is 500 ppm or lower.

(8) The resin film described in any one of items (1) to (7), characterized in that the resin film contains 5 to 40% by weight of pigment.

(9) The resin film described in any one of items (1) to (7), characterized in that the resin film has a thickness of 10 to 50 μm.

(10) A resin film having a construction in which a resin layer of R1 layer consisting of the mixed resin described in any one of items (1) to (8) and a polyester resin layer of R0 layer containing polyethylene terephthalate and/or isophthalic acid copolymerized polyethylene terephthalate as a main basic skeleton are laminated, characterized in that the film is designed so that when it is laminated to a metal sheet, the R0 layer is the outermost layer.

(11) The resin film described in item (10), characterized in that the film thickness of the R1 layer is 10 to 50 μm, the film thickness of the R0 layer is 1 to 10 μm, and the thickness ratio R1/R0 of the R1 layer to the R0 layer is 2/1 to 10/1.

(12) A resin film having a construction in which a resin layer of R1 layer consisting of the mixed resin described in any one of items (1) to (8) and a resin layer of R2 layer consisting mainly of modified polyolefin resin having a functional group derived from carboxylic acid are laminated, characterized in that the film is designed so that when it is laminated to a metal sheet, the R2 layer is in contact with the metal sheet.

(13) The resin film described in item (12), characterized in that the film thickness of the R1 layer is 10 to 50 μm, the film thickness of the R2 layer is 1 to 10 μm, and the thickness ratio R1/R2 of the R1 layer to the R2 layer is 1/1 to 20/1.

(14) A resin film having a three-layer construction of R0 layer/R1 layer/R2 layer in which a polyester resin layer of R0 layer containing polyethylene terephthalate and/or isophthalic acid copolymerized polyethylene terephthalate as a main basic skeleton is laminated on one surface of a resin layer of R1 layer consisting of the mixed resin described in any one of items (1) to (8), and a resin layer of R2 layer consisting mainly of modified polyolefin resin having a functional group derived from carboxylic acid is laminated on the other surface of the R1 layer, characterized in that the film is designed so that when it is laminated to a metal sheet, the R0 layer is the outermost layer.

(15) The resin film described in item (14), characterized in that the film thickness of the R1 layer is 10 to 50 μm, the film thickness of the R0 layer is 1 to 10 μm, the film thickness of the R2 layer is 1 to 10 μm, the thickness ratio R1/R0 of the R1 layer to the R0 layer is 2/1 to 10/1, and the thickness ratio R1/R2 of the R1 layer to the R2 layer is 1/1 to 20/1.

(16) The resin film described in any one of items (12) to (15), characterized in that the modified polyolefin resin of the R2 layer contains 2 to 20% by weight of a functional group derived from carboxylic acid in terms of carboxylic acid.

(17) The resin film described in any one of items (10) to (16), characterized in that the resin film contains 5 to 40% by weight of pigment.

(18) A manufacturing method for a resin film, characterized in that in manufacturing the resin film described in any one of items (1) to (9), the mixed resin in which a granular modified polyolefin resin with a grain diameter of 0.1 to 5 μm is dispersed in advance in thermoplastic polyester resin described in any one of items (1) to (8) is inserted in an extruding machine as a raw material resin and is melted, and a film is formed by extruding the molten resin from a T die.

(19) A manufacturing method for a resin film, characterized in that in manufacturing the resin film described in item (10), (11) or (17), the mixed resin in which a granular modified polyolefin resin with a grain diameter of 0.1 to 5 μm is dispersed in advance in thermoplastic polyester resin described in any one of items (1) to (8) is inserted in an extruding machine as a raw material resin for the R1 layer and is melted; at the same time, polyester resin containing polyethylene terephthalate and/or isophthalic acid copolymerized polyethylene terephthalate as a main basic skeleton is inserted in a separate extruding machine as a raw material resin for the R0 layer and is melted; and a film of two-layer construction of R1 layer/R0 layer is formed by extruding the molten resins from one T die.

(20) A manufacturing method for a resin film, characterized in that in manufacturing the resin film described in item (12), (13), (16) or (17), the mixed resin in which a granular modified polyolefin resin with a grain diameter of 0.1 to 5 μm is dispersed in advance in thermoplastic polyester resin described in any one of items (1) to (8) is inserted in an extruding machine as a raw material resin for the R1 layer and is melted; at the same time, a resin consisting mainly of modified polyolefin resin having a functional group derived from carboxylic acid is inserted in a separate extruding machine as a raw material resin for the R2 layer and is melted; and a film of two-layer construction of R1 layer/R2 layer is formed by extruding the molten resins from one T die.

(21) A manufacturing method for a resin film, characterized in that in manufacturing the resin film described in items (14) to (17), the mixed resin in which a granular modified polyolefin resin with a grain diameter of 0.1 to 5 μm is dispersed in advance in thermoplastic polyester resin described in any one of items (1) to (8) is inserted in an extruding machine as a raw material resin for the R1 layer and is melted; at the same time, polyester resin containing polyethylene terephthalate and/or isophthalic acid copolymerized polyethylene terephthalate as a main basic skeleton is inserted in a separate extruding machine as a raw material resin for the R0 layer and is melted, and also a resin consisting mainly of modified polyolefin resin having a functional group derived from carboxylic acid is inserted in another separate extruding machine as a raw material resin for the R2 layer and is melted; and a film of three-layer construction of R0 layer/R1 layer/R2 layer is formed by extruding the molten resins from one T die.

(22) A resin laminated metal sheet characterized in that at least one surface of a metal sheet is coated with the resin film described in any one of items (1) to (17) or the resin film manufactured by the method described in any one of items (18) to (21).

(23) The resin laminated metal sheet described in item (22), characterized in that the metal sheet is a steel sheet subjected to electrolytic chromate treatment, having a metallic chromium layer of 50 to 200 mg/m$^2$ and a chromium oxide layer of 3 to 30 mg/m$^2$ in terms of metallic chromium on the surface thereof.

(24) The resin laminated metal sheet described in item (22) or (23), characterized in that a plane orientation coefficient in the direction parallel to the film surface of the resin film is lower than 0.010.

(25) The resin laminated metal sheet described in any one of items (22) to (24), characterized in that the surface of metal sheet is coated with the resin film by an extrusion laminating method in which the mixed resin described in any one of items (1) to (8) is extruded from a T die directly on the surface of metal sheet.

(26) The resin laminated metal sheet described in any one of items (22) to (24), characterized in that the surface of metal sheet is coated with the resin film by a two-layer extrusion laminating method in which two types of resins consisting of a resin layer (R1 layer) consisting of the mixed resin described in any one of items (1) to (8) and a resin layer (R0 layer) consisting of polyester resin containing polyethylene terephthalate and/or isophthalic acid copolymerized polyethylene-terephthalate as a main basic skeleton are extruded simultaneously from one T die directly on the surface of metal sheet.

(27) The resin laminated metal sheet described in any one of items (22) to (24), characterized in that the surface of metal sheet is coated with the resin film by a two-layer extrusion laminating method in which two types of resins consisting of a resin layer (R1 layer) consisting of the mixed resin described in any one of items (1) to (8) and a resin layer of R2 layer consisting mainly of modified polyolefin resin having a functional group derived from carboxylic acid are extruded simultaneously from one T die directly on the surface of metal sheet.

(28) The resin laminated metal sheet described in any one of items (22) to (24), characterized in that the surface of metal sheet is coated with the resin film by a three-layer extrusion laminating method in which three types of resins consisting of a resin layer (R0 layer) consisting of polyester resin containing polyethylene terephthalate and/or isophthalic acid copolymerized polyethylene terephthalate as a main basic skeleton, a resin layer (R1 layer) consisting of the mixed resin described in any one of items (1) to (8), and a resin layer of R2 layer consisting mainly of modified polyolefin resin having a functional group derived from carboxylic acid are extruded simultaneously from one T die directly on the surface of metal sheet.

(29) A manufacturing method for a resin laminated metal sheet, characterized in that in manufacturing the resin laminated metal sheet described in any one of items (22) to (28), a resin film is laminated to a metal sheet heated to a temperature in the range of the melting point of polyester resin in the mixed resin described in any one of items (1) to (8) minus 70° C. to the melting point thereof plus 30° C.

(30) A manufacturing method for a resin laminated metal sheet, characterized in that in manufacturing the resin laminated metal sheet described in item (25), after the mixed resin is heated to a temperature in the range of the melting point of polyester resin in the mixed resin plus 10° C. to the melting point thereof plus 50° C. and is melted, the molten resin is extruded directly on the surface of metal sheet and is laminated thereon.

(31) The manufacturing method for a resin laminated metal sheet described in item (30), characterized in that after the mixed resin in which granular modified polyolefin resin with a grain diameter of 0.1 to 5 μm is dispersed in advance in thermoplastic polyester resin described in any one of items (1) to (8) is inserted in an extruding machine as a raw material resin and is melted, the molten resin is extruded directly on the surface of metal sheet and is laminated thereon.

(32) A manufacturing method for a resin laminated metal sheet, characterized in that in manufacturing the resin laminated metal sheet described in item (26), after the R1 and R0 layers are heated to a temperature in the range of the melting point of polyester resin in the R1 layer plus lot to the melting point thereof plus 50° C. and are melted, the molten resins are extruded in two layers on the surface of metal sheet and are laminated thereon.

(33) The manufacturing method for a resin laminated metal sheet described in item (32), characterized in that the mixed resin in which granular modified polyolefin resin with a grain diameter of 0.1 to 5 μm is dispersed in advance in thermoplastic polyester resin described in any one of items (1) to (8) is inserted in an extruding machine as a raw material resin for the R1 layer; at the same time, a resin consisting of polyester resin containing polyethylene terephthalate and/or isophthalic acid copolymerized polyethylene terephthalate as a main basic skeleton is inserted in a separate extruding machine as a raw material resin for the R0 layer; and then, after these resins are melted, the molten resins are extruded on the surface of metal sheet and are laminated thereon.

(34) A manufacturing method for a resin laminated metal sheet, characterized in that in manufacturing the resin laminated metal sheet described in item (27), after the R1 and R2 layers are heated to a temperature in the range of the melting point of polyester resin in the R1 layer plus 10° C. to the melting point thereof plus 50° C. and are melted, the molten resins are extruded in two layers on the surface of metal sheet and are laminated thereon.

(35) The manufacturing method for a resin laminated metal sheet described in item (34), characterized in that the mixed resin in which granular modified polyolefin resin with a grain diameter of 0.1 to 5 μm is dispersed in advance in thermoplastic polyester resin described in any one of items (1) to (8) is inserted in an extruding machine as a raw material resin for the R1 layer; at the same time, a resin consisting mainly of modified polyolefin resin having a functional group derived from carboxylic acid is inserted in a separate extruding machine as a raw material resin for the R2 layer; and then, after these resins are melted, the molten resins are extruded on the surface of metal sheet and are laminated thereon.

(36) A manufacturing method for a resin laminated metal sheet, characterized in that in manufacturing the resin laminated metal sheet described in item (28), after the R1, R2 and R0 layers are heated to a temperature in the range of the melting point of polyester resin in the R1 layer plus 10° C. to the melting point thereof plus 50° C. and are melted, the molten resins are extrusion laminated in three layers on the surface of metal sheet.

(37) The manufacturing method for a resin laminated metal sheet described in item (36), characterized in that the mixed resin in which granular modified polyolefin resin with a grain diameter of 0.1 to 5 μm is dispersed in advance in thermoplastic polyester resin described in any one of items (1) to (8) is inserted in an extruding machine as a raw material resin for the R1 layer; at the same time, polyester resin containing polyethylene terephthalate and/or isophthalic acid copolymerized polyethylene terephthalate as a main basic skeleton is inserted in a separate extruding machine as a raw material resin for the R0 layer, and also a resin consisting mainly of modified polyolefin resin having a functional group derived from carboxylic acid is inserted in another separate extruding machine as a raw material resin for the R2 layer; and then, after these resins are melted, the molten resins are extruded on the surface of metal sheet and are laminated thereon.

DETAILED DESCRIPTION OF THE INVENTION

A resin film in accordance with the present invention and a manufacturing method for the same, and a resin laminated metal sheet using the resin film and a manufacturing method for the same are described below.

The resin film in accordance with the present invention consists of a mixed resin in which a granular resin mainly existing in a state of grain with a diameter of 0.1 to 5 µm is dispersed in thermoplastic polyester resin in the range of 3 to 30% by weight of entire resin, the granular resin being modified polyolefin resin having a functional group derived from carboxylic acid.

Specifically, the resin film in accordance with the present invention is formed mainly of thermoplastic polyester resin. The used thermoplastic polyester resin is such that as the acid component, various kinds of aromatic dicarboxylic acids and aliphatic-dicarboxylic acids are copolymerized arbitrarily, and as the glycol component, various kinds of aliphatic diols and aromatic diols are copolymerized arbitrarily.

As the acid component, concretely, terephthalic acid, phthalic acid, isophthalic acid, 1,4-naphthalene dicarboxylic acid, 2,3-naphthalene dicarboxylic acid, 2,6-naphthalene dicarboxylic acid, 2,7-naphthalene dicarboxylic acid, 4,4'-biphenyl dicarboxylic acid, diphenic acid, diphenyl ether carboxylic acid, 5-sulfoisophthalic acid, diphenoxy ethane dicarboxylic acid, adipic acid, oxalic acid, malonic acid, succinic acid, malic acid, citric acid, glutaric acid, dimer acid, pimelic acid, suberic acid, azelaic acid, sebacic acid, dodecadion acid, trans-1,4-cyclohexane dicarboxylic acid, or the like is used. In particular, the acid component that is formed mainly of tereophthalic acid and/or isophthalic acid is suitable in terms of the balance of mechanical properties, flavor property, etc.

On the other hand, as the glycol component, concretely, ethylene glycol, propylene glycol, 1,4-butanediol, 1,3-butanediol, 1,2-butanediol, neopentyl glycol, pentamethylene glycol, hexamethylene glycol, diethylene glycol, triethylene glycol, tetraethylene glycol, polyethylene glycol, trans-1,4-cyclohexanedimethanol, bisphenols, p-xylene glycol, cis-1,4-cyclohexanedimethanol, hydroquinone, 2,2-bis(4-β-hydroxyethoxyphenyl) propane, hydrogenated bisphenol A, or the like is used. In particular, the glycol component that is formed mainly of ethylene glycol and/or 1,4-butanediol is suitable in terms of the balance of mechanical properties, flavor property, etc.

That is to say, thermoplastic polyester resin formed mainly of tereophthalic acid and ethylene glycol, and/or one formed mainly of tereophthalic acid and isophthalic acid and ethylene glycol, and/or one formed mainly of tereophthalic acid and ethylene glycol and 1,4-butanediol are especially suitable in terms of the balance of mechanical properties and flavor property in a mixed-resin state.

As thermoplastic polyester resin, polyester resin containing polyethylene terephthalate and/or isophthalic acid copolymerized polyethylene terephthalate as a main basic skeleton is suitable. The polyester resin containing polyethylene terephthalate and/or isophthalic acid copolymerized polyethylene terephthalate as a main basic skeleton means polyester resin in which the sum of a portion in which only ethylene glycol and tereophthalic acid in the polyester resin skeleton are a unit and/or a portion in which ethylene glycol and tereophthalic acid and isophthalic acid are a unit accounts for 90% or more by weight. In other portions, as the acid component, various kinds of aromatic dicarboxylic acids and aliphatic dicarboxylic acids may be copolymerized arbitrarily.

Furthermore, in the scope in which the object of the present invention is not impaired, a unit derived from a polyfunctional compound such as trimesic acid, pyromellitic acid, trimethylolethane, trimethylolpropane, trimethylolmethane, and pentaerythritol may be contained in a small amount, for example, 2% or less by weight.

For the polyester resin in accordance with the present invention, the content of diethylene glycol is preferably 1.5% or lower by weight, further preferably 0.9% or lower by weight. If the content of diethylene glycol is high, deterioration of polymer progresses due to heating treatment such as drying and printing at the forming time, and hence cracks or pinholes are produced, so that the impact resistance and flavor property are sometimes deteriorated.

Also, the content of acetaldehyde in resin is preferably 10 ppm or lower, further preferably 7 ppm or lower, from the viewpoint of flavor property. If the content of acetaldehyde exceeds this range, especially 10 ppm, the flavor property is sometimes deteriorated. The method for limiting the content of acetaldehyde to 10 ppm or lower is not subject to any special restriction. For example, a method can be cited in which polyester resin is formed into a film, the polyester resin being obtained by a method in which resin is heat-treated at a temperature below the melting point of polyester under a reduced pressure or in an inert gas atmosphere to remove acetaldehyde produced by thermal decomposition at the time when polyester resin is manufactured by condensation polymerization etc. Preferably, a method should be used in which polyester resin that is obtained by solid-phase polymerizing resin at a temperature higher than 150° C. and lower than the melting point under a reduced pressure or in an inert gas atmosphere.

Also, the polyester resin in accordance with the present invention preferably has less oligomer consisting of a cyclic trimer etc. in resin from the viewpoint of flavor property. In particular, the content of cyclic trimer is preferably 0.9% or less by weight, further preferably 0.7% or less by weight. If the content of oligomer in resin exceeds this range, especially 0.9% by weight, the flavor property is sometimes deteriorated. The method for limiting the content of oligomer to 0.9% or less by weight is not subject to any special restriction, and this content of oligomer can be achieved by using the same method as the above-described method for reducing the content of acetaldehyde.

The intrinsic viscosity of polyester resin used in the present invention is preferably 0.3 to 2.0 dl/g, further preferably 0.3 to 1.5 dl/g, still further preferably 0.5 to 1.0 dl/g. If the intrinsic viscosity exceeds 2.0 dl/g, the mixing with modified polyolefin resin is remarkably difficult to do because of very high viscosity. As the result of nonuniform dispersion of modified polyolefin resin, the mechanical strength and impact resistance of polyester resin may be decreased. On the other hand, if the intrinsic viscosity is lower than 0.3 dl/g, the formability is poor because of low viscosity, so that it may become difficult to manufacture a uniform film. The intrinsic viscosity is measured by the method specified in JIS K7367-5. It is measured in o-chlorophenol at 25° C. in a concentration of 0.005 g/ml, and is determined by the formula of intrinsic viscosity=$(T-T_0)/(T_0 \times c)$. In this formula, c expresses resin concentration-per 100 ml of solution in gram, and T and $T_0$ express drop time in a capillary viscometer of solvent and resin solution, respectively.

Further, the glass-transition temperature (Tg) of the polyester resin used in the present invention is preferably 50 to 120° C., further preferably 60 to 100° C. If the glass-transition temperature is lower than 50° C., a flaw etc. are liable to be produced by a temperature rise at the forming time because of deteriorated heat resistance of polyester resin. On the other hand, if the glass-transition temperature exceeds 120° C., inversely the formability is sometimes deteriorated. Also, the low-temperature crystallization temperature (Tc) is usually 130 to 210° C., preferably 140 to 200° C. The melting point (Tm) is usually 210 to 265° C., preferably 220 to 260° C. If the low-temperature crystallization temperature is lower than 130° C., crystallization is liable to occur, so that crystallization occurs at the time of retorting (high-temperature high-humidity treatment at about 120° C. In this description, referred also to as "retorting"), by which the film is easily cracked or separated. On the other hand, if the low-temperature crystallization temperature exceeds 210° C., the formability and mechanical strength such as impact resistance of polyester may be deteriorated. If the melting point is lower than 210° C., resin is deteriorated by heat at the forming time, so that cracks or pinholes are liable to be produced. On the other hand, if the melting point exceeds 265° C., crystallization progresses due to heating treatment such as drying and printing at the forming time, and hence cracks or pinholes are also liable to be produced. The above-described glass-transition temperature, low-temperature crystallization temperature, and crystal melting point are obtained by measuring endothermic peak temperature at the time of temperature rise using a differential scanning calorimeter (DSC). The measurement is made under conditions of a sample amount of 10 mg and a temperature rise rate of 10° C./min.

In the present invention, in a dicarboxylic acid component constituting polyester resin, the ratio of total amount of terephthalic acid to the total amount of isophthalic acid is specified so as to be 97:3 to 85:15 in molar ratio. In the mixed resin in the present invention, modified polyolefin in resin hinders crystallization of polyester resin, so that the decrease in adhesion and corrosion resistance caused by forming, heating, etc. is less liable to occur. Therefore, the optimum ratio spreads toward the terephthalic acid rich side as compared with the case where modified polyolefin resin is not contained. Thus, even if homo-ethylene terephthalate resin that does not contain isophthalic acid at all is used as polyester resin, when the polyester resin contains modified polyolefin resin of the present invention, it can be used as an ordinary can material. Further, if 3 mol % of isophthalic acid is copolymerized, the adhesion after forming and heating increases dramatically. If the amount of isophthalic acid increases as compared with the ratio of total amount of terephthalic acid to the total amount of isophthalic acid of 85:15, the melting point is lowered and hence the heat resistance at the forming time may be deteriorated.

Also, in applications in which retorting is especially performed, in a monomer component mainly constituting thermoplastic polyester resin, dicarboxylic acid is terephthalic acid, and the diol component is ethylene glycol and 1,4-butanediol, and the ratio thereof (in the diol component, the ratio of the amount of ethylene glycol to the amount of 1,4-butanediol) specified so as to be 20:80 to 80:20 in molar ratio is most suitable. Further, the range of 60:40 to 30:70 is most suitable. In the above-described polyester resin containing polyolefin resin, since modified polyolefin resin in resin hinders crystallization of polyester resin, there arises a problem in that the strength of polyester resin is insufficient especially in retorting and thus cohesive failure is liable to occur. To solve this problem, polybutylene terephthalate, which has especially high crystallization rate, is mixed with polyethylene terephthalate in a predetermined ratio. Thereby, the crystallization of polyester resin is accelerated, and cohesive failure is less liable to occur even in retorting. Such an effect is especially remarkable in preventing a phenomenon that in lid material to which a film is laminated, the film is subjected to cohesive failure by water vapor intruding into the film at the retorting time and the film is whitened. By using polyester resin of the above-described composition, such a problem can be solved. If the amount of polyethylene terephthalate is high as compared with the ratio of polyethylene terephthalate to polybutylene terephthalate of 80:20 in molar ratio, the crystallization rate is not accelerated sufficiently, so that the above-described effect cannot be anticipated. On the other hand, if the amount of polybutylene terephthalate is high as compared with the ratio of 20:80, the melting point lowers, and hence the heat resistance is deteriorated.

The modified polyolefin resin having a functional group derived from carboxylic acid mixed in polyester resin must exist mainly in a granular state in which the grain diameter is 0.1 to 5 µm in terms of equivalent sphere to improve the impact resistance and also prevent adverse influence on the properties such as formability and heat resistance. In this case, the phrase "exist mainly" means that at least 30% or more by weight of the whole modified polyolefin resin exists in a state in which the grain diameter is 0.1 to 5 µm in terms of equivalent sphere. Also, the weight ratio of the modified polyolefin resin to the entire resin must be in the range of 3 to 30% by weight.

If modified polyolefin resin is dispersed in polyester resin, wide dispersion occurs from very fine grains with a diameter not larger than 0.1 µm to large grains with a diameter exceeding 5 µm. The grains with a diameter smaller than 0.1 µm exert no influence on the physical properties of mixed resin. On the other hand, the grains with a diameter exceeding 5 µm also do not improve the physical properties such as formability of mixed resin but rather decreases them. Therefore, at least 30% or more by weight of the whole modified polyolefin resin must have a diameter in the range of 0.1 to 5 µm in terms of equivalent sphere. From the viewpoint of restraining the decrease in physical properties, the ratio of grains with a diameter exceeding 5 µm should preferably be 1% or less by weight. Also, if the ratio of mixed modified polyolefin resin to the entire resin is lower than 3% by weight, the improvement in impact resistance is insufficient. If the ratio exceeds 30% by weight, performance such as formability and heat resistance is decreased.

The glass-transition temperature of modified polyolefin resin is preferably 0° C. or lower by the same measuring method as that for polyester resin. The temperature is further preferably −30° C. If the glass-transition temperature exceeds 0° C., the impact resistance is slightly low, and is low especially at low temperatures. Also, it is preferable that the Young's modulus be 250 MPa or lower and the breaking elongation be 200% or more at room temperature, and further preferable that the Young's modulus be 100 MPa or lower and the breaking elongation be 500% or more. The molecular weight is not subject to any special restriction, but it is preferably not lower than $2\times10^3$ and not higher than $1\times10^6$ in number-average molecular weight. If the molecular weight is lower than $2\times10^3$ or exceeds $1\times10^6$, the mechanical properties may be deteriorated and the impact resistance may be decreased, and additionally, forming may become difficult to do.

The functional group derived from carboxylic acid is contained in an amount of 2 to 20%, preferably 3 to 12%, by weight in carboxylic acid conversion. In this composition range, the affinity with polyester resin and the dispersibility are enhanced to the maximum. As the affinity of modified polyolefin resin with polyester resin increases, the effect of relaxing interlayer, fracture between different resins is enhanced at the time of shock. As a result, the impact resistance is increased, and as the result that the cohesion of modified polyester grains is restrained at the forming time, variations in performance due to forming conditions are decreased. Such an effect can be obtained when the ratio of functional group is 2% or higher by weight in carboxylic acid conversion. On the other hand, if the ratio exceeds 20% by weight, the affinity with polyester resin decreases inversely, and resultantly the impact resistance is deteriorated.

In the present invention, it is specified that the amount of modified polyolefin resin existing in mixed resin in a granular state in which the grain diameter is 0.1 to 5 μm is in the range of 3 to 25 vol % in volume fraction. As described above, the grains with a diameter smaller than 0.1 μm exert no influence on the physical properties of mixed resin. On the other hand, the grains with a diameter exceeding 5 μm also do not improve the physical properties such as formability of mixed resin but rather decreases them. Therefore, only granular modified polyester resin with a diameter of 0.1 to 5 μm in terms of equivalent sphere contributes to the improvement in impact resistance. Since the physical properties of film having grains of this size can be rearranged by the absolute value of volume in the whole film, the amount of modified polyolefin resin is specified in the range of 3 to 25 vol %. If the volume ratio of modified polyolefin resin is lower than 3 vol %, the improvement in impact resistance is insufficient, and if it exceeds 25 vol %, the performance such as formability is decreased.

Furthermore, the number of modified polyolefin resin grains existing in the mixed resin layer in a state in which the grain diameter is 0.1 to 5 μm in a cube with one side of 10 μm (volume: 1000 μm$^3$) in mixed resin is preferably 5 to $10^5$, further preferably 50 to $10^4$. If the number is smaller than 5, the improvement in impact resistance is insufficient, and if the number exceeds $10^5$, the performance such as formability is decreased.

The thickness of resin film consisting of the above-described mixed resin is preferably in the range of 10 to 50 μm. The upper limit value is determined from the economical viewpoint, and the lower limit value is determined from the viewpoints of impact resistance and formability. Specifically, if the thickness is not lower than 10 μm, the impact resistance and formability become higher, but if the thickness exceeds 50 μm, the cost of resin film increases, and the effect of improving impact resistance and formability is saturated.

The following is a description of a manufacturing method for modified polyolefin resin. As a functional group derived from carboxylic acid, carboxylic acid group, carboxylic acid ester group, metal salt of carboxylic acid ion, and the like can be cited. Carboxylic acid modified polyolefin can be obtained by copolymerization, graft polymerization, or block polymerization of monomer containing these functional groups in polyolefin resin.

As a monomer containing a functional group derived from carboxylic acid, concretely, acrylic acid, methacrylic acid, vinyl acetate, vinyl propionate, maleic acid, maleic anhydride, itaconic acid, unsaturated carboxylic acid with the number of carbons of 3 to 8 such as monomethylester maleate, and metal salt in which the whole or some of these acids is neutralized by metal cation of 1 or 2 valences such as sodium, potassium, lithium, zinc, magnesium, and calcium can be cited. The degree of neutralization is preferably 20 to 80%, further preferably 30 to 70%. A composition formed from modified polyolefin resin with such a degree of neutralization has a high melt extrusion property.

Also, as carboxylate, methyl acrylate, methyl methacrylate, ethyl acrylate, ethyl methacrylate, n-propyl acrylate, n-propyl methacrylate, isobutyl acrylate, isobutyl methacrylate, n-butyl acrylate, n-butyl methacrylate, 2-hydroxyethyl carboxylate, 2-hydroxyethyl methacrylate, monomethyl-ester maleate, glycidyl acrylate, glycidyl methacrylate, vinyl acetate, acrylamine, acrylamide, and the like can be cited.

Modified polyolefin resin containing a functional group derived from carboxylic acid can be obtained by copolymerization, block polymerization, or graft polymerization of monomer containing a functional group derived from carboxylic acid with olefin monomer containing no functional group derived from carboxylic acid, such as ethylene, propylene, 1-butane, 1-pentene, isobutene, isobutylene, butadiene, styrene, and acrylonitrile. Among these, in particular, the modified polyolefin resin obtained by graft polymerization or copolymerization of carboxylic acid group in polyolefin resin exhibits high performance. As such a modified polyolefin resin, Modiper A (manufactured by NOF Corp.), Nucrel (manufactured by Mitsui-DuPont Polychemical Co., Ltd.), Bondine (manufactured by Sumitomo Chemical Co., Ltd.), Admer (manufactured by Mitsui Chemicals, Inc.), and Tuftec (manufactured by Asahi Chemical Industry Co., Ltd.), and the like can be cited.

Also, the modified polyolefin resin in which some of carboxylic acid is neutralized by metal salt can be mused. For such a resin, though the formability is slightly low, the impact resistance is higher. As a commercially available resin, Himilan (manufactured by Mitsui-DuPont Polychemical Co., Ltd.) and the like can be cited. Further, if zinc oxide or calcium hydroxide is added when carboxylic acid modified polyolefin resin is melted and dispersed in polyester resin, carboxyl group in modified polyolefin resin is neutralized by metal ions thereof, and resultantly, a structure in which the carboxylic acid modified polyolefin resin in which some of carboxylic acid is neutralized by metal salt is dispersed in polyester resin.

By dispersing modified polyolefin resin in polyester resin, a mixed resin, which is used as a raw material, is obtained. As a method for dispersion, there is available, for example, a method in which two resins are melted and mixed, and after the mixture is kept at a temperature at which one phase is formed, it is cooled to a temperature at which it is separated into two phases, by which a modified polyolefin resin phase is dispersed in a polyester resin phase by utilizing phase separation; a method in which after two resins are melted in a common solvent, the solvent is evaporated; a method in which the modified polyolefin resin in which the primary grain diameter has been made fine in advance to 1 µm or finer is melted and dispersed at a temperature at which the resin does not cohere; a method in which polyester resin is manufactured by copolymerizing monomer in a solution containing modified polyolefin resin in which the primary grain diameter has been made fine in advance to 1 µm or finer and polyester resin forming monomer, and a state in which modified polyolefin resin is dispersed in polyester is established; or a method in which two resins are melted and mixed, and modified polyolefin resin is made fine by a mechanical shearing force.

As an apparatus for mixing and melting, a mixing apparatus such as a tumbler blender, a Henschel mixer, and V-type blender, or a melting/mixing apparatus such as an extruder of one axis or two-axes, a kneader, and a Banbury type mixer can be used. When these apparatuses are used, the temperature control such as temperature control of mixing apparatus and temperature change is carried out more strictly than in the ordinary mixing method, the mixing time is prolonged, for example, about three to ten times as compared with the ordinary mixing time, the mechanical shearing speed at the mixing time is increased, for example, about two to five times as compared with the ordinary speed, these methods are combined, or, after the resins are mixed mechanically by using, for example, a tumbler blender, they are melted and mixed by an extruder, by which a mixed resin with high dispersibility, in which granular modified polyolefin resin with a grain diameter of 0.1 to 5 µm has been dispersed in advance in thermoplastic polyester resin can be obtained. By film-forming a mixed resin with high dispersibility, which is obtained by melting and mixing using an extruder, a resin film in which the grain diameter of modified polyolefin resin is more uniform can be obtained. As the result, the performance such as impact resistance is enhanced. By forming a film by inserting such a mixed resin with high dispersibility and uniform grain diameter in an extruder and melting it, the grain diameter distribution of granular resin is narrowed remarkably as compared with the case where modified polyolefin resin is dispersed while a film is formed, and resultantly a film that achieves high grade in various performances can be obtained.

On the other hand, unless the effects of the present invention are hindered, an additive, such as a light stabilizer, impact resistance improving agent, compatibilizing agent, lubricant, plasticizer, antistatic agent, reaction catalyst, color preventing agent, free radical inhibitor, plasticizer, oxidation inhibitor, terminal closing agent, heat stabilizer, mold releasing agent, flame retarder, antibacterial agent, and fungistat, may be added to the mixed resin. The content of these additives is preferably not lower than 0.005 weight part and not higher than 15 weight part, further preferably not lower than 0.01 weight part and not higher than 2 weight part, especially preferable not lower than 0.05 weight part and not higher than 0.5 weight part, with respect to 100 weight part of mixed resin in the present invention. If the content is lower than 0.005 weight part, the effect is insufficient. On the other hand, if the content exceeds 15 weight part, the additive is excessive, so that the mechanical properties of mixed resin layer are decreased.

As inorganic particles having the effect of improving lubricity, formability, and impact resistance, silica manufactured by the dry method or wet method, porous silica, colloidal silica, titanium oxide, zirconium oxide, aluminum oxide, calcium carbonate, talc, calcium sulfate, barium sulfate, spinel, iron oxide, calcium phosphate, and the like can be cited. Also, as organic particles or polymeric organic particles, vinyl resin particles such as polystyrene particles, crosslinking polystyrene particles, styrene-acrylic crosslinking particles, acrylic crosslinking particles, styrene-methacrylate resin crosslinking particles, and methacrylate resin crosslinking particles, and polymeric organic particles consisting of silicone, benzoguanamin-formaldehyde, polytetrafluoroethylene, polyphenolester, phenolic resin, and the like can be cited. The particle diameter and content of these particles are not subject to any special restriction. However, in order to achieve the performance to the utmost, the particle diameter is preferably in the range of 0.01 to 5 µm, further preferably in the range of 0.1 to 2.5 µm. Also, the particle diameter distribution is preferably sharp, and the standard deviation thereof is preferably 0.5 or less. Further, the shape of particle is preferably truly spherical, and the ratio of larger diameter to shorter diameter is preferably 1.0 to 1.2.

As a reaction catalyst, for example, an alkali metal compound, alkali earth metal compound, zinc compound, lead compound, manganese compound, cobalt compound, and aluminum compound can be cited, and as a color preventing agent, for example, a phosphorus compound can be cited.

As a free radical inhibitor, one or two kinds selected from a phenol base free radical inhibitor, phosphorus base free radial inhibitor, sulfide base free radical inhibitor, and nitrogen base free radical inhibitor can be cited.

As a plasticizer, a plasticizer consisting of polyester obtained by terminal esterifying a material obtained by condensation polymerization of aliphatic polybasic acid with the number of carbons of 2 to 20 or aromatic polybasic acid with the number of carbons of 8 to 20 with respect to ester derivative or polybasic acid component with the molar ratio of the ester derivative of 0 to 2.0 with aliphatic alcohol with the number of carbons of 2 to 20 by monobasic acid with the number of carbons of 2 to 20 or its ester derivative and/or monohydroxy alcohol with the number of carbons of 1 to 18 can be cited.

As an antistatic agent, a method of kneading an antistatic agent disclosed in Unexamined-Japanese Patent Publication No. 5-222357 in resin composition, a method of applying an antistatic agent disclosed in Unexamined Japanese Patent-Publication No. 5-1164 on film surface, and the like method can be used as necessary in order to prevent electrostatic failure such as winding of film on a roll in the film forming process or contamination adhering to film surface.

As an antibacterial agent, a conventionally known antibacterial agent disclosed in Unexamined Japanese Patent Publication Nos. 11-48431 and 11-138702 can be used as necessary. A polymerization catalyst of polyester resin is added to the mixed resin. As a polymerization catalyst, an element of at least one kind selected from germanium, antimony, and titanium is contained in an amount preferably not smaller than 1 ppm and not larger than 500 ppm, further preferably not smaller than 3 ppm, still further preferably not smaller than 10 ppm. If the amount of element of at least one kind selected from germanium, antimony, and titanium is smaller than 1 ppm, the effect of improving flavor property is sometimes insufficient. If the amount exceeds 500 ppm, foreign matters are produced in polyester and serve as a crystalline nucleus, so that crystallization is liable to occur. In some cases, therefore, the impact resistance is deteriorated or heat resistance is decreased. Among these elements, germanium is especially favorable in terms of flavor property.

A compound used for adding an element of at least one kind selected from germanium, antimony, and titanium to the polyester resin of the present invention are as follows: As a germanium compound, for example, germanium oxide such as germanium dioxide and crystallization water containing germanium hydroxide, hydroxide, or a germanium alkoxide compound such as germanium tetramethoxide, germanium tetraethoxide, germanium tetrabutoxide, and germanium ethyleneglycoxide, a germanium phenoxide compound such as germanium phenolate and germanium β-naphtholate, a phosphorus containing germanium compound such as germanium phosphate and germanium phosphite, and germanium acetate can be cited.

As an antimony compound, diantimony trioxide, antimony trifluoride, antimony acetate, antimony borate, antimony formate, antimonious acid, and the like can be cited.

As a titanium compound, oxide such as titanium dioxide, hydroxide such as titanium hydroxide, an alcoxide compound such as tetramethoxy titanate, tetraethoxy titanate, tetrapropoxy titanate, tetraisopropoxy titanate, and tetrabutoxy titanate, a glycoside compound such as tetrahydroxyethyl titanate, a phenoxide compound, and a compound such as acetate etc. can be cited.

As a method for adding the above-described element to polyester rein, arbitrary one of conventionally known methods can be used, and the method is not subject to any special restriction. It is preferable that the element be added as a polymerization catalyst usually at an arbitrary stage before the manufacture of polyester is finished. As such a method, in the case of germanium as an example, a method in which germanium compound powder is added as it is, a method in which a germanium compound is melted in a glycol compound, which is a starting material for polyester, and is added as described in Japanese Patent Publication No. 54-22234, and the like method can be cited.

When modified polyolefin resin containing carboxylic acid specified in the present invention is mixed with polyester resin, usually, if the polymerization catalyst mixed in polyester resin and the oxidation inhibitor generally used for stabilization of vinyl polymer coexist, the resin is deteriorated, and hence the performance is decreased. The mechanism for deteriorating the resin and decreasing the performance is not necessarily clear, but it is presumed that the oxidation inhibitor acts on the polymerization catalyst and the effect of polymerization catalyst is decreased, and in particular, a compound that deteriorates polyester resin is produced. In the present invention, therefore, the ratio of the amount X of polymerization catalyst added to the mixed resin to the amount Y of oxidation inhibitor, i.e., X/Y (weight ratio) must be 0.2 or higher. Further, the amount of oxidation inhibitor is preferably 500 ppm or smaller. As such an oxidation inhibitor, one or two kinds selected from phenol base oxidation inhibitor, phosphorus base oxidation inhibitor, sulfide base oxidation inhibitor, and nitrogen base oxidation inhibitor can be cited.

Regarding the mechanical properties of resin film consisting of a mixed resin that withstand severe forming, the breakage elongation is preferably 20% or more, further preferably 50% or more, and the breakage strength is preferably 20 N/mm$^2$ or higher. Herein, the breakage elongation and breakage strength of resin film is determined by using an ordinary tensile testing machine. As a tensile testing method, a resin coated layer measuring 5 mm×60 mm is set at a distance between chucks of 30 mm, and a tensile test is conducted at a tensile speed of 20 mm/min at a constant temperature of 25° C. When tensile properties at low temperature is determined, the same tensile test can be conducted at a constant temperature of 0 to −5° C. A resin sample for testing may be taken from either of film, resin laminated metal sheet, and formed body.

In the present invention, it is specified that 5 to 40 wt % of pigment is contained in resin film. In the polyester resin in which modified polyolefin resin is dispersed, the dispersibility of pigment is improved, and the objective color tone can be obtained by the addition of a small amount of pigment. If the content of pigment is lower than 5 wt %, a desired color tone cannot be obtained, and if it exceeds 40 wt %, the formability is decreased. The kind of pigment is not subject to any special restriction. However, unless the effects of the present invention are hindered, calcium carbonate, barium sulfate, barium carbonate, aerosil, titanium dioxide, zinc white, gloss white, alumina white, magnesium carbonate, carbon black, magnetite, cobalt blue, iron oxide red, or the like is used appropriately, by which a metal laminated sheet or a metal can can be finished so as to have a favorable color tone.

The resin film consisting of the above-described mixed resin has high adhesion to a substrate metal, excellent formability and impact resistance, and flavor property enough for ordinary use as compared with the ordinary polyester resin, so that it is suitable for use as resin film for resin laminated metal sheet.

However, the resin film consisting of the above-described mixed resin may have insufficient adhesion to a substrate metal when being subjected to severe forming. Also, many persons are very sensitive to a change in flavor depending on the recent applications, and impose very rigid requirements. Contrary to such requirements, the resin film consisting of the above-described mixed resin may have an insufficient flavor property because it contains an olefin compound.

The above-described problem is solved by using a film in which a modified polyolefin resin layer containing carboxylic acid is laminated on the resin film consisting of the above-described mixed resin or a film in which a polyester resin layer containing no olefin resin is laminated. The above-described resin film of a multilayer construction will be explained below.

(1) Design is made so that the resin film is a film having a construction such that a resin layer (in this description, also referred to as R2 layer) consisting mainly of modified polyolefin resin having a functional group derived from carboxylic acid is laminated on a resin layer (in this description, also referred to as R1 layer or mixed resin layer) consisting of the above-described mixed resin, and when the film is laminated to a metal sheet, the R2 layer serves as an adhesion layer to a substrate metal.

By the film having the above-described construction, the adhesion after forming or after heating can be improved dramatically. Further, since the modified polyolefin resin layer (R2 layer) has high adhesion to the mixed resin layer (R1 layer), separation between layers does not occur, and high adhesion can be kept as a whole. This mechanism is presumed as follows: Polyester resin is originally a resin having few functional groups such as to have chemical bonding to the substrate metal, so that it does not have so high metal adhesion. On the other hand, modified polyolefin resin having a group derived from carboxylic acid is characterized in that the carboxylic acid deriving group contained in the resin has a strong interaction with the substrate metal, so that it has very high adhesion. However, it has inferior heat resistance and flavor property, so that it cannot be used as a film for the internal surface of can. Thereupon, it is expected that if the modified polyolefin resin layer is used as an adhesion layer to the substrate metal and a polyester resin layer is laminated thereon, a film in which both of the adhesion and other performance such as heat resistance and flavor property are achieved can be obtained. However, since the melting viscosity and melting point differ greatly between these resins, the adhesion between layers at the time of laminating these resins is very poor, and such a double-layer film cannot be manufactured actually. The present invention can achieve two effects at the same time. Specifically, modified polyolefin resin of the same composition as that of the modified polyolefin resin layer (R2 layer), which is an adhesion layer, is mixed in the mixed resin layer (R1 layer), by which the adhesion between layers is enhanced to a level at which there is no problem in terms of manufacture and practical use, and also the modified polyolefin resin mixed in the polyester resin is formed into a granular shape, by which the formability and impact resistance can be improved.

The film in which the mixed resin layer (R1 layer) and the modified polyolefin resin layer (R2 layer) are laminated can be obtained by the ordinary double-layer resin extruding method. Specifically, by using two extruding machines, mixed resin in which granular modified polyolefin resin with a grain diameter of 0.1 to 5 μm is dispersed in advance in thermoplastic polyester resin and resin consisting mainly of modified polyolefin resin having a functional group derived from carboxylic acid are inserted in separate extruding machines, respectively, as raw material resins of R1 and R2 layers, and the resins are melted to a temperature above the respective melting point and are extruded from one T die in a state of being laminated by the feed block method or the multi-manifold method to form a film as a double-layer film by being cooled with a cooling roll etc. and then the film is laminated to a metal sheet. Alternatively, the molten resin is extruded directly on the metal sheet, and then is laminated by being held between the cooling rolls. Thereby, a resin layer of double layers can be manufactured. As the T die method, it is especially preferable that the resin layer be manufactured by the multi-manifold method in which the melting temperatures of a plurality of resins can be controlled precisely.

Also, as another manufacturing method, since the surface tension of modified polyolefin resin is lower than that of polyester resin, by utilizing a property such that modified polyolefin resin is concentrated on the surface of mixed resin during the time when molten mixed resin is cooled, both resins are inserted into one extruding machine, and the cooling rate is decreased when the resins are melted and mixed and extruded from a T die, by which the modified polyolefin resin is concentrated on the surface of mixed resin. By this method as well, a laminated film of both resins can be manufactured.

The thickness ratio R1/R2 of R1 layer to R2 layer is preferably R1/R2=1/1 to 20/1, further preferably R1/R2=5/1 to 10/1, in a composition such that the mechanical properties such as formability and impact resistance and adhesion are at the maximum. If the R1 layer is thinner than this, the mechanical properties are deteriorated greatly. On the other hand, if the R2 layer is thinner than this, the adhesion is deteriorated. Further, the optimum thickness of modified polyolefin resin of R2 layer is preferably 1 to 10 μm, further preferably 1 to 5 μm. If the thickness is smaller than 1 μm, the adhesion is insufficient. On the other hand, if the thickness exceeds 10 μm, high impact resistance and formability of olefin dispersing polyester resin of R1 layer are lost. Similarly, the optimum thickness of modified polyolefin dispersing polyester resin of R1 layer is preferably 10 to 50 μm, further preferably 15 to 25 μm. If the thickness is smaller than 10 μm, the impact resistance and formability are insufficient. On the other hand, if the thickness exceeds 50 μm, these properties are not enhanced, being disadvantageous in terms of cost.

Furthermore, the optimum composition of modified polyolefin resin of R2 layer is, as in the case of modified polyolefin in mixed resin of R1 layer, a composition that contains preferably 2 to 20 wt %, further preferably 3 to 12 wt %, of a functional group derived from carboxylic acid, by weight percentage in carboxylic acid conversion. The reason for this is that regarding adhesion after severe forming or shock, not only the adhesion of resin to a substrate metal but also the adhesion of mixed resin of R1 layer to modified polyolefin resin of R2 layer is important, and the adhesion of these two layers depends basically on the interaction between modified polyolefin resins, so that resin composition closer to each other is advantageous. Herein, weight percentage in carboxylic acid conversion means that all functional groups derived from carboxylic acid contained in modified polyolefin resin are converted into carboxylic acid by hydrolysis or neutralization using acid, and the amount of carboxylic acid group (—COOH) in the original modified polyolefin resin is expressed by weight percentage.

(2) Design is made so that the resin film is a film having a construction such that a polyester resin layer (in this description, also referred to as R0 layer) containing polyethylene terephthalate and/or isophthalic acid copolymerized polyethylene terephthalate as a main basic skeleton is laminated on the mixed resin layer (R1 layer), and when the film is laminated to a metal sheet, the R0 layer serves as an outermost layer.

The polyester resin containing polyethylene terephthalate and/or isophthalic acid copolymerized polyethylene terephthalate as a main basic skeleton means polyester resin in which the sum of a portion in which only ethylene glycol and tereophthalic acid in the polyester resin skeleton are a unit and/or a portion in which ethylene glycol and tereophthalic acid and isophthalic acid are a unit accounts for 90% or more by weight. In other portions, as the acid component, various kinds of aromatic dicarboxylic acids and aliphatic dicarboxylic acids may be copolymerized arbitrarily.

Since the R1 layer is soft, in copolymerized polyester resin, the heat resistance and flavor property are sometimes inferior. A two-layer construction is provided in which the resin layer (R1 layer) consisting of mixed resin in which modified polyolefin resin is dispersed is made a lower layer, and the polyester resin (R0 layer) containing no olefin is made an upper layer, and the R0 layer is made a layer that comes into contact with the content, by which the flavor property of film is dramatically enhanced. Thereby, the flavor property can be enhanced to a level that meets the above-described rigid requirements. A slight olefin portion contained in polyester resin provides greater sorption of terpene hydrocarbon such as d-limonene, which is a flavor component, than the polyester portion, so that the sorption of flavor is great as a whole as compared with polyester resin containing no olefin. Therefore, when the flavor-containing content comes into contact with the film, a larger amount of flavor component transfers from the content to the film. To restrain such a phenomenon, it is effective to provide a polyester resin layer containing no olefin component on a polyester resin layer containing olefin component. Also, the mechanical properties such as formability and impact resistance can be improved.

The optimum thickness of the upper layer (R0 layer) is preferably 1 to 10 μm, further preferably 3 to 5 μm. If the thickness is smaller than 1 μm, the effect of restraining sorption of flavor component can scarcely be expected. On the other hand, if the thickness exceeds 10 μm, high impact resistance and formability of olefin dispersed polyester resin of the lower layer is lost. The optimum thickness of the lower layer (R1 layer) is preferably 10 to 50 μm, further preferably 15 to 25 μm. If the thickness is smaller than 10 μm, the impact resistance and formability are insufficient. On the other hand, even if the thickness exceeds 50 μm, these properties are not enhanced, being disadvantageous in terms of cost.

The total film thickness of R1 layer and R0 layer is preferably in the range of 10 to 50 μm. The upper limit value is determined from the economical viewpoint, and the lower limit value is determined from the viewpoints of impact resistance and formability. Specifically, if the total thickness is not smaller than 10 μm, the impact resistance and formability becomes higher, but if the total thickness exceeds 50 μm, the cost of resin film increases, and the effect of improving impact resistance and formability is saturated.

The thickness ratio R1/R0 of the lower layer (R1 layer) to the upper layer (R0 layer) is preferably R1/R2=2/1 to 10/1, further preferably 5/1 to 10/1, in a composition such that the mechanical properties such as formability and impact resistance and flavor-property are at the maximum. If the R0 layer is thicker than this, the mechanical properties are deteriorated greatly. On the other hand, if the R0 layer is thinner than this, the R0 and R1 layers do not have uniform film thickness in the line direction and the width direction, so that the performance varies and becomes poor.

For the polyester resin of R0 layer, the content of diethylene glycol is preferably 1.5% or lower by weight, further preferably 0.9% or lower by weight. If the content of diethylene glycol is high, deterioration of polymer progresses due to heating treatment such as drying and printing at the forming time, and hence cracks or pinholes are produced, so that the impact resistance and flavor property are sometimes deteriorated.

The intrinsic viscosity of polyester resin of R0 layer is preferably 0.3 to 2.0 dl/g, further preferably 0.3 to 1.5 dl/g, still further preferably 0.5 to 1.0 dl/g. If the intrinsic viscosity is lower than 0.3 dl/g, the mixing with modified polyolefin resin is remarkably difficult. As the result of nonuniform dispersion of modified polyolefin resin, the mechanical strength and impact resistance of polyester resin may be decreased. On the other hand, if the intrinsic viscosity exceeds 2.0 dl/g, the formability is poor because of low viscosity, so that it may become difficult to manufacture a uniform film. The intrinsic viscosity is measured by the method specified in JIS K7367-5. It is measured in o-chlorophenol at 25° C. in a concentration of 0.005 g/ml, and is determined by the formula of intrinsic viscosity=$(T-T_0)/(T_0 \times c)$. In this formula, c expresses resin concentration per 100 ml of solution in gram, and $T_0$ and T express drop time in a capillary viscometer of solvent and resin solution, respectively.

The glass-transition temperature (Tg) of the polyester resin of R0 layer is preferably 30 to 100° C., further preferably 50 to 80° C. If the glass-transition temperature is lower than 30° C., a flaw etc. are liable to be produced by a temperature rise at the forming time because of deteriorated heat resistance of polyester resin. On the other hand, if the glass-transition temperature exceeds 100° C., inversely the formability is sometimes deteriorated. Also, the low-temperature crystallization temperature (Tc) is usually 70 to 210° C., preferably 80 to 200° C. The melting point (Tm) is usually 210 to 265° C., preferably 220 to 260° C. If the low-temperature crystallization temperature is lower than 70° C., crystallization is liable to occur, so that crystallization occurs at the time of retorting, by which the film is easily cracked or separated. On the other hand, if the low-temperature crystallization temperature exceeds 210° C., the mechanical strength is deteriorated. If the melting point is lower than 210° C., resin is deteriorated by heat at the forming time, so that cracks or pinholes are liable to be produced. On the other hand, if the melting point exceeds 265° C., crystallization progresses due to heating treatment such as drying and printing at the forming time, and hence cracks or pinholes are also liable to be produced. The above-described glass-transition temperature, low-temperature crystallization temperature, and crystal melting point are obtained by measuring endothermic peak temperature at the time of temperature rise using a differential scanning calorimeter (DSC). The measurement is made under conditions of sample amount of 10 mg and temperature rise rate of 10° C./min.

The film in which the mixed resin layer (R1 layer) and the polyester resin layer (R0 layer) containing polyethylene terephthalate and/or isophthalic acid copolymerized polyethylene terephthalate as a main basic skeleton are laminated can be obtained by the ordinary double-layer resin extruding method. Specifically, by using two extruding machines, mixed resin in which granular modified polyolefin resin with a grain diameter of 0.1 to 5 μm is dispersed in advance in the thermoplastic polyester resin as described in any one of claims 1 to 8 and polyester resin containing polyethylene terephthalate and/or isophthalic acid copolymerized polyethylene terephthalate as a main-basic skeleton are inserted in separate extruding machines, respectively, as raw material resins of R1 and R0 layers, and the resins are melted to a temperature above the respective melting point and are extruded from one T die in a state of being laminated by the feed block method or the multi-manifold method to form a film as a double-layer film by being cooled with a cooling roll etc. and then the film is laminated to a metal sheet. Alternatively, the molten resin is extruded directly on the metal sheet, and then is laminated by being held between the cooling rolls. Thereby, a resin layer of double layers can be manufactured. As the T die method, it is especially preferable that the resin layer be manufactured by the multi-manifold method in which the melting temperatures of a plurality of resins can be controlled precisely.

Also, unless the effects of the present invention are hindered, an additive, such as a light stabilizer, impact resistance improving agent, compatibilizing agent, lubricant, plasticizer, antistatic agent, reaction catalyst, color preventing agent, free radical inhibitor, plasticizer, antistatic agent, terminal closing agent, oxidation inhibitor, heat stabilizer, mold releasing agent, flame retarder, antibacterial agent, and fungistat, may be added to the polyester resin of R0 layer. The content of these additives is preferably not lower than 0.005 weight part and not higher than 15 weight part, further preferably not lower than 0.01 weight part and not higher than 2 weight part, especially preferable not lower than 0.05 weight part and not higher than 0.5 weight part, with respect to 100 weight part of polyester resin of R0 layer. If the content is lower than 0.005 weight part, the effect is insufficient. On the other hand, the content exceeds 15 weight part, the additive is excessive, so that the component contained in the polyester resin phase decreases the mechanical properties.

As inorganic particles having the effect of improving lubricity, formability, and impact resistance, silica manufactured by the dry method or wet method, porous silica, colloidal silica, titanium oxide, zirconium oxide, aluminum oxide, calcium carbonate, talc, calcium sulfate, barium sulfate, spinel, iron oxide, calcium phosphate, and the like are cited. Also, as organic particles or polymeric organic particles, vinyl resin particles such as polystyrene: particles, crosslinking, polystyrene particles, styrene-acrylic crosslinking particles, acrylic crosslinking particles, styrene-methacrylate resin crosslinking particles, and methacrylate resin crosslinking particles, and particles consisting of silicone, benzoguanamin-formaldehyde, polytetrafluoroethylene, polyphenolester, phenolic resin, and the like can be cited. The particle diameter and content of these particles are not subject to any special restriction. However, in order to achieve the performance to the utmost, the particle diameter is preferably in the range of 0.01 to 5 μm, further preferably in the range of 0.1 to 2.5 μm. Also, the particle diameter distribution is preferably sharp, and the standard deviation thereof is preferably 0.5 or less. Further, the shape of particle is preferably truly spherical, and the ratio of larger diameter to shorter diameter is preferably 1.0 to 1.2.

As a reaction catalyst, for example, an alkali metal compound, alkali earth metal compound, zinc compound, lead compound, manganese compound, cobalt compound, and aluminum compound can be cited, and as a color preventing agent, for example, a phosphorus compound can be cited.

As a free radical inhibitor, one or two kinds selected from a phenol base free radical inhibitor, phosphorus base free radical inhibitor, sulfide base free radical inhibitor, and nitrogen base free radical inhibitor can be cited.

As a plasticizer, a plasticizer consisting of polyester obtained by terminal esterifying a material obtained by condensation polymerization of aliphatic polybasic acid with the number of carbons of 2 to 20 or aromatic polybasic acid with the number of carbons of 8 to 20 with respect to ester derivative or polybasic acid component with the molar ratio of the ester derivative of 0 to 2.0 with aliphatic alcohol with the number of carbons of 2 to 20 by monobasic acid with the number of carbons of 2 to 20 or its ester derivative and/or monohydroxy alcohol with the number of carbons of 1 to 18 can be cited.

As an antistatic agent, a method of kneading an antistatic agent disclosed in Unexamined Japanese Patent Publication No. 5-222357 in resin composition, a method of applying an antistatic agent disclosed in Unexamined Japanese Patent Publication No. 5-1164 on film surface, and the like method can be used as necessary in order to prevent electrostatic failure such as winding of film on a roll in the film forming process or contamination adhering to film surface.

As an antibacterial agent, a conventionally known antibacterial agent disclosed in Unexamined Japanese Patent Publication Nos. 11-48431 and 11-138702 can be used as necessary.

The polyester resin of R0 layer preferably contains 1 to 500 ppm; further preferably 3 to 300 ppm, of an element of at least one kind selected from germanium, antimony, and titanium as a polymerization catalyst. If the amount of element of at least one kind selected from germanium, antimony, and titanium is smaller than 1 ppm, the effect of improving flavor property is sometimes insufficient. If the amount exceeds 500 ppm, foreign matters are produced in polyester and serve as a crystalline nucleus, so that crystallization is liable to occur. In some cases, therefore, the impact resistance is deteriorated or heat resistance is decreased. Among these elements, germanium is especially favorable in terms of flavor property.

A compound used for adding an element of at least one kind selected from germanium, antimony, and titanium to the resin of the present invention are as follows: As a germanium compound, for example, germanium oxide such as germanium dioxide and crystallization water containing germanium hydroxide, hydroxide, or a germanium alkoxide compound such as germanium tetramethoxide, germanium tetraethoxide, germanium tetrabutoxide, and germanium ethyleneglycoxide, a germanium phenoxide compound such as germanium phenolate and germanium β-naphtholate, a phosphorus containing germanium compound such as germanium phosphate and germanium phosphite, and germanium acetate can be cited.

As an antimony compound, diantimony trioxide, antimony trifluoride, antimony acetate, antimony borate, antimony formate, antimonious acid, and the like can be cited.

As a titanium compound, oxide such as titanium dioxide, hydroxide such as titanium hydroxide, an alcoxide compound such as tetramethoxy titanate, tetraethoxy titanate, tetrapropoxy titanate, tetraisopropoxy titanate, and tetrabutoxy titanate, a glycoside compound such as tetrahydroxyethyl titanate, a phenoxide compound, and a compound such as acetate etc. can be cited.

As a method for adding the above-described element to polyester, arbitrary one of conventionally known methods can be used, and the method is not subject to any special restriction. It is preferable that the element be added as a polymerization catalyst usually at an arbitrary stage before the manufacture of polyester is finished. As such a method, in the case of germanium as an example, a method in which germanium compound powder is added as it is, a method in which a germanium compound is melted in a glycol compound, which is a starting material for polyester, and is added as described in Japanese Patent Publication No. 54-22234, and the like method can be cited.

For the polyester resin of R0 layer of the present invention, the content of acetaldehyde in the resin is preferably not higher than 10 ppm, further preferably not higher than 7 ppm from the viewpoint of flavor property. If the content of acetaldehyde exceeds this range, especially 10 ppm, the flavor property is sometimes deteriorated. The method for limiting the content of acetaldehyde to 10 ppm or lower is not subject to any special restriction. For example, a method can be cited in which polyester resin is formed into a film, the polyester resin being obtained by a method in which resin is heat-treated at a temperature below the melting point of polyester under a reduced pressure or in an inert gas atmosphere to remove acetaldehyde produced by thermal decomposition at the time when polyester resin is manufactured by condensation polymerization etc. Preferably, a method should be used in which polyester resin that is obtained by solid-phase polymerizing resin at a temperature higher than 150° C. and lower than the melting point under a reduced pressure or in an inert gas atmosphere.

Also, the polyester resin in accordance with the present invention preferably has less oligomer consisting of a cyclic trimer etc. in resin from the viewpoint of flavor property. In particular, the content of cyclic trimer is preferably 0.9% or lower by weight, further preferably 0.7% or lower by weight. If the content of oligomer in resin exceeds this range, especially 0.9% by weight, the flavor property is sometimes deteriorated. The method for limiting the content of oligomer to 0.9% or lower by weight is not subject to any special restriction, and this content of oligomer can be achieved by using the same method as the above-described method for reducing the content of acetaldehyde.

When an oxidation inhibitor is added to the R0 layer, the added amount should preferably be the same as the added amount to the R1 layer to minimize the influence on the R1 layer.

(3) Design is made so that the resin film is a film having a three-layer construction of R0 layer/R1 layer/R2 layer such that the polyester resin layer (R0 layer) containing polyethylene terephthalate and/or isophthalic acid copolymerized polyethylene terephthalate as a main basic skeleton is laminated on one surface of the resin layer (R1 layer) consisting of mixed resin, and the resin layer (R2 layer) consisting mainly of modified polyolefin resin having a functional group derived from carboxylic acid is laminated on the other surface of the R1 layer; and when the film is laminated to a metal sheet, the R0 layer serves as an outermost layer.

This film is formed by laminating the R0 layer described in the above item (1) on the R1 layer of the resin film of a two-layer construction consisting of R1 layer and R2 layer described in the above item (2). This film having a three-layer construction has high adhesion to the substrate metal and high flavor property. The construction and operation/effect of the R1 layer, R0 layer, and R2 layer are the same as those described in the above items (1) and (2). Further, such a three-layer construction enhances adhesion and a stress relaxing effect, so that defects are less liable to be produced in forming, and thus the formability is enhanced dramatically.

The above-described film having a three-layer construction of R0 layer/R1 layer/R2 layer can be obtained by the ordinary extruding method for a double-layer resin. Specifically, by using three extruding machine, mixed resin in which granular modified polyolefin resin with a grain diameter of 0.1 to 5 μm is dispersed in advance in the thermoplastic polyester resin as described in any one of claims 1 to 8 is inserted in the extruding machine as a raw material of R1 layer and is melted, and at the same time, polyester resin containing polyethylene terephthalate and/or isophthalic acid copolymerized polyethylene terephthalate as a main basic skeleton and modified polyolefin resin having a functional group derived from carboxylic acid are inserted in extruding machines separate from the above-described extruding machine, respectively, as raw material resins of R0 and R2 layers, and the resins are melted to a temperature above the respective melting point and are extruded from one T die in a state of being laminated by the feed block method or the multi-manifold method to form a film as a multi-layer film by being cooled with a cooling roll etc. and then the film is laminated to a metal sheet. Alternatively, the molten resin is extruded directly on the metal sheet, and then is laminated by being held between the cooling rolls. Thereby, a resin layer of multiple layers can be manufactured. As the T die method, it is especially preferable that the resin layer be manufactured by the multi-manifold method in which the melting temperatures of a plurality of resins can be controlled precisely.

Furthermore, in any case, the resin film can be formed so as to have a layer construction such that another polyester resin layer is laminated on the mixed resin layer (R1 layer) or the polyester resin layer (R0 layer) containing polyethylene terephthalate and/or isophthalic acid copolymerized polyethylene terephthalate as a main basic skeleton. In this case, the polyester resin that is a raw material of the third layer is inserted in a separate extruding machine and is melted, and is poured into a T die simultaneously with other resins and is extruded through one port, by which a resin film is manufactured. When the resin layer (R2 layer) consisting mainly of modified polyolefin resin having a functional group derived from carboxylic acid exists, design must be made so that the R2 layer is on the substrate metal side.

In the resin films described in the above items (1) to (3), it is specified that five to 40 wt % of pigment is contained in resin film. In the polyester resin in which modified polyolefin resin is dispersed, the dispersibility of pigment is improved, and the objective color tone can be obtained by the addition of a small amount of pigment, so that it is preferable to add pigment to the R1 layer. If the content of pigment in the resin film is lower than 5 wt %, a desired color tone cannot be obtained, and if it exceeds 40 wt %, the formability is decreased. The kind of pigment is not subject to any special restriction. However, unless the effects of the present invention are hindered, calcium carbonate, barium sulfate, barium carbonate, aerosil, titanium dioxide, zinc white, gloss white, alumina white, magnesium carbonate, carbon black, magnetite, cobalt blue, iron oxide red, or the like is used appropriately, by which a metal laminated sheet or a metal can be finished so as to have a favorable color tone.

In the present invention, the metal sheet is not subject to any special restriction. However, a metal sheet formed of iron and aluminum is preferable in terms of formability. In the case of metal sheet formed of iron, in order to improve the resin adhesion and corrosion resistance, an inorganic oxide film layer, for example, a chemical conversion coating layer represented by chromic acid treatment, phosphate treatment, chromic acid/phosphate treatment, electrolytic chromic acid treatment, chromate treatment, chrome chromate treatment, and the like may be provided on the surface of metal sheet. Also, a malleable metal plating layer, for example, a plating layer of nickel, tin, zinc, aluminum, gun metal, brass, or the like may be provided. Also, the plating layer having the amount of plating of 0.5 to 15 $g/m^2$ in the case of tin plating and 1.8 to 20 $g/m^2$ in the case of nickel or aluminum plating is especially preferable in terms of formability and resin adhesion. The thickness of such a metal sheet is usually 0.01 to 5 mm, preferably 0.1 to 2 mm. On one surface or both surfaces of the metal sheet, a resin laminated layer coated with the above-described resin composition layer in accordance with the present invention is formed.

In the case of metal sheet in which iron is used as a raw material, the steel sheet subjected to electrolytic chromate treatment defined in the eighth invention is especially preferable in terms of adhesion to the resin film of the present invention, corrosion resistance, and manufacturing cost. Since the resin in accordance with the present invention has high adhesion after forming or heating, the optimum range of metallic chromium and chromium oxide is wider than that of the conventional resin. However, it has been found that when higher performance is demanded, the range of the present invention is the optimum one. The reason why the lower limit of the amount of metallic chromium in metallic chromium layer is specified so as to be 50 $mg/m^2$ is that if the amount is smaller than 50 $mg/m^2$, the corrosion resistance and adhesion after forming are sometimes insufficient. The reason why the upper limit thereof is specified so as to be 200 $mg/m^2$ is that if the amount exceeds 200 $mg/m^2$, the effect of improving the corrosion resistance and adhesion after forming is saturated, and inversely the manufacturing cost is increased. The reason why the lower limit of metallic chromium conversion amount of the amount of chromium in chromium oxide is specified so as to be 3 $mg/m^2$ is that if the amount is smaller than 3 $mg/m^2$, the adhesion is sometimes deteriorated. The reason why the upper limit thereof is specified so as to be 30 $mg/m^2$ is that if the amount exceeds 30 $mg/m^2$, the color tone is deteriorated, and also the adhesion becomes inferior.

The reason why the plane orientation coefficient in the direction parallel with the film surface of resin film is specified so as to be 0.010 or lower is that the resin film in this range especially has high formability. As the plane orientation coefficient increases, the formability becomes inferior. This is because oriented crystals hinder plastic deformation as described above. The range of plane orientation coefficient in accordance with the present invention is at a level at which adverse influence is not substantially exerted on the formability. Also, even in the range of plane orientation coefficient of the above item (24), sufficiently high impact resistance is provided as compared with the prior art. However, considering the required formability and impact resistance, the plane orientation coefficient can also be increased intentionally to 0.010 or higher to obtain still higher impact resistance. The above-described film orientation can be obtained by laminating a stretched film to the metal sheet. Specifically, a film is stretched in the one-axis or two-axis direction by the publicly known method at the time of film manufacture to provide stretch orientation, and the stretched film is thermally laminated by being controlled so that the orientation remains at the laminating time, by which the film orientation can be obtained. Regarding the stretching of film, two-axis stretching is especially superior from the viewpoint of mechanical properties.

As the method for manufacturing a resin laminated metal sheet, the publicly known method can be used. An especially preferable method is one in which a resin film is pushed, by using a rotating roll, on a metal sheet heated to a temperature in the range of the melting point of polyester resin in mixed resin of R1 layer minus 70° C. to the melting point thereof plus 30° C. to laminate the resin film to the metal sheet. If the heating temperature is lower than the melting point of polyester resin minus 70° C., the adhesion to metal sheet is insufficient, and if it exceeds the melting point of polyester resin plus 30° C., the film layer fuses to the laminate roll. Since the resin of the present invention has high formability and adhesion after heating, the optimum range of manufacturing conditions in film laminating becomes wider than that in the case of the conventional resin, so that labor saving and stabilization in terms of manufacture control and quality control can be provided advantageously.

As the laminating film, both a stretch oriented-film and a non-stretched film can be used. In particular, when the stretched film is used, control is needed so that the degree of orientation is made a target value by temperature control at the thermal laminating time as described above.

When a resin laminated metal sheet is manufactured, a direct laminating method in which molten resin is extruded directly on a metal sheet, and then is laminated by being held between cooling rolls as described below is preferable.

When a resin film consisting of mixed resin is laminated to a metal sheet, a mixed resin in which granular modified polyolefin resin with a grain diameter of 0.1 to 5 μm is dispersed in advance in the thermoplastic polyester resin as described herein is inserted in an extruding machine as a resin used for raw material, the above-described resin used for raw material is heated to a temperature in the range of the melting point of polyester resin in that resin plus 10° C., to the melting point plus 50° C. and is melted, and then the molten resin is directly extruded from a T die and is laminated on the surface of metal sheet.

When a resin film consisting of R1 layer and R0 layer is laminated to a metal sheet, a mixed resin in which granular modified polyolefin resin with a grain diameter of 0.1 to 5 μm is dispersed in advance in the thermoplastic polyester resin as described herein is inserted in an extruding machine as a resin used for raw material of R1 layer, and at the same time, a resin consisting of polyester resin containing polyethylene terephthalate and/or isophthalic acid copolymerized polyethylene terephthalate as a main basic skeleton is inserted in a separate extruding machine as a resin used for raw material of R0 layer. After these resins are heated to a temperature in the range of the melting point of polyester resin in the R1 layer plus 10° C. to the melting point plus 50° C. and are melted, they are directly extruded in two layers from a T die and are laminated on the surface of metal sheet so that the R1 layer is on the metal sheet side in a state in which the R1 layer and the R0 layer are laminated.

When a resin film consisting of R1 layer and R2 layer is laminated to a metal sheet, a mixed resin in which granular modified polyolefin resin with a grain diameter of 0.1 to 5 μm is dispersed in advance in the thermoplastic polyester resin as described herein is inserted in an extruding machine as a resin used for raw material of R1 layer, and at the same time, a resin consisting mainly of modified polyolefin resin having a functional group derived from carboxylic acid is inserted in a separate extruding machine as a resin used for raw material of R2 layer. After these resins are heated to a temperature in the range of the melting point of polyester resin in the R1 layer plus 10° C. to the melting point plus 50° C. and are melted, they are directly extruded in two layers from a T die and are laminated on the surface of metal sheet so that the R2 layer is on the metal sheet side in a state in which the R1 layer and the R2 layer are laminated.

When a resin film of three-layer construction of R0 layer/R1 layer/R2 layer is laminated to a metal sheet, a mixed resin in which granular modified polyolefin resin with a grain diameter of 0.1 to 5 μm is dispersed in advance in the thermoplastic polyester resin as described herein is inserted in an extruding machine as a resin used for raw material of R1 layer, and at the same time, a resin consisting of polyester resin containing polyethylene terephthalate and/or isophthalic acid copolymerized polyethylene terephthalate as a main basic skeleton and a resin consisting mainly of modified polyolefin resin having a functional group derived from carboxylic acid are inserted in extruding machines separate from the above-described extruding machine, respectively, as resins used for raw materials of R0 and R2 layers. After these resins are heated to a temperature in the range of the melting point of polyester resin in the R1 layer plus 10° C. to the melting point plus 50° C. and are melted, they are directly extruded in three layers from a T die and are laminated on the surface of metal sheet so that the R2 layer is on the metal sheet side, the R1 layer is an intermediate layer, and the R0 layer is an outermost layer in a state in which the R0 layer, the R1 layer, and the R2 layer are laminated.

If the temperature at which resin is melted is lower than the melting point of polyester resin plus 10° C., the viscosity of resin is remarkably inferior, so that the quality stability and productivity are deteriorated. If the temperature exceeds the melting point of polyester resin plus 50° C., there arise problems of adhesion to laminate roll, intrusion of air bubbles. and deteriorated resin. The temperature is preferably not higher than the melting point of polyester resin plus 40° C. Also, the temperature of metal sheet is preferably in the range of the melting point of polyester resin in mixed resin of R1 layer minus 70° C. to the melting point plus 30° C.

The resin in accordance with the present invention need not be controlled strictly even under the manufacturing conditions in extrusion laminating. Therefore, labor saving and stabilization in terms of manufacture control and quality control can be provided advantageously. Also, such a mixed resin having uniform grain diameter and high dispersibility is inserted in the extruding machine to form a film. Therefore, the grain diameter distribution of granular resin is narrowed remarkably as compared with the case where modified polyolefin resin is dispersed while a film is formed, and resultantly a film that achieves high grade in various performances can be obtained.

The reason why the resin film is limited to one that is coated by the extrusion laminating method is that the extrusion laminating method is superior to the ordinary film laminating method from the viewpoint of inclusion of air bubbles at the laminating time. In the general film laminating method, in particular, as the laminating speed increases, air bubbles are liable to be included. The included air bubbles not only decrease adhesion to a substrate metal sheet but also exert an adverse influence on impact resistance. The inventors found out that since stresses concentrate in the edge portion of air bubble at the time of shock, this portion is brittle and serves as a starting point of film fracture. Further, a difference in manufacturing cost between the process in which resin is formed into a film and laminated and the process in which resin is directly extruded and laminated is also an advantage of the extrusion laminating method.

The resin in accordance with the present invention can be manufactured by the extrusion laminating method that cannot be used for the conventional polyester resin because the resin of the present invention can provide sufficient performance substantially even in a non-oriented state. The conventional polyester resin requires strict control of orientation amount, so that it cannot be manufactured by direct extrusion that cannot be controlled strictly. As compared with this, the resin of the present invention also has a great advantage in terms of manufacture.

For the resin laminated metal sheet in accordance with the present invention, a metal sheet has only to be coated with the resin film of the present invention. The publicly known resin film may be laminated as necessary to the lower layer and/or the upper layer of resin film of the present invention, and a metal sheet may be coated with the laminated film.

In the present invention, unless the effects of the present invention are hindered, a primer layer may be provided as an adhesion layer to metal sheet. Although the laminated metal sheet of the present invention has high primary adhesion between resin layer and metal sheet and high adhesion after forming, in a severer corrosive environment or in an environment in which higher adhesion is required, a primer layer can be provided to provide characteristics that meet the requirement. For example, when the laminated metal sheet is used as a metallic can, if more corrosive content is put into the can, the content intrudes an interface with metal sheet through the resin layer, by which the metal sheet may be corroded, and the adhesion to film may be deteriorated. In such a case, a proper primer layer is provided to prevent the resin layer from being separated. When the R2 layer is absent, it is effective to provide the primer layer as an adhesion layer.

The kind of primer is not subject to any special restriction, and the publicly known primer layer can also be used. For example, a water-base dispersing agent of polyester resin base disclosed in Japanese Patent Publication No. 60-12233, an epoxy-base primer disclosed in Japanese Patent Publication No. 63-13829, and a polymer having various functional groups disclosed in Unexamined Japanese Patent Publication No. 61-149341 can be cited. Also, a method for forming a primer layer is not subject to any special restriction. A primer paint may be applied on the metal sheet and dried, or a primer paint may be applied on the film of the present invention and dried. Alternatively, a primer film may be laminated to the metal sheet, or a film formed by affixing a primer layer to the film of the present invention may be laminated.

The resin film in accordance with the present invention can be used suitably to coat the internal surface of a two-piece metallic can manufactured by drawing or ironing. Also, since the film in accordance with the present invention has good metal adhesion and formability as a coating film for a lid portion of two-piece can or a sidewall, lid, and bottom of three-piece can, it can be favorably used in this application. Also, the resin laminated metal sheet coated with the film has high formability, impact resistance, and adhesion, it is suitable as a material used for a thin-wall deep drawn can in which a decrease in material thickness progresses and especially severe forming is forced.

Also, since the resin laminated metal sheet coated with the film can prevent the film from being whitened at the retorting time, it can suitably be used as a can member used for a can lid or a can bottom that is required to prevent the film from being whitened, for example, a lid member of two-piece can or a lid member or a sidewall member of three-piece can.

EXAMPLES

Example 1

Modified polyolefin resin with group derived from carboxylic acid having a primary grain diameter of 0.3 µm, which was a starting raw material, was cold blended with polyester resin in a blending ratio given in Tables 1 and 2 by using a tumbler blender, and then the blended resin was melted and kneaded at 260° C. by using a two-axis extruding machine, by which a raw material pellet of polyester resin in which modified polyolefin resin was dispersed was obtained. The obtained raw material resin pellet was extruded from a T die by using a one-axis extruding machine, by which a resin film with a thickness of 5 to 55 µm was manufactured.

The used polyester resin and modified polyolefin resin with group derived from carboxylic acid were as follows:

1. Polyester Resin (1) PET/I (18) Ethylenephthalate-ethyleneisophthalate copolymerized resin with a ratio of terephthalic acid to isophthalic acid of 82:18 (manufactured by Kanebo Gohsen, Ltd.), intrinsic viscosity: 0.6 dl/g, Tg: 58° C., Tc: 210° C., Tm: 215° C., Ge content: 10 ppm (2) PET/I (10): Ethylenephthalate-ethyleneisophthalate copolymerized resin with a ratio of terephthalic acid to isophthalic acid of 90:10 (IP121B manufactured by Kanebo Gohsen, Ltd.), intrinsic viscosity: 0.6 dl/g, Tg: 70° C., Tc: 170° C., Tm: 230° C., Ge content: 10 ppm (3) PET/I(5): Ethylenephthalate-ethyleneisophthalate copolymerized resin with a ratio of terephthalic acid to isophthalic acid of 95:5 (manufactured by Kanebo Gohsen, Ltd.), intrinsic viscosity: 0.62 dl/g, Tg: 72° C., Tc: 156° C.; Tm: 255° C., Ge content: 20 ppm (4) PET/I(2): Ethylenephthalate-ethyleneisophthalate copolymerized resin with a ratio of terephthalic acid to isophthalic acid of 98:2 (manufactured by Kanebo Gohsen, Ltd.), intrinsic viscosity: 0.6 dl/g, Tg: 68° C., Tc: 150° C., Tm: 250° C., Ge content: 10 ppm (5) PET: Homopolyethylene phthalate resin (EFG10 manufactured by Kanebo Gohsen, Ltd.), intrinsic viscosity: 0.62 dl/g, Tg: 72° C., Tc: 150° C., Tm: 255° C., Ge content: 20 ppm 2. Modified Polyolefin Resin with Group Derived from Carboxylic Acid (1) EM1: Polymethyl methacrylate-(ethylene-ethyl acrylate copolymer) graft copolymer (Modiper A5200 manufactured by NOF Corp.), weight ratio of functional group derived from carboxylic acid: 21 wt %, glass-transition temperature: −30° C. or lower (2) EM2: Polymethyl methacrylate-(ethylene-ethyl acrylate-maleic anhydride copolymer) graft copolymer (Modiper A8200 manufactured by NOF Corp.), weight ratio of functional group derived from carboxylic acid: 18 wt %, glass-transition temperature: −30° C. or lower (3) EM3: Ethylene-ethyl acrylate-maleic anhydride copolymer (Bondine HX8290 manufactured by Sumitomo Chemical Co., Ltd.), weight ratio of functional group derived from carboxylic acid: 11 wt %, glass-transition temperature: −30° C. or lower (4) EM4: Ethylene-methacrylic acid copolymer (Nucrel N1560 manufactured by Mitsui-DuPont Polychemical Co., Ltd.), weight ratio of functional group derived from carboxylic acid: 8 wt %, glass-transition temperature: −30° C. or lower (5) EM5: 50% Zn neutralized substance of ethylene-methacrylic acid copolymer (Nucrel N1560 manufactured by Mitsui-DuPont Polychemical, Co., Ltd. neutralized partially by Zn), weight ratio of functional group derived from carboxylic acid: 7 wt %, glass-transition temperature: −30° C. or lower (6) EM6: 70% Zn neutralized substance of ethylene-methacrylic acid copolymer (Nucrel N1035 manufactured by Mitsui-DuPont Polychemical Co., Ltd. neutralized partially by Zn), weight ratio of functional group derived from carboxylic acid: 5 wt %, glass-transition temperature: −30° C. or lower (7) EM7: Ethylene-methacrylic acid copolymer (Nucrel N0200H manufactured by Mitsui-DuPont Polychemical Co., Ltd.), weight ratio of functional group-derived from carboxylic acid: 1 wt %, glass-transition temperature: −30° C. or lower (8) EM8: Polystyrene-(ethylene-ethyl acrylate copolymer) graft copolymer (Modiper A5100 manufactured by NOF Corp.), weight ratio of functional group derived from carboxylic acid: 6 wt %, glass-transition temperature: 20° C., (9) EPR: Ethylene-propylene rubber (EP07P manufactured by JSR Corp.), weight ratio of functional group derived from carboxylic acid: 0 wt %, glass-transition temperature: −30° C. or lower Pelletized modified polyolefin resin with group derived from carboxylic acid, which was a starting raw material, was mixed with polyester resin in a blending ratio given in comparative example 14 in Table 1, the mixed resin was melted and kneaded at 260° C. by using a one-axis extruding machine, and the mixed resin of modified polyolefin resin and polyester resin was extruded from a T die, by which a resin film with a thickness of 25 μm was manufactured.

For the grain diameter of modified polyolefin resin dispersed in resin film, polyester resin in the surface layer was etched by alkaline aqueous solution and modified polyolefin grains were caused to remain, the larger diameter and shorter diameter thereof were measured one by one, and the grain diameter (in terms of equivalent sphere) was calculated, by which the volume ratio, i.e., the number of grains in the film with one side of 10 μm was determined. Also, various temperatures in the tables were measured by a method using the aforementioned DSC.

As a metal sheet, a tin-free steel (hereinafter abbreviated to TFS) with a thickness of 0.18 mm for thin-wall deep drawn can and 0.23 mm for DI can, which had a degree of temper of DR9, metallic chromium layer of 80 mg/m$^2$, and chromium oxide layer of 15 mg/m$^2$ (metallic chromium conversion), was used, by which a resin laminated metal sheet was obtained by a thermo-compression bonding method in which the resin film obtained as described above was hot-pressed on both surfaces of the metal sheet heated by an induction heating system, and then the laminated metal sheet was rapidly cooled in water. The metal sheet temperature at the laminating time (laminating temperature) is given in Tables 3 and 4.

For the plane orientation coefficient of resin laminated metal sheet, the refractive index was measured by using Abbe's refractometer. In measuring, the light source was a sodium/D ray, the intermediate solution was methylene iodide, and the temperature was 25° C. Then, the refractive index Nx in the lengthwise direction of metal sheet on the film surface, the refractive index Ny in the widthwise direction of metal sheet on the film surface, and the refractive index Nz in the film thickness direction were determined, and the plane orientation coefficient Ns was calculated by the following equation.

$$\text{Plane orientation coefficient } (Ns) = (Nx + Ny)/2 - Nz$$

Furthermore, the resin laminated metal sheet obtained as described above was formed into a can, and subjected to straightening heat treatment to manufacture a sample can. The formability, impact resistance, adhesion after forming, and adhesion after heating of film of manufactured can body were investigated.

The following is a detailed description of the investigation method.

1. Evaluation by Thickness-decreasing Deep Drawing

For a resin laminated metal sheet using a TFS with a thickness of 0.18 mm, a thin-wall deep drawn can was manufactured by the method described below, and the propriety of thin-wall deep drawn can was investigated.

Can Manufacturing

A resin laminated metal sheet was subjected to first-stage drawing and redrawing under the following conditions, by which a thin-wall deep drawn can was obtained.

First-stage drawing
   Blank diameter . . . 150 to 160 mm
   First-stage drawing . . . drawing-ratio: 1.65
Redrawing
   Primary redrawing . . . drawing ratio: 1.25
   Secondary redrawing . . . drawing ratio: 1.25
   Radius of curvature of die corner in redrawing process . . . 0.4 mm
   Load for pressing wrinkle at the time of redrawing . . . 39227N (4000 kg)
Average thickness decreasing percentage of can sidewall
   40 to 55% with respect to thickness of resin laminated metal sheet before forming 1-2 Straightening Heat Treatment Forming strain of film caused by can manufacturing was removed by keeping the can in a thermal environment of film melting point minus 15° C. for 30 seconds and then by rapidly cooling it.

1-3 Evaluation of Propriety of Thin-wall Deep Drawn Can (1) Formability

Evaluation was made as described below by the limit of capability for manufacturing can without film failure. Grades not lower than ○ marked grade are acceptable.

Limit of forming (thickness decreasing percentage): Grade
Incapable of forming at thickness decreasing percentage of 40%: (Inferior)
Capable of forming up to thickness decreasing percentage of 40%
Capable of forming up to thickness decreasing percentage of 45%
Capable of forming up to thickness decreasing percentage of 50%
Capable of forming up to thickness decreasing percentage of 55%: (Superior)

(2) Evaluation of Room-temperature and Low-temperature Impact Resistance

A can body (thickness decreasing percentage: 50%) subjected to straightening heat treatment was necked, and the can body was filled with distilled water. After a lid was installed and tightened, an iron ball of 0.5 kg was dropped from a height of 30 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(Evaluation of Low-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for 24 hours. Thereafter, the peeling length of resin in the can end portion was observed, and evaluation was made as described below. Grades not lower than ○ marked grade are acceptable.

Test Result: Grade
Peeling length longer than 10 mm (Inferior)
Peeling length longer than 5 mm and not longer than 10 mm
Peeling length longer than 2 mm and not longer than 5 mm
Peeling length not longer than 2 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 10%: (Inferior)
Peeling percentage higher than 5% and not higher than 10%
Peeling percentage higher than 2% and not higher than 5%
Peeling percentage not higher than 2%
No peeling: (Superior)

2. Evaluation by Drawing and Ironing (DI Forming)

For a resin laminated metal sheet using a TFS with a thickness of 0.23 mm, a DI can was manufactured by the method described below, and the propriety of DI can was investigated.

2-1 Can Manufacturing

A resin laminated metal sheet was drawn and ironed under the following conditions, by which a DI can was obtained.
First-stage drawing
  Blank diameter: 150 mm
  Drawing ratio: 1.6
Second-stage drawing
  Drawing ratio: 1.25
Ironing
  Ironing punch diameter: 3-stage ironing 65.8 mm dia
Total ironing percentage of can sidewall
  55 to 70% with respect to thickness of resin laminated metal sheet before forming 2-2 Straightening Heat Treatment Forming strain of film caused by can manufacturing was removed by keeping the can in a thermal environment of film melting point minus 15° C. for 30 seconds and then by rapidly cooling it.

2-3 Evaluation of Propriety of DI Can (1) Formability

Evaluation was made as described below by the limit of capability for manufacturing can without film failure. Grades not lower than ○ marked grade are acceptable.

Limit of forming (total ironing percentage): Grade
Incapable of forming at total ironing percentage of 55%: (Inferior)
Capable of forming up to total ironing percentage of 55%
Capable of forming up to total ironing percentage of 60%
Capable of forming up to total ironing percentage of 65%
Capable of forming up to total ironing percentage of 70%: (Superior)

(2) Evaluation of Room-temperature and Low-temperature Impact Resistance

A can body (total ironing percentage: 65%) subjected to straightening heat treatment was necked, and the can body was filled with distilled water. After a lid was installed and tightened, an iron ball of 0.5 kg was dropped from a height of 25 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(Evaluation of Low-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for five hours. Thereafter, the peeling length of resin in the can end portion was observed, and evaluation was made as described below. Grades not lower than ○ marked grade are acceptable.

Test Result: Grade
Peeling length longer than 10 mm: (Inferior)
Peeling length longer than 5 mm and not longer than 10 mm
Peeling length longer than 2 mm and not longer than 5 mm
Peeling length not longer than 2 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 10%: (Inferior)
Peeling percentage higher than 5% and not higher than 10%
Peeling percentage higher than 2% and not higher than 5%
Peeling percentage not higher than 2%
No peeling: (Superior)

The investigation results are given in Tables 3 and 4.

From Tables 1 to 4, the following facts are found for either can type.

Invention examples 1 to 5 are films in which modified polyolefin resin specified in the present invention is dispersed in polyester resin in which the copolymerization ratio of ethylene terephthalate and ethylene isophthalate is changed variously, and invention examples 35 to 39 in which the films are laminated under the laminating conditions of the present invention exhibit high formability, impact resistance, and adhesion. Also, invention example 38 in which the film of invention example 4 using polyester resin containing a small amount of isophthalic acid is laminated and invention example 39 in which the film of invention example 5 using homopolyethylene terephthalate is laminated have a tendency toward deteriorated formability and adhesion, but provide high performance as a whole. Also, invention example 35 in which the film of invention example 1 using polyester resin containing a high amount of isophthalic acid is laminated has a tendency toward deteriorated adhesion after heating because of a slightly low melting point, but provides high performance as a whole. Further, invention examples 33 and 34 are films in which polyester resins with different copolymerization ratio of two types are mixed in the range of the present invention, and invention examples 67 and 68 in which the films are laminated under the laminating conditions of the present invention have a tendency toward slightly deteriorated formability, but exhibit high formability, impact resistance, and adhesion. On the other hand, comparative examples 1 to 6 are examples of films in which polyolefin resin is not contained in polyester resin in which the copolymerization ratio of ethylene terephthalate and ethylene isophthalate is changed variously. Comparative examples 15 to 20 in which these films are laminated especially have a low level of impact resistance.

Invention examples 6 to 10 are mixed resins in which various polyolefin resins are dispersed in polyester resin, and invention examples 40 to 44 in which the mixed resins are laminated exhibit high formability, impact resistance, and adhesion. However, invention example 40 in which the film of invention example 6 using polyolefin resin with a slightly high percentage of functional group derived from carboxylic acid is laminated and invention example 44 in which the film of invention example 10 using polyolefin resin having a slightly high glass-transition temperature is laminated have a tendency toward slightly deteriorated low-temperature impact resistance. On the other hand, comparative examples 11 to 13 are mixed resins in which polyolefin resin containing a functional group derived from carboxylic acid whose percentage deviates from the range of the present invention is dispersed in polyester resin, and comparative examples 25 to 27 in which these mixed resins are laminated have inferior formability and impact resistance.

Comparative example 14 is a film in which modified polyolefin resin with group derived from carboxylic acid and polyester resin are simply mixed with each other, and comparative example 28 in which this film is laminated has greatly deteriorated formability and impact resistance because modified polyolefin resin is not dispersed in polyester resin in a fine granular form.

Invention examples 11 to 18 are films in which the blending ratio and dispersion state of modified polyolefin resin in polyester resin are changed variously in the range of the present invention, and invention examples 45 to 52 in which the films are laminated under the laminating conditions of the present invention exhibit high formability, impact resistance, and adhesion. However, invention example 45 in which the film of invention example 11 containing a small amount of dispersed modified polyolefin resin is laminated and invention example 51 in which the film of invention example 17 having a very large number of grains of modified polyolefin resin is laminated have a tendency toward slightly deteriorated low-temperature impact resistance.

On the other hand, comparative examples 7 to 10 are films in which the blending ratio of modified polyolefin resin in polyester resin does not meet the requirement of the present invention, and comparative examples 21 to 24 in which the films are laminated under the laminating conditions of the present invention have greatly deteriorated formability and impact resistance. Comparative examples 21 and 22 in which the films of comparative examples 7 and 8 containing a small amount of dispersed modified polyolefin resin are laminated have greatly deteriorated room-temperature impact resistance, and comparative examples 23 and 24 in which the films of comparative examples 9 and 10 containing a large amount of modified polyolefin resin are laminated have greatly deteriorated formability.

Invention examples 19 to 23 are films in which titanium dioxide pigment is mixed with a mixed resin of modified polyolefin resin and polyester resin, and invention examples 53 to 57 in which the films are laminated under the laminating conditions of the present invention exhibit high formability, impact resistance, and adhesion, and also provide a white uniform color tone. However, invention example 53 in which the film of invention example 19 in which the added amount of pigment is smaller than a desired range is laminated has slightly insufficient opacifying property of color tone. On the other hand, invention example 57 in which the film of invention example 23 in which the added amount of pigment is larger than a desired range is laminated has slightly deteriorated formability.

Invention examples 24 to 28 are films in which the thickness thereof is changed in the range of the present invention, and invention examples 58 to 62 in which the films are laminated under the laminating conditions of the present invention exhibit high formability, impact resistance, and adhesion. Invention examples 24 and 28 are films in which the thickness thereof exceeds the desired range of the present invention, and invention examples 58 and 62 in which the films are laminated have slightly lower formability and impact resistance than the case of desired film thickness.

Invention examples 36 and 69 to 72 are films obtained by changing the laminating conditions of the film of invention example 2 in the range of the present invention. If the conditions are within the range of the present invention, high formability, impact resistance, and adhesion are exhibited regardless of the laminating temperature. On the other hand, in comparative example 30, the film of invention example 2 was laminated under conditions lower than the lower limit of laminating temperature range of the present invention, so that the film did not adhere to a steel sheet, and therefore evaluation could not be made. On the other hand, in comparative example 29, the film of invention example 2 was laminated under conditions exceeding the upper limit of laminating temperature range of the present invention, so that the film fused to a laminate roll, and therefore evaluation could not be made.

Invention examples 29 to 31 are films in which a lubricant, free radical inhibitor, and compatibilizing agent are mixed, respectively, in a mixed resin of modified polyolefin resin and polyester resin of the present invention, and invention examples 63 to 65 in which the films are laminated under the laminating conditions of the present invention exhibit high formability, impact resistance, and adhesion. Further, invention examples 63 to 65 also have lubricity, free radical deterioration resistance, and compatibility depending on the function of added additive, and in particular, invention example 65 exhibits excellent low-temperature impact resistance.

Invention example 32 is a film of the present invention that is manufactured by the two-axis stretching method, and invention examples 66 and 73 in which the film is laminated exhibit high performance. Invention example 73, which has a plane orientation coefficient of 0.015, exhibits a slightly deteriorated formability. However, in the low-temperature impact resistance test, it was verified that the formability is slightly higher than the case of low plane orientation coefficient. Invention example 66, which has a plane orientation coefficient in the range of the present invention, exhibits very high formability and impact resistance.

TABLE 1

| | | Polyester resin | | Pigment | | | Polyolefin resin | | | | |
|---|---|---|---|---|---|---|---|---|---|---|---|
| Sample film | Film thickness (μm) | Resin type | Additive | Kind | Content *1) | Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Stretching |
| Invention example 1 | 25 | PET/I(18) | None | None | 0 | EM4 | 8 | <−30 | 15 | 12 | 2000 | Non-stretched |
| Invention example 2 | 25 | PET/I(10) | None | None | 0 | EM4 | 8 | <−30 | 15 | 12 | 2000 | Non-stretched |
| Invention example 3 | 25 | PET/I(5) | None | None | 0 | EM4 | 8 | <−30 | 15 | 12 | 2000 | Non-stretched |

TABLE 1-continued

| Sample film | Film thickness (μm) | Polyester resin Resin type | Additive | Pigment Kind | Content *1) | Polyolefin resin Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Stretching |
|---|---|---|---|---|---|---|---|---|---|---|---|---|
| Invention example 4 | 25 | PET/I(2) | None | None | 0 | EM4 | 8 | <-30 | 15 | 12 | 2000 | Non-stretched |
| Invention example 5 | 25 | PET | None | None | 0 | EM4 | 8 | <-30 | 15 | 12 | 2000 | Non-stretched |
| Invention example 6 | 25 | PET/I(10) | None | None | 0 | EM2 | 18 | <-30 | 15 | 13 | 500 | Non-stretched |
| Invention example 7 | 25 | PET/I(10) | None | None | 0 | EM4 | 8 | <-30 | 15 | 12 | 2000 | Non-stretched |
| Invention example 8 | 25 | PET/I(10) | None | None | 0 | EM5 | 7 | <-30 | 15 | 12 | 2000 | Non-stretched |
| Invention example 9 | 25 | PET/I(10) | None | None | 0 | EM6 | 5 | <-30 | 15 | 12 | 2000 | Non-stretched |
| Invention example 10 | 25 | PET/I(10) | None | None | 0 | EM8 | 6 | 20 | 15 | 12 | 2000 | Non-stretched |
| Invention example 11 | 25 | PET/I(10) | None | None | 0 | EM3 | 11 | <-30 | 5 | 3 | 3 | Non-stretched |
| Invention example 12 | 25 | PET/I(10) | None | None | 0 | EM3 | 11 | <-30 | 5 | 5 | 70 | Non-stretched |
| Invention example 13 | 25 | PET/I(10) | None | None | 0 | EM3 | 11 | <-30 | 10 | 8 | 30 | Non-stretched |
| Invention example 14 | 25 | PET/I(10) | None | None | 0 | EM3 | 11 | <-30 | 10 | 10 | 250 | Non-stretched |
| Invention example 15 | 25 | PET/I(10) | None | None | 0 | EM3 | 11 | <-30 | 15 | 15 | 500 | Non-stretched |
| Invention example 16 | 25 | PET/I(10) | None | None | 0 | EM3 | 11 | <-30 | 15 | 18 | 20000 | Non-stretched |
| Invention example 17 | 25 | PET/I(10) | None | None | 0 | EM3 | 11 | <-30 | 20 | 22 | 200000 | Non-stretched |
| Invention example 18 | 25 | PET/I(10) | None | None | 0 | EM3 | 11 | <-30 | 25 | 20 | 8000 | Non-stretched |
| Invention example 19 | 25 | PET/I(10) | None | $TiO_2$ | 3 | EM5 | 7 | <-30 | 15 | 12 | 2000 | Non-stretched |
| Invention example 20 | 25 | PET/I(10) | None | $TiO_2$ | 7 | EM5 | 7 | <-30 | 15 | 12 | 2000 | Non-stretched |
| Invention example 21 | 25 | PET/I(10) | None | $TiO_2$ | 15 | EM5 | 7 | <-30 | 15 | 12 | 2000 | Non-stretched |
| Invention example 22 | 25 | PET/I(10) | None | $TiO_2$ | 30 | EM5 | 7 | <-30 | 15 | 12 | 2000 | Non-stretched |
| Invention example 23 | 25 | PET/I(10) | None | $TiO_2$ | 50 | EM5 | 7 | <-30 | 15 | 12 | 2000 | Non-stretched |
| Invention example 24 | 5 | PET/I(10) | None | None | 0 | EM6 | 5 | <-30 | 15 | 12 | 2000 | Non-stretched |

*1) Pigment content means weight percentage (wt %) of pigment with respect to total film amount of entire resin and pigment.

TABLE 2

| Sample film | Film thickness (μm) | Polyester resin Resin type | Additive | Pigment Kind | Content *1) | Polyolefin resin Resin type | Weight percentage of functional group derived from carboxylic acid (wt %) | Tg (° C.) | Blending ratio in entire resin (wt %) | Volume percentage of grains with diameter of 0.1 to 5 μm 0.2 (vol %) | Number of grains with diameter of 0.1 to 5 μm in cube with one side of 10 μm (grains) | Stretching |
|---|---|---|---|---|---|---|---|---|---|---|---|---|
| Invention example 25 | 15 | PET/I(10) | None | None | 0 | EM6 | 5 | <-30 | 15 | 12 | 2000 | Non-stretched |
| Invention example 26 | 20 | PET/I(10) | None | None | 0 | EM6 | 5 | <-30 | 15 | 12 | 2000 | Non-stretched |
| Invention example 27 | 40 | PET/I(10) | None | None | 0 | EM6 | 5 | <-30 | 15 | 12 | 2000 | Non-stretched |
| Invention example 28 | 55 | PET/I(10) | *2) 0.3 wt % | None | 0 | EM6 | 5 | <-30 | 15 | 12 | 2000 | Non-stretched |

TABLE 2-continued

| | | | | | Polyolefin resin | | | | | |
|---|---|---|---|---|---|---|---|---|---|---|---|
| Sample film | Film thickness (μm) | Polyester resin Resin type | Polyester resin Additive | Pigment Kind | Pigment Content *1) | Resin type | Weight percentage of functional group derived from carboxylic acid (wt %) | Tg (° C.) | Blending ratio in entire resin (wt %) | Volume percentage of grains with diameter of 0.1 to 5 μm 0.2 (vol %) | Number of grains with diameter of 0.1 to 5 μm in cube with one side of 10 μm (grains) | Stretching |
| Invention example 29 | 25 | PET/I(10) | *3) 0.1 wt % | None | 0 | EM3 | 11 | <−30 | 15 | 12 | 2000 | Non-stretched |
| Invention example 30 | 25 | PET/I(10) | *4) 3 wt % | None | 0 | EM3 | 11 | <−30 | 15 | 13 | 2000 | Non-stretched |
| Invention example 31 | 25 | PET/I(10) | None | None | 0 | EM3 | 11 | <−30 | 15 | 12 | 2000 | Non-stretched |
| Invention example 32 | 25 | PET/I(10) | None | None | 0 | EM4 | 8 | <−30 | 15 | 12 | 2000 | Two-axis stretched |
| Invention example 33 | 25 | PET70% + PET/I(10)30% | None | None | 0 | EM4 | 8 | <−30 | 15 | 12 | 2000 | Non-stretched |
| Invention example 34 | 25 | PET40% + PET/I(18)60% | None | None | 0 | EM4 | 8 | <−30 | 15 | 12 | 2000 | Non-stretched |
| Comparative example 1 | 25 | PET/I(18) | None | None | 0 | None | — | — | 0 | 0 | 0 | Non-stretched |
| Comparative example 2 | 25 | PET/I(10) | None | None | 0 | None | — | — | 0 | 0 | 0 | Non-stretched |
| Comparative example 3 | 25 | PET/I(10) | None | None | 0 | None | — | — | 0 | 0 | 0 | Two-axis stretched |
| Comparative example 4 | 25 | PET/I(5) | None | None | 0 | None | — | — | 0 | 0 | 0 | Non-stretched |
| Comparative example 5 | 25 | PET/I(2) | None | None | 0 | None | — | — | 0 | 0 | 0 | Non-stretched |
| Comparative example 6 | 25 | PET | None | None | 0 | None | — | — | 0 | 0 | 0 | Non-stretched |
| Comparative example 7 | 25 | PET/I(10) | None | None | 0 | EM3 | 11 | <−30 | 2 | 2 | 3 | Non-stretched |
| Comparative example 8 | 25 | PET/I(10) | None | None | 0 | EM3 | 11 | <−30 | 2 | 2 | 45 | Non-stretched |
| Comparative example 9 | 25 | PET/I(10) | None | None | 0 | EM3 | 11 | <−30 | 35 | 28 | 15000 | Non-stretched |
| Comparative example 10 | 25 | PET/I(10) | None | None | 0 | EM3 | 11 | <−30 | 35 | 28 | 120000 | Non-stretched |
| Comparative example 11 | 25 | PET/I(10) | None | None | 0 | EM1 | 21 | <−30 | 15 | 14 | 40 | Non-stretched |
| Comparative example 12 | 25 | PET/I(10) | None | None | 0 | EM7 | 1 | <−30 | 15 | 3 | 20 | Non-stretched |
| Comparative example 13 | 25 | PET/I(10) | None | None | 0 | EPR | 0 | <−30 | 15 | 1 | 5 | Non-stretched |
| Comparative example 14 | 25 | PET/I(10) | None | None | 0 | EM5 | 7 | <−30 | 15 | Not dispersed in fine grains | Not dispersed in fine grains | Non-stretched |

*1) Pigment content means weight percentage (wt %) of pigment with respect to total film amount of entire resin and pigment.
*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond First 20B (manufactured by Sumitomo Chemical Co., Ltd.) of compatibilizing agent is added by 3 weight part to 100 weight part of mixed resin.

TABLE 3

| Laminated metal sheet | Sample film | Melting point of polyester resin (°C.) | Laminating temp. (°C.) | Plane orientation coefficient | Thin-wall deep drawn can | | | | | Drawn and ironed can (DI can) | | | | | |
|---|---|---|---|---|---|---|---|---|---|---|---|---|---|---|---|
| | | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Invention example 35 | Invention example 1 | 215 | 200 | 0 | ⊚ | ⊚ | ⊚ | ⊚ | ⊚ | ⊚ | ⊚ | ⊚ | ⊚ | ○ |
| Invention example 36 | Invention example 2 | 230 | 210 | 0 | ⊚ | ⊚ | ⊚ | ⊚ | ⊚ | ⊚ | ⊚ | ⊚ | ⊚ | ⊚ |
| Invention example 37 | Invention example 3 | 255 | 230 | 0 | ⊚ | ⊚ | ⊚ | ⊚ | ⊚ | ⊚ | ⊚ | ⊚ | ⊚ | ⊚ |
| Invention example 38 | Invention example 4 | 250 | 225 | 0 | ⊚ | ⊚ | ⊚ | ⊚ | ⊚ | ○ | ⊚ | ⊚ | ○ | ○ |
| Invention example 39 | Invention example 5 | 255 | 230 | 0 | ⊚ | ⊚ | ⊚ | ⊚ | ⊚ | ○ | ○ | ⊚ | ○ | ○ |
| Invention example 40 | Invention example 6 | 230 | 210 | 0 | ⊚ | ⊚ | ⊚ | ⊚ | ⊚ | ⊚ | ⊚ | ○ | ⊚ | ⊚ |
| Invention example 41 | Invention example 7 | 230 | 210 | 0 | ⊚ | ⊚ | ⊚ | ⊚ | ⊚ | ⊚ | ⊚ | ⊚ | ⊚ | ⊚ |
| Invention example 42 | Invention example 8 | 230 | 210 | 0 | ⊚ | ⊚ | ⊚ | ⊚ | ⊚ | ⊚ | ⊚ | ⊚ | ⊚ | ⊚ |
| Invention example 43 | Invention example 9 | 230 | 210 | 0 | ⊚ | ⊚ | ⊚ | ⊚ | ⊚ | ⊚ | ○ | ⊚ | ⊚ | ⊚ |
| Invention example 44 | Invention example 10 | 230 | 210 | 0 | ⊚ | ⊚ | ⊚ | ⊚ | ⊚ | ○ | ○ | ○ | ○ | ⊚ |
| Invention example 45 | Invention example 11 | 230 | 210 | 0 | ⊚ | ⊚ | ⊚ | ⊚ | ⊚ | ⊚ | ○ | ○ | ⊚ | ⊚ |
| Invention example 46 | Invention example 12 | 230 | 210 | 0 | ⊚ | ⊚ | ⊚ | ⊚ | ⊚ | ⊚ | ○ | ⊚ | ⊚ | ⊚ |
| Invention example 47 | Invention example 13 | 230 | 210 | 0 | ⊚ | ⊚ | ⊚ | ⊚ | ⊚ | ⊚ | ⊚ | ⊚ | ⊚ | ⊚ |
| Invention example 48 | Invention example 14 | 230 | 210 | 0 | ⊚ | ⊚ | ⊚ | ⊚ | ⊚ | ⊚ | ⊚ | ⊚ | ⊚ | ⊚ |

TABLE 3-continued

| Laminated metal sheet | Sample film | Melting point of polyester resin (°C) | Laminating temp. (°C) | Plane orientation coefficient | Thin-wall deep drawn can | | | | | Drawn and ironed can (DI can) | | | | |
|---|---|---|---|---|---|---|---|---|---|---|---|---|---|---|
| | | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Invention example 49 | Invention example 15 | 230 | 210 | 0 | ⊚ | ⊚ | ⊚ | ⊚ | ⊚ | ⊚ | ⊚ | ⊚ | ⊚ | ⊚ |
| Invention example 50 | Invention example 16 | 230 | 210 | 0 | ⊚ | ⊚ | ⊚ | ⊚ | ⊚ | ⊚ | ○ | ⊚ | ⊚ | ⊚ |
| Invention example 51 | Invention example 17 | 230 | 210 | 0 | ⊚ | ⊚ | ⊚ | ⊚ | ⊚ | ⊚ | ○ | ○ | ⊚ | ⊚ |
| Invention example 52 | Invention example 18 | 230 | 210 | 0 | ⊚ | ⊚ | ⊚ | ⊚ | ⊚ | ⊚ | ⊚ | ⊚ | ⊚ | ⊚ |
| Invention example 53 | Invention example 19 | 230 | 210 | 0 | ⊚ | ⊚ | ⊚ | ⊚ | ⊚ | ⊚ | ⊚ | ⊚ | ⊚ | ⊚ |
| Invention example 54 | Invention example 20 | 230 | 210 | 0 | ⊚ | ⊚ | ⊚ | ⊚ | ⊚ | ⊚ | ⊚ | ⊚ | ⊚ | ⊚ |
| Invention example 55 | Invention example 21 | 230 | 210 | 0 | ⊚ | ⊚ | ⊚ | ⊚ | ⊚ | ⊚ | ⊚ | ⊚ | ⊚ | ⊚ |
| Invention example 56 | Invention example 22 | 230 | 210 | 0 | ⊚ | ⊚ | ⊚ | ⊚ | ⊚ | ⊚ | ⊚ | ⊚ | ⊚ | ⊚ |
| Invention example 57 | Invention example 23 | 230 | 210 | 0 | ⊚ | ⊚ | ⊚ | ⊚ | ⊚ | ○ | ⊚ | ⊚ | ○ | ⊚ |
| Invention example 58 | Invention example 24 | 230 | 210 | 0 | ⊚ | ⊚ | ⊚ | ⊚ | ⊚ | ○ | ⊚ | ⊚ | ⊚ | ⊚ |

TABLE 4

| Laminated metal sheet | Sample film | Melting point of polyester resin (° C.) | Laminating temp. (° C.) | Plane orientation coefficient | Thin-wall deep drawn can | | | | | Drawn and ironed can (DI can) | | | | |
|---|---|---|---|---|---|---|---|---|---|---|---|---|---|---|
| | | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Invention example 59 | Invention example 25 | 230 | 210 | 0 | ⊚ | ⊚ | ⊚ | ⊚ | ⊚ | ⊚ | ⊚ | ⊚ | ⊚ | ⊚ |
| Invention example 60 | Invention example 26 | 230 | 210 | 0 | ⊚ | ⊚ | ⊚ | ⊚ | ⊚ | ⊚ | ⊚ | ⊚ | ⊚ | ⊚ |
| Invention example 61 | Invention example 27 | 230 | 210 | 0 | ⊚ | ⊚ | ⊚ | ⊚ | ⊚ | ⊚ | ⊚ | ⊚ | ⊚ | ⊚ |
| Invention example 62 | Invention example 28 | 230 | 210 | 0 | ⊚ | ⊚ | ⊚ | ⊚ | ⊚ | ⊚ | ⊚ | ⊚ | ⊚ | ⊚ |
| Invention example 63 | Invention example 29 | 230 | 210 | 0 | ⊚ | ⊚ | ⊚ | ⊚ | ⊚ | ⊚ | ⊚ | ⊚ | ⊚ | ⊚ |
| Invention example 64 | Invention example 30 | 230 | 210 | 0 | ⊚ | ⊚ | ⊚ | ⊚ | ⊚ | ⊚ | ⊚ | ⊚ | ⊚ | ⊚ |
| Invention example 65 | Invention example 31 | 230 | 210 | 0.005 | ⊚ | ⊚ | ⊚ | ⊚ | ⊚ | ⊚ | ⊚ | ⊚ | ⊚ | ⊚ |
| Invention example 66 | Invention example 32 | 255 | 230 | 0 | ⊚ | ⊚ | ⊚ | ⊚ | ⊚ | ○ | ⊚ | ⊚ | ⊚ | ⊚ |
| Invention example 67 | Invention example 33 | 255 | 230 | 0 | ⊚ | ⊚ | ⊚ | ⊚ | ⊚ | ○ | ⊚ | ⊚ | ⊚ | ○ |
| Invention example 68 | Invention example 34 | 230 | 255 | 0 | ⊚ | ⊚ | ⊚ | ⊚ | ⊚ | ○ | ⊚ | ⊚ | ⊚ | ⊚ |
| Invention example 69 | Invention example 2 | 230 | 230 | 0 | ⊚ | ⊚ | ⊚ | ⊚ | ⊚ | ⊚ | ⊚ | ⊚ | ⊚ | ⊚ |
| Invention example 70 | Invention example 2 | 230 | 190 | 0 | ⊚ | ⊚ | ⊚ | ⊚ | ⊚ | ⊚ | ⊚ | ⊚ | ⊚ | ⊚ |
| Invention example 71 | Invention example 2 | 230 | 170 | 0 | ⊚ | ⊚ | ⊚ | ⊚ | ⊚ | ○ | ⊚ | ⊚ | ○ | ○ |
| Invention example 72 | Invention example 2 | 230 | 200 | 0.015 | ⊚ | ⊚ | ⊚ | ⊚ | ⊚ | ⊚ | ⊚ | ⊚ | ⊚ | ⊚ |
| Invention example 73 | Comparative example 32 | 215 | 200 | 0 | ⊚ | ⊚ | ⊚ | ⊚ | ⊚ | △ | ×× | △ | △ | △ |
| Comparative example 15 | Comparative example 1 | 230 | 210 | 0 | ⊚ | ⊚ | ⊚ | ⊚ | ⊚ | △ | ×× | △ | △ | ○ |
| Comparative example 16 | Comparative example 2 | 255 | 225 | 0 | ⊚ | ⊚ | ⊚ | ⊚ | ⊚ | × | ×× | △ | △ | ○ |
| Comparative example 17 | Comparative example 3 | 250 | 230 | 0 | ⊚ | ⊚ | ⊚ | ⊚ | ⊚ | △ | ×× | △ | △ | ○ |
| Comparative example 18 | Comparative example 4 | 255 | 210 | 0 | ⊚ | ⊚ | ⊚ | ⊚ | ⊚ | × | ×× | △ | × | ○ |
| Comparative example 19 | Comparative example 5 | | | | | | | | | | | | | |

TABLE 4-continued

| Laminated metal sheet | Sample film | Melting point of polyester resin (°C) | Laminating temp. (°C) | Plane orientation coefficient | Thin-wall deep drawn can | | | | | Drawn and ironed can (DI can) | | | | |
|---|---|---|---|---|---|---|---|---|---|---|---|---|---|---|
| | | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Comparative example 20 | Comparative example 6 | 230 | 210 | 0 | ◉ | ◉ | ◉ | ◉ | ◉ | XX | XX | △ | XX | △ |
| Comparative example 21 | Comparative example 7 | 230 | 210 | 0 | ◉ | ◉ | ◉ | ◉ | ◉ | ○ | XX | △ | △ | ○ |
| Comparative example 22 | Comparative example 8 | 230 | 210 | 0 | ◉ | ◉ | ◉ | ◉ | ◉ | ○ | x | △ | ○ | ◉ |
| Comparative example 23 | Comparative example 9 | 230 | 210 | 0 | ◉ | ◉ | ◉ | ◉ | ◉ | x | ○ | △ | x | ○ |
| Comparative example 24 | Comparative example 10 | 230 | 210 | 0 | ◉ | ◉ | ◉ | ◉ | ◉ | XX | ○ | △ | XX | ○ |
| Comparative example 25 | Comparative example 11 | 230 | 210 | 0 | ◉ | ◉ | ◉ | ◉ | ◉ | x | ○ | △ | ○ | ○ |
| Comparative example 26 | Comparative example 12 | 230 | 210 | 0 | ◉ | ◉ | ◉ | ◉ | ◉ | △ | x | △ | ○ | △ |
| Comparative example 27 | Comparative example 13 | 230 | 210 | 0 | ◉ | ◉ | ◉ | ◉ | ◉ | x | XX | △ | x | x |
| Comparative example 28 | Comparative example 14 | 230 | 210 | 0 | ◉ | ◉ | ◉ | ◉ | ◉ | XX | XX | △ | XX | △ |
| Comparative example 29 | Invention example 1 | 230 | 265 | — | — | — | — | — | — | — | — | — | — | — |
| Comparative example 30 | Invention example 2 | 230 | 150 | — | — | — | — | — | — | — | — | — | — | — |

Example 2

Modified polyolefin resin with group derived from carboxylic acid having a primary grain diameter of 0.3 μm, which was a starting raw material, was cold blended with polyester resin in a blending ratio given in Tables 5 and 6 by using a tumbler blender, and then the blended resin was melted and kneaded at 260° C. by using a two-axis extruding machine, by which a raw material pellet of polyester resin in which modified polyolefin resin was dispersed was obtained. In the tables, the resin type corresponding to the symbol of resin type of polyester resin and resin type of polyolefin resin is the same as that described in Example 1.

As a metal sheet, as in Example 1, a tin-free steel (hereinafter abbreviated to TFS) with a thickness of 0.18 mm for thin-wall deep drawn can and 0.23 mm for DI can, which had a degree of temper of DR9, metallic chromium layer of 80 mg/m$^2$, and chromium oxide layer of 15 mg/m$^2$ (metallic chromium conversion), was used, by which a both-side resin laminated metal sheet was obtained by a method in which the raw material resin pellet was inserted in a one-axis extruding machine, molten resin was extruded directly from a T die onto one surface of the metal sheet, the extruded resin was once cooled while being held adherently between two rolls, and immediately after the resin was laminated on the opposite surface in the same manner, the resin laminated metal sheet was cooled rapidly in water. The temperature of metal sheet at the laminating time was 50° C. The lip opening width of T die was adjusted so that the thickness of resin film was 6 to 55 μm. The type of sample resin and the resin-melting temperature at the laminating time are given in Tables 7 and 8. The used polyester resin and modified polyolefin resin with group derived from carboxylic acid are the same as those used in Example 1.

Pelletized modified polyolefin resin with group derived from carboxylic acid, which was a starting raw material, was mixed with polyester resin in a blending ratio given in comparative example 43 in Table 6, the mixed resin was melted and kneaded at 260° C. by using a one-axis extruding machine, and the obtained mixed resin of modified polyolefin resin and polyester resin was extruded from a T die, by which the resin that had been directly extruded to a thickness of 25 μm was laminated to the TFS.

All of the grain diameter of modified polyolefin resin dispersed in resin film, various temperatures in the table, and the method for measuring the plane orientation coefficient of laminated metal sheet are the same as those in Example 1. As in Example 1, a thin-wall deep drawn can or a DI can was manufactured from the laminated metal sheet obtained as described above, and the can was subjected to straightening heat treatment to manufacture a sample can. The formability, impact resistance, and adhesion of film of the manufactured can body were investigated as in Example 1.

The investigation results are given in Tables 7 and 8.

From Tables 5 to 8, the following facts are found for either can type.

Invention examples 74 to 82 are films which are formed by dispersing modified polyolefin resin specified in the present invention in polyester resin in which the copolymerization ratio of ethylene terephthalate and ethylene isophthalate is changed variously, and exhibit high formability, impact resistance, and adhesion. Also, invention example 81 using polyester resin containing a small amount of isophthalic acid and invention example 82 using homopolyethylene terephthalate have a tendency toward deteriorated formability and adhesion, but provide high performance as a whole. Also, invention example 74 using polyester resin containing a large amount of isophthalic acid has a tendency toward deteriorated adhesion after heating because of slightly low melting point, but provide high performance as a whole. Further, invention examples 109 and 110 are resins in which polyester resins with different copolymerization ratio of two types are mixed in the range of the present invention, and have a tendency toward slightly deteriorated formability, but exhibit high formability, impact resistance, and adhesion. On the other hand, comparative examples 31 to 35 are examples of resins in which polyolefin resin is not contained in polyester resin in which the copolymerization ratio of ethylene terephthalate and ethylene isophthalate is changed variously, and especially have a low level of impact resistance.

Invention examples 83 to 87 are examples of mixed resins in which various polyolefin resins are dispersed in polyester resin, and exhibit high formability, impact resistance, and adhesion. However, invention example 83 using polyolefin resin with a slightly high percentage of functional group derived from carboxylic acid and invention example 87 using polyolefin resin with a slightly high glass-transition temperature have a tendency toward slightly deteriorated low-temperature impact resistance. On the other hand, comparative examples 40 to 42 are mixed resins in which polyolefin resin containing a functional group derived from carboxylic acid whose percentage deviates from the range of the present invention is dispersed in polyester resin, and have inferior formability and impact resistance.

Comparative example 43 is a resin in which modified polyolefin resin with group derived from carboxylic acid and polyester resin are simply mixed with each other, and has greatly deteriorated formability and impact resistance because modified polyolefin resin is not dispersed in polyester resin in a fine granular form.

Invention examples 88 to 95 are resins in which the blending ratio and dispersion state of modified polyolefin resin in polyester resin are changed variously in the range of the present invention, and exhibit high formability, impact resistance, and adhesion. However, the resin of invention example 88 containing a small amount of dispersed-modified polyolefin resin and the resin of invention example 94 having a very large number of grains of modified polyolefin resin have a tendency toward slightly deteriorated low-temperature impact resistance.

On the other hand, comparative examples 36 to 39 are resins in which the blending ratio of modified polyolefin resin in polyester resin does not meet requirement of the present invention, and have greatly deteriorated formability and impact resistance. Comparative examples 36 and 37 containing a small amount of dispersed modified polyolefin resin have greatly deteriorated room-temperature impact resistance, and comparative examples 38 and 39 containing a large amount of modified polyolefin resin have greatly deteriorated formability.

Invention examples 96 to 100 are resins in which titanium dioxide pigment is mixed with a mixed resin of modified polyolefin resin and polyester resin, and exhibit high formability, impact resistance, and adhesion, and also provide a white uniform color tone. However, invention example 96 in which the added amount of pigment is smaller than a desired range has slightly insufficient opacifying property of color tone. On the other hand, invention example 100 in which the added amount of pigment is larger than a desired range has slightly deteriorated formability.

Invention examples 101 to 105 are resins in which the thickness thereof is changed in the range of the present invention, and exhibit high formability, impact resistance, and adhesion. Invention examples 101 and 105 are resins in which the thickness thereof exceeds the desired range of the present invention, and have slightly lower formability and impact resistance than the case of desired film thickness.

Invention examples 75 to 79 are resins obtained by changing the extrusion laminating conditions in the range of the present invention. If the conditions are within the range of the present invention, high formability, impact resistance, and adhesion are exhibited regardless of the laminating temperature. Invention example 75 was laminated under conditions lower than the desired lower limit of laminating temperature range, and invention example 79 was laminated under conditions exceeding the desired upper limit of laminating temperature range, so that these invention examples have slightly deteriorated formability and temperature impact resistance.

Invention examples 106 to 108 are resins in which a lubricant, free radical inhibitor, and compatibilizing agent are mixed, respectively, in a mixed resin of modified polyolefin resin and polyester resin of the present invention, and exhibit high formability, impact resistance, and adhesion. Further, invention examples 106 to 108 also have lubricity, free radical deterioration resistance, and compatibility depending on the function of added additive, and in particular, invention example 108 exhibits excellent low-temperature impact resistance.

TABLE 5

| Laminated metal sheet | Polyester resin Resin type | Additive | Pigment Kind | Content *1) | Polyolefin resin Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) |
|---|---|---|---|---|---|---|---|---|---|---|
| Invention example 74 | PET/I(18) | None | None | 0 | EM4 | 8 | <−30 | 15 | 14 | 2500 |
| Invention example 75 | PET/I(10) | None | None | 0 | EM4 | 8 | <−30 | 15 | 14 | 2500 |
| Invention example 76 | PET/I(10) | None | None | 0 | EM4 | 8 | <−30 | 15 | 14 | 2500 |
| Invention example 77 | PET/I(10) | None | None | 0 | EM4 | 8 | <−30 | 15 | 14 | 2500 |
| Invention example 78 | PET/I(10) | None | None | 0 | EM4 | 8 | <−30 | 15 | 14 | 2500 |
| Invention example 79 | PET/I(10) | None | None | 0 | EM4 | 8 | <−30 | 15 | 14 | 2500 |
| Invention example 80 | PET/I(5) | None | None | 0 | EM4 | 8 | <−30 | 15 | 14 | 2500 |
| Invention example 81 | PET/I(2) | None | None | 0 | EM4 | 8 | <−30 | 15 | 14 | 2500 |
| Invention example 82 | PET | None | None | 0 | EM4 | 8 | <−30 | 15 | 14 | 2500 |
| Invention example 83 | PET/I(10) | None | None | 0 | EM2 | 18 | <−30 | 15 | 15 | 1000 |
| Invention example 84 | PET/I(10) | None | None | 0 | EM4 | 8 | <−30 | 15 | 14 | 2500 |
| Invention example 85 | PET/I(10) | None | None | 0 | EM5 | 7 | <−30 | 15 | 14 | 2500 |
| Invention example 86 | PET/I(10) | None | None | 0 | EM6 | 5 | <−30 | 15 | 14 | 2500 |
| Invention example 87 | PET/I(10) | None | None | 0 | EM8 | 6 | 20 | 15 | 14 | 2500 |
| Invention example 88 | PET/I(10) | None | None | 0 | EM3 | 11 | <−30 | 5 | 4 | 4 |
| Invention example 89 | PET/I(10) | None | None | 0 | EM3 | 11 | <−30 | 5 | 8 | 100 |
| Invention example 90 | PET/I(10) | None | None | 0 | EM3 | 11 | <−30 | 10 | 10 | 50 |
| Invention example 91 | PET/I(10) | None | None | 0 | EM3 | 11 | <−30 | 10 | 12 | 500 |
| Invention example 92 | PET/I(10) | None | None | 0 | EM3 | 11 | <−30 | 15 | 18 | 800 |
| Invention example 93 | PET/I(10) | None | None | 0 | EM3 | 11 | <−30 | 15 | 20 | 22000 |
| Invention example 94 | PET/I(10) | None | None | 0 | EM3 | 11 | <−30 | 20 | 24 | 250000 |
| Invention example 95 | PET/I(10) | None | None | 0 | EM3 | 11 | <−30 | 25 | 22 | 10000 |
| Invention example 96 | PET/I(10) | None | TiO$_2$ | 3 | EM5 | 7 | <−30 | 15 | 14 | 2500 |
| Invention example 97 | PET/I(10) | None | TiO$_2$ | 7 | EM5 | 7 | <−30 | 15 | 14 | 2500 |
| Invention example 98 | PET/I(10) | None | TiO$_2$ | 15 | EM5 | 7 | <−30 | 15 | 14 | 2500 |
| Invention example 99 | PET/I(10) | None | TiO$_2$ | 30 | EM5 | 7 | <−30 | 15 | 14 | 2500 |
| Invention example 100 | PET/I(10) | None | TiO$_2$ | 50 | EM5 | 7 | <−30 | 15 | 14 | 2500 |

*1) Pigment content means weight percentage (wt %) of pigment with respect to total film amount of entire resin and pigment.

TABLE 6

| Laminated metal sheet | Polyester resin | | Pigment | | Polyolefin resin | | | | | Number of grains with diameter of 0.1 to 5 μm in cube with one side of 10 μm (grains) |
|---|---|---|---|---|---|---|---|---|---|---|
| | Resin type | Additive | Kind | Content *1) | Resin type | Weight percentage of functional group derived from carboxylic acid (wt %) | Tg (° C.) | Blending ratio in entire resin (wt %) | Volume percentage of grains with diameter of 0.1 to 5 μm (vol %) | |
| Invention example 101 | PET/I(10) | None | None | 0 | EM6 | 5 | <−30 | 15 | 14 | 2500 |
| Invention example 102 | PET/I(10) | None | None | 0 | EM6 | 5 | <−30 | 15 | 14 | 2500 |
| Invention example 103 | PET/I(10) | None | None | 0 | EM6 | 5 | <−30 | 15 | 14 | 2500 |
| Invention example 104 | PET/I(10) | None | None | 0 | EM6 | 5 | <−30 | 15 | 14 | 2500 |
| Invention example 105 | PET/I(10) | None | None | 0 | EM6 | 5 | <−30 | 15 | 14 | 2500 |
| Invention example 106 | PET/I(10) | *2) 0.3 wt % | None | 0 | EM3 | 11 | <−30 | 15 | 14 | 2500 |
| Invention example 107 | PET/I(10) | *3) 0.1 wt % | None | 0 | EM3 | 11 | <−30 | 15 | 14 | 2500 |
| Invention example 108 | PET/I(10) | *4) 3 wt % | None | 0 | EM3 | 11 | <−30 | 15 | 14 | 2500 |
| Invention example 109 | PET70% + PET/I(10)30% | None | None | 0 | EM4 | 8 | <−30 | 15 | 14 | 2500 |
| Invention example 110 | PET40% + PET/I(18)60% | None | None | 0 | EM4 | 8 | <−30 | 15 | 14 | 2500 |
| Comparative example 31 | PET/I(18) | None | None | 0 | None | — | — | 0 | 0 | 0 |
| Comparative example 32 | PET/I(10) | None | None | 0 | None | — | — | 0 | 0 | 0 |
| Comparative example 33 | PET/I(5) | None | None | 0 | None | — | — | 0 | 0 | 0 |
| Comparative example 34 | PET/I(2) | None | None | 0 | None | — | — | 0 | 0 | 0 |
| Comparative example 35 | PET | None | None | 0 | None | — | — | 0 | 0 | 0 |
| Comparative example 36 | PET/I(10) | None | None | 0 | EM3 | 11 | <−30 | 2 | 3 | 5 |
| Comparative example 37 | PET/I(10) | None | None | 0 | EM3 | 11 | <−30 | 2 | 3 | 50 |
| Comparative example 38 | PET/I(10) | None | None | 0 | EM3 | 11 | <−30 | 35 | 30 | 20000 |
| Comparative example 39 | PET/I(10) | None | None | 0 | EM3 | 11 | <−30 | 35 | 30 | 130000 |
| Comparative example 40 | PET/I(10) | None | None | 0 | EM1 | 21 | <−30 | 15 | 16 | 50 |
| Comparative example 41 | PET/I(10) | None | None | 0 | EM7 | 1 | <−30 | 15 | 4 | 40 |
| Comparative example 42 | PET/I(10) | None | None | 0 | EPR | 0 | <−30 | 15 | 1 | 4 |
| Comparative example 43 | PET/I(10) | None | TiO$_2$ | 3 | EM5 | 7 | <−30 | 15 | Not dispersed in fine grains | Not dispersed in fine grains |

*1) Pigment content means weight percentage (wt %) of pigment with respect to total film amount of entire resin and pigment.
*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond First 20B (manufactured by Sumitomo Chemical Co., Ltd.) of compatibilizing agent is added by 3 weight part to 100 weight part of mixed resin.

TABLE 7

| Laminated metal sheet | Melting point of mixed resin (melting point of polyester resin) (°C.) | Melting temp. of mixed resin (°C.) | Resin thickness (μm) | Thin-wall deep drawn can | | | | | Drawn and ironed can (DI can) | | | | |
|---|---|---|---|---|---|---|---|---|---|---|---|---|---|
| | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Invention example 74 | 215 | 235 | 25 | ⊚ | ⊚ | ⊚ | ⊚ | ⊚ | ⊚ | ⊚ | ⊚ | ⊚ | ○ |
| Invention example 75 | 230 | 235 | 25 | ⊚ | ⊚ | ⊚ | ⊚ | ⊚ | ○ | ○ | ⊚ | ○ | ⊚ |
| Invention example 76 | 230 | 240 | 25 | ⊚ | ⊚ | ⊚ | ⊚ | ⊚ | ⊚ | ⊚ | ⊚ | ⊚ | ⊚ |
| Invention example 77 | 230 | 250 | 25 | ⊚ | ⊚ | ⊚ | ⊚ | ⊚ | ⊚ | ⊚ | ⊚ | ⊚ | ⊚ |
| Invention example 78 | 230 | 265 | 25 | ⊚ | ⊚ | ⊚ | ⊚ | ⊚ | ⊚ | ⊚ | ⊚ | ⊚ | ⊚ |
| Invention example 79 | 230 | 275 | 25 | ⊚ | ⊚ | ⊚ | ⊚ | ⊚ | ○ | ○ | ○ | ○ | ○ |
| Invention example 80 | 255 | 275 | 25 | ⊚ | ⊚ | ⊚ | ⊚ | ⊚ | ⊚ | ⊚ | ⊚ | ⊚ | ⊚ |
| Invention example 81 | 250 | 270 | 25 | ⊚ | ⊚ | ⊚ | ⊚ | ⊚ | ⊚ | ⊚ | ⊚ | ⊚ | ⊚ |
| Invention example 82 | 255 | 275 | 25 | ⊚ | ⊚ | ⊚ | ⊚ | ⊚ | ○ | ○ | ○ | ○ | ○ |
| Invention example 83 | 230 | 250 | 25 | ⊚ | ⊚ | ⊚ | ⊚ | ⊚ | ⊚ | ⊚ | ⊚ | ⊚ | ⊚ |
| Invention example 84 | 230 | 250 | 25 | ⊚ | ⊚ | ⊚ | ⊚ | ⊚ | ⊚ | ⊚ | ⊚ | ⊚ | ⊚ |
| Invention example 85 | 230 | 250 | 25 | ⊚ | ⊚ | ⊚ | ⊚ | ⊚ | ⊚ | ⊚ | ⊚ | ⊚ | ⊚ |
| Invention example 86 | 230 | 250 | 25 | ⊚ | ⊚ | ⊚ | ⊚ | ⊚ | ○ | ○ | ○ | ○ | ○ |
| Invention example 87 | 230 | 250 | 25 | ⊚ | ⊚ | ⊚ | ⊚ | ⊚ | ⊚ | ⊚ | ⊚ | ⊚ | ⊚ |
| Invention example 88 | 230 | 250 | 25 | ⊚ | ⊚ | ⊚ | ⊚ | ⊚ | ⊚ | ⊚ | ⊚ | ⊚ | ⊚ |
| Invention example 89 | 230 | 250 | 25 | ⊚ | ⊚ | ⊚ | ⊚ | ⊚ | ⊚ | ⊚ | ⊚ | ⊚ | ⊚ |
| Invention example 90 | 230 | 250 | 25 | ⊚ | ⊚ | ⊚ | ⊚ | ⊚ | ○ | ○ | ○ | ○ | ○ |
| Invention example 91 | 230 | 250 | 25 | ⊚ | ⊚ | ⊚ | ⊚ | ⊚ | ⊚ | ⊚ | ⊚ | ⊚ | ⊚ |
| Invention example 92 | 230 | 250 | 25 | ⊚ | ⊚ | ⊚ | ⊚ | ⊚ | ⊚ | ⊚ | ⊚ | ⊚ | ⊚ |
| Invention example 93 | 230 | 250 | 25 | ⊚ | ⊚ | ⊚ | ⊚ | ⊚ | ⊚ | ⊚ | ⊚ | ⊚ | ⊚ |
| Invention example 94 | 230 | 250 | 25 | ⊚ | ⊚ | ⊚ | ⊚ | ⊚ | ○ | ○ | ○ | ○ | ○ |
| Invention example 95 | 230 | 250 | 25 | ⊚ | ⊚ | ⊚ | ⊚ | ⊚ | ⊚ | ⊚ | ⊚ | ⊚ | ⊚ |
| Invention example 96 | 230 | 250 | 25 | ⊚ | ⊚ | ⊚ | ⊚ | ⊚ | ⊚ | ⊚ | ⊚ | ⊚ | ⊚ |
| Invention example 97 | 230 | 250 | 25 | ⊚ | ⊚ | ⊚ | ⊚ | ⊚ | ⊚ | ⊚ | ⊚ | ⊚ | ⊚ |
| Invention example 98 | 230 | 250 | 25 | ⊚ | ⊚ | ⊚ | ⊚ | ⊚ | ⊚ | ⊚ | ⊚ | ⊚ | ⊚ |
| Invention example 99 | 230 | 250 | 25 | ⊚ | ⊚ | ⊚ | ⊚ | ⊚ | ⊚ | ⊚ | ⊚ | ⊚ | ⊚ |
| Invention example 100 | 230 | 250 | 25 | ⊚ | ⊚ | ⊚ | ⊚ | ⊚ | ○ | ⊚ | ⊚ | ○ | ⊚ |

*1) Pigment content means weight percentage (wt %) of pigment with respect to total film amount of entire resin and pigment.

TABLE 8

| Laminated metal sheet | Melting point of mixed resin (melting point of polyester resin) (°C) | Melting temp. of mixed resin (°C) | Resin thickness (μm) | Thin-wall deep drawn can | | | | | Drawn and ironed can (DI can) | | | | |
|---|---|---|---|---|---|---|---|---|---|---|---|---|---|
| | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Invention example 101 | 230 | 250 | 6 | ⊙ | ⊙ | ⊙⊙ | ⊙ | ⊙ | ○ | ⊙ | ⊙ | ⊙ | ⊙ |
| Invention example 102 | 230 | 250 | 15 | ⊙ | ⊙ | ⊙⊙ | ⊙ | ⊙ | ⊙ | ⊙ | ⊙⊙ | ⊙ | ⊙ |
| Invention example 103 | 230 | 250 | 20 | ⊙ | ⊙ | ⊙⊙ | ⊙ | ⊙ | ⊙ | ⊙ | ⊙⊙ | ⊙ | ⊙ |
| Invention example 104 | 230 | 250 | 40 | ⊙ | ⊙ | ⊙⊙ | ⊙ | ⊙ | ⊙ | ⊙ | ⊙⊙ | ⊙ | ⊙ |
| Invention example 105 | 230 | 250 | 55 | ⊙ | ⊙ | ⊙⊙ | ⊙ | ⊙ | ○ | ⊙ | ⊙⊙ | ⊙ | ⊙ |
| Invention example 106 | 230 | 250 | 25 | ⊙ | ⊙ | ⊙⊙ | ⊙ | ⊙ | ⊙ | ⊙ | ⊙⊙ | ⊙ | ⊙ |
| Invention example 107 | 230 | 250 | 25 | ⊙ | ⊙ | ⊙⊙ | ⊙ | ⊙ | ⊙ | ⊙ | ⊙⊙⊙ | ⊙ | ⊙ |
| Invention example 108 | 230 | 275 | 25 | ⊙ | ⊙ | ⊙⊙ | ⊙ | ⊙ | ⊙ | ⊙ | ⊙⊙ | ⊙ | ⊙ |
| Invention example 109 | 255 | 275 | 25 | ⊙ | ⊙ | ⊙⊙ | ⊙ | ⊙ | ○ | ⊙ | ⊙⊙ | ⊙ | ⊙ |
| Invention example 110 | 255 | 275 | 25 | ⊙ | ⊙ | ⊙⊙ | ⊙ | ⊙ | ○ | ⊙ | ⊙⊙ | ⊙ | ⊙ |
| Comparative example 31 | 230 | 250 | 25 | ⊙ | ⊙ | ⊙⊙ | ⊙ | ⊙ | △ | XX | △ | △ | △ |
| Comparative example 32 | 255 | 275 | 25 | ⊙ | ⊙ | ⊙⊙ | ⊙ | ⊙ | △ | XX | △ | △ | ○ |
| Comparative example 33 | 250 | 270 | 25 | ⊙ | ⊙ | ⊙⊙ | ⊙ | ⊙ | ⊙ | XX | △ | △ | ○ |
| Comparative example 34 | 255 | 275 | 25 | ⊙ | ⊙ | ⊙⊙ | ⊙ | ⊙ | X | XX | △ | X | ○ |
| Comparative example 35 | 230 | 250 | 25 | ⊙ | ⊙ | ⊙⊙ | ⊙ | ⊙ | XX | XX | △ | XX | △ |

TABLE 8-continued

| Laminated metal sheet | Melting point of mixed resin (melting point of polyester resin) (°C) | Melting temp. of mixed resin (°C) | Resin thickness (μm) | Thin-wall deep drawn can | | | | | Drawn and ironed can (DI can) | | | | |
|---|---|---|---|---|---|---|---|---|---|---|---|---|---|
| | | | | Formability | Impact resistance (room temp.) | Impact resistance (low temp.) | Adhesion after forming | Adhesion after heating | Formability | Impact resistance (room temp.) | Impact resistance (low temp.) | Adhesion after forming | Adhesion after heating |
| Comparative example 36 | 230 | 250 | 25 | ⊚ | ⊚ | ⊚⊚ | ⊚ | ⊚ | ○ | XX | △ | △ | ○ |
| Comparative example 37 | 230 | 250 | 25 | ⊚ | ⊚ | ⊚⊚ | ⊚ | ⊚ | ○ | X | △ | ○ | ⊚ |
| Comparative example 38 | 230 | 250 | 25 | ⊚ | ⊚ | ⊚⊚ | ⊚ | ⊚ | X | △ | △ | X | ○ |
| Comparative example 39 | 230 | 250 | 25 | ⊚ | ⊚ | ⊚⊚ | ⊚ | ⊚ | XX | △ | △ | XX | ○ |
| Comparative example 40 | 230 | 250 | 25 | ⊚ | ⊚ | ⊚⊚ | ⊚ | ⊚ | X | △ | △ | ○ | ○ |
| Comparative example 41 | 230 | 250 | 25 | ⊚ | ⊚ | ⊚⊚ | ⊚ | ⊚ | △ | X | △ | ○ | △ |
| Comparative example 42 | 230 | 250 | 25 | ⊚ | ⊚ | ⊚⊚ | ⊚ | ⊚ | X | XX | △ | X | X |
| Comparative example 43 | 230 | 250 | 25 | ⊚ | ⊚ | ⊚⊚ | ⊚ | ⊚ | XX | XX | △ | XX | △ |

*1) Pigment content means weight percentage (wt %) of pigment with respect to total film amount of entire resin and pigment.
*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond First 20B (manufactured by Sumitomo Chemical Co., Ltd.) of compatibilizing agent is added by 3 weight part to 100 weight part of mixed resin.

Example 3

As a resin raw material, modified polyolefin resin with group derived from carboxylic acid was cold blended with polyester resin in a blending ratio given in Tables 9 to 12 by using a tumbler blender, and then the blended resin was melted and kneaded at 270° C. by using a two-axis extruding machine, by which a raw material pellet of polyester resin in which modified polyolefin resin was dispersed was obtained. The obtained raw material resin pellet was inserted in a one-axis extruding machine, and was extruded from a multi-manifold type T die while being controlled by the discharge amount of molten resin from the extruding machine, by which a resin film with a total thickness of 10 to 50 µm was manufactured continuously while being cooled by the surface of a rotating metallic roll.

On the other hand, in the case of film of two-layer construction, modified polyolefin resin with group derived from carboxylic acid, which was a resin raw material for R1 layer, was cold blended with polyester resin in a blending ratio given in Tables 9 to 12 by using a tumbler blender, and then the blended resin was melted and kneaded at 270° C. by using a two-axis extruding machine, by which a raw material pellet of polyester resin in which modified polyolefin resin was dispersed was obtained. The obtained raw material resin pellet was inserted in a one-axis extruding machine, and on the other hand, polyester resin containing no modified polyolefin resin, which was a resin raw material for R0 layer, was inserted in a separate one-axis extruding machine, and each of molten resins was introduced into a multi-manifold type T die and extruded in two layers while being controlled by the discharge amount of molten resin from the extruding machine, by which a resin film was manufactured continuously while being cooled by the surface of a rotating metallic roll.

The used polyester resin and modified polyolefin resin with group derived from carboxylic acid were as follows:

1. Polyester Resin (1) PET: Polyethylene terephthalate resin, intrinsic viscosity: 0.62 dl/g (2) PET/I (10): Isophthalic acid copolymerized resin with a ratio of terephthalic acid to isophthalic acid of 90:10, intrinsic viscosity: 0.6 dl/g (3) PET/PBT (60): mixed resin with a ratio of polyethylene terephthalate to polybutylene terephthalate of 40:60, intrinsic viscosity: 0.6 dl/g (4) PET/AD(20): Adipic acid copolymerized polyethylene terephthalate copolymerized resin with a ratio of terephthalic acid to adipic acid of 80:20, intrinsic viscosity: 0.6 dl/g 2. Modified Polyolefin Resin with Group Derived from Carboxylic Acid (1) EM1: Polymethyl methacrylate-(ethylene-ethyl acrylate copolymer) graft copolymer (Modiper A5200 manufactured by NOF Corp.), weight ratio of functional group derived from carboxylic acid: 21 wt %, glass-transition temperature: −30° C. or lower (2) EM2: Polymethyl methacrylate-(ethylene-ethyl acrylate-maleic anhydride copolymer) graft copolymer (Modiper A8200 manufactured by NOF Corp.), weight ratio of functional group derived from carboxylic acid: 18 wt %, glass-transition temperature: −30° C. or lower (3) EM3: Ethylene-ethyl acrylate-maleic anhydride copolymer (Bondine HX8290 manufactured by Sumitomo Chemical Co., Ltd.), weight ratio of functional group derived from carboxylic acid: 11 wt %, glass-transition temperature: −30° C. or lower (4) EM4: Ethylene-methacrylic acid copolymer (Nucrel N1560 manufactured by Mitsui-DuPont Polychemical Co., Ltd.), weight ratio of functional group derived from carboxylic acid: 8 wt %, glass-transition temperature: −30° C. or lower (5) EM5: 50% Zn neutralized substance of ethylene-methacrylic acid copolymer (Nucrel N1560 manufactured by Mitsui-DuPont Polychemical Co., Ltd. neutralized partially by Zn), weight ratio of functional group derived from carboxylic acid: 7 wt %, glass-transition temperature: −30° C. or lower (6) EM6: 60% Zn neutralized substance of ethylene-methacrylic acid copolymer (Himilan 1557 manufactured by Mitsui-DuPont Polychemical Co., Ltd.), weight ratio of functional group derived from carboxylic acid: 5 wt %, glass-transition temperature: −30° C. or lower (7) EM7: Ethylene-methacrylic acid copolymer (Nucrel N0200H manufactured by Mitsui-DuPont Polychemical Co., Ltd.), weight ratio of functional group derived from carboxylic acid: 1 wt %, glass-transition temperature: −30° C. or lower (8) EM8: Polystyrene-(ethylene-ethyl acrylate copolymer) graft copolymer (Modiper A5100 manufactured by NOF Corp.), weight ratio of functional group derived from carboxylic acid: 6 wt %, glass-transition temperature: 20° C.

(9) EPR: Ethylene-propylene rubber (EP07P manufactured by JSR Corp.), weight ratio of functional group derived from carboxylic acid: 0 wt %, glass-transition temperature: −30° C. or lower Furthermore, a commercially available resin (Sealer PT4274 manufactured by Mitsui-DuPont Polychemical Co., Ltd.) that had been pelletized in advance in a state in which modified polyolefin resin with group derived from carboxylic acid was dispersed in polyester resin, which was used as a resin raw material, was inserted in a one-axis extruding machine in blending ratios shown in invention examples 32 and 36 in Table 11, and was extruded from a multi-manifold type T die while being controlled by the discharge amount of molten resin from the extruding machine, by which resin films of single layer and two layers were manufactured continuously while being cooled by the surface of a rotating metallic roll.

A resin laminated metal sheet was obtained by a thermocompression bonding method in which the resin film obtained as described above was hot-pressed on both surfaces of a tin-free steel (hereinafter abbreviated to TFS, thickness: 0.18 mm for thin-wall deep drawn can and 0.23 mm for DI can, degree of temper: DR9, metallic chromium layer: 80 mg/m$^2$, chromium oxide layer: 15 mg/m$^2$ (metallic chromium conversion)) heated by an induction heating system, and then the laminated metal sheet was rapidly cooled in water. The metal sheet temperature at the laminating time (laminating temperature) is given in Tables 13 and 14.

The grain diameter of modified polyolefin resin dispersed in R1 layer of resin film, various temperatures in the table, and the plane orientation coefficient of resin laminated metal sheet were measured by the same method as that in Example 1.

A thin-wall deep drawn can or a DI can was manufactured from the laminated metal sheet obtained as described above, and the can was subjected to straightening heat treatment to manufacture a sample can. The formability, impact resistance (room temperature, low temperature), adhesion after forming, adhesion after heating, and flavor property of film of the manufactured can body were investigated.

The following is a detailed description of the investigation method.

1. Evaluation by Thickness-decreasing Deep Drawing 1-1 Can Manufacturing

A resin laminated metal sheet was subjected to first-stage drawing and redrawing under the following conditions, by which a thin-wall deep drawn can was obtained.

First-stage drawing
    Blank diameter . . . 150 to 160 mm
    First-stage drawing . . . drawing ratio: 1.65

Redrawing
    Primary redrawing . . . drawing ratio: 1.25
    Secondary redrawing . . . drawing ratio: 1.25
    Radius of curvature of die corner in redrawing process . . . . 0.4 mm
    Load for pressing wrinkle at the time of redrawing . . . 39227N (4000 kg)

Average thickness decreasing percentage of can sidewall
    40 to 55% with respect to thickness of resin laminated metal sheet before forming 1-2 Straightening Heat Treatment.

Forming strain of film caused by can manufacturing was removed by keeping the can in a thermal environment of film melting point minus 15° C. for 30 seconds and then by rapidly cooling it.

(1) Formability

Evaluation was made as described below by the limit of capability for manufacturing can without film failure. Grades not lower than ○ marked grade are acceptable.

Limit of forming (thickness decreasing percentage): Grade
Incapable of forming at thickness decreasing percentage of 40%: (Inferior)
Capable of forming up to thickness decreasing percentage of 40%
Capable of forming up to thickness decreasing percentage of 45%
Capable of forming up to thickness decreasing percentage of 50%
Capable of forming up to thickness decreasing percentage of 55%: (Superior)

(2) Evaluation of Room-temperature and Low-temperature Impact Resistance

A can body (thickness decreasing percentage: 50%) subjected to straightening heat treatment was necked, and the can body was filled with distilled water. After a lid was installed and tightened, an iron ball of 0.5 kg was dropped from a height of 30 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(Evaluation of Low-temperature Impact Resistance)

Test Result: Grade
Current value not lower than 50 mA: (Inferior)
Current value not lower than 30 mA and lower than 50 mA
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion after Forming

The internal surface of can body subjected to straightening heat treatment was cleaned, and the can was immersed in aqueous solution containing 1.5 wt % citric acid and 1.5 wt % sodium chloride for 24 hours. Thereafter, the peeling length of resin in the can end portion was observed, and evaluation was made as described below. Grades not lower than ○ marked grade are acceptable.

Test Result: Grade
Peeling length longer than 10 mm: (Inferior)
Peeling length longer than 5 mm and not longer than 10 mm
Peeling length longer than 2 mm and not longer than 5 mm
Peeling length not longer than 2 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling-percentage higher than 10%: (Inferior)
Peeling percentage higher than 5% and not higher than 10%
Peeling percentage higher than 2% and not higher than 5%
Peeling percentage higher than 0.5% and not higher than 2%
Peeling percentage not higher than 0.5%
No peeling: (Superior)

(5) Flavor Property

The internal surface of can body subjected to straightening heat treatment was cleaned, and flavor aqueous solution (d-limonene 20 ppm aqueous solution) was put in the can and left at ordinary temperature for 20 days after sealing. Thereafter, the can was unsealed, and a portion expelled by ether immersion was determined by gas chromatography as adsorption of d-limonene per can, by which flavor property was evaluated. Grades not lower than ○ marked-grade are acceptable.

Test Result: Grade
Adsorption larger than 200 μg/can: (Inferior)
Adsorption larger than 100 μg/can and not larger than 200 μg/can
Adsorption larger than 30 μg/can and not larger than 100 μg/can
Adsorption larger than 10 μg/can and not larger than 30 μg/can
Adsorption not larger than 10 μg/can: (Superior)

2. Evaluation by Drawing and Ironing (DI Forming)

2-1 Can Manufacturing

A resin laminated metal sheet was drawn and ironed under the following conditions, by which a DI can was obtained.
First-stage drawing
  Blank diameter: 150 mm
  Drawing ratio: 1.6
Second-stage drawing
  Drawing ratio: 1.25
Ironing
  Ironing punch diameter: 3-stage ironing 65.8 mm dia
Total ironing percentage of can sidewall
  55 to 70% with respect to thickness of resin laminated metal sheet before forming 2-2 Straightening Heat Treatment Forming strain of film caused by can manufacturing was removed by keeping the can in a thermal environment of film melting point minus 15° C. for 30 seconds and then by rapidly cooling it.

(1) Formability

Evaluation was made as described below by the limit of capability for manufacturing can without film failure. Grades not lower than ○ marked grade are acceptable.

Limit of forming (total ironing percentage): Grade
Incapable of forming at total ironing percentage of 55%: (Inferior)
Capable of forming up to total ironing percentage of 55%
Capable of forming up to total ironing percentage of 60%
Capable of forming up to total ironing percentage of 65%
Capable of forming up to total ironing percentage of 70%: (Superior)

(2) Evaluation of Room-temperature and Low-temperature Impact Resistance

A can body (total-ironing percentage: 65%) subjected to straightening heat treatment was necked, and the can body was filled with distilled water. After a lid was installed and tightened, an iron ball of 0.5 kg was dropped from a height of 25 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA (Superior)

(Evaluation of Low-temperature Impact Resistance)

Test Result: Grade
Current value not lower than 50 mA: (Inferior)
Current value not lower than 30 mA and lower than 50 mA
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for five hours. Thereafter, the peeling length of resin in the can end portion was observed, and evaluation was made as described below. Grades not lower than ○ marked grade are acceptable.

Test Result: Grade
Peeling length longer than 10 mm: (Inferior)
Peeling length longer than 5 mm and not longer than 10 mm
Peeling length longer than 2 mm and not longer than 5 mm
Peeling length not longer than 2 mm
No peeling: (Superior)

(4) Adhesion After Heating

The internal surface of can body subjected to straightening heat treatment was cleaned, and the can was heated without content therein at 210° C., for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 10%: (Inferior)
Peeling percentage higher than 5% and not higher than 10%
Peeling percentage higher than 2% and not higher than 5%
Peeling percentage higher than 0.5% and not higher than 2%
Peeling percentage not higher than 0.5%
No peeling: (Superior)

(5) Flavor Property.

The internal surface of can body subjected to straightening heat treatment was cleaned, and flavor aqueous solution (d-limonene 20 ppm aqueous solution) was put in the can and left at ordinary temperature for 20 days after sealing. Thereafter, the can was unsealed, and a portion expelled by ether immersion was determined by gas chromatography as adsorption of d-limonene per can, by which flavor property was evaluated. Grades not lower than ○ marked grade are acceptable.

Test Result: Grade
Adsorption larger than 200 μg/cane: (Inferior)
Adsorption larger than 100 μg/can and not larger than 200 μg/can
Adsorption larger than 30 μg/can and not larger than 100 μg/can
Adsorption larger than 10 μg/can and not larger than 30 μg/can
Adsorption not larger than 10 μg/can: (Superior)

The investigation results are given in Tables 13 and 14.

From Tables 9 to 14, the following facts are found for either can type.

Invention examples 1 to 3 and 5 are films in which modified polyolefin resin specified in the present invention is dispersed in polyester resin in which polyester type of mixed resin is change variously in a single layer, and invention examples 37 to 39 and 41 in which the films are laminated under the laminating conditions of the present invention exhibit very high formability, impact resistance, adhesion, and flavor property. Among these, invention example 39 in which the film of invention example 3 using adipic acid copolymerized polyethylene terephthalate resin is laminated has a high performance as a whole, but has a tendency toward deteriorated adhesion after heating and flavor property because of slightly low melting point of polyester resin and slightly low barrier property. Also, invention examples 68 and 72 in which invention examples 32 and 36 of films manufactured from a commercially available resin in which modified polyolefin resin is dispersed in polyester resin are laminated under the laminating conditions of the present invention similarly exhibit high performance. On the other hand, comparative examples 1 to 5 are examples of films in which polyolefin resin is not contained in polyester resin in which polyester type is changed variously. Comparative examples 15 to 19 in which these films are laminated have especially low levels of formability and impact resistance.

Invention examples 4 to 8 are films using mixed resin in which various polyolefin resins of the present invention are dispersed in polyester resin, and invention examples 40 to 44 in which these films are laminated exhibit high formability, impact resistance, adhesion, and flavor property. However, invention example 44 in which the film of invention example 8 using polyolefin resin having a slightly high glass-transition temperature is laminated has a has a tendency-toward slightly deteriorated formability and impact resistance. On the other hand, comparative examples 10 to 12 are mixed resins in which polyolefin resin containing a functional group derived from carboxylic acid whose percentage deviates from the range of the present invention is dispersed in polyester resin, and comparative examples 24 to 26 in which these mixed resins are laminated have inferior formability and impact resistance.

Invention examples 9 to 16 are films in which the blending ratio and dispersion state of modified polyolefin resin in polyester resin are changed variously in the range of the present invention, and invention examples 45 to 52 in which the films are laminated under the laminating conditions of the present invention exhibit high formability, impact resistance, adhesion, and flavor property. However, invention example 45 in which the film of invention example 9 containing a small amount of dispersed modified polyolefin resin is laminated and invention example 51 in which the film of invention example 15 having a very large number of grains of modified polyolefin resin is laminated have a tendency toward slightly deteriorated impact resistance.

On the other hand, comparative examples 6 to 9 are films in which the blending ratio of modified polyolefin resin in polyester resin does not meet the requirement of the present invention, and comparative examples 20 to 23 in which the films are laminated under the laminating conditions of the present invention have greatly deteriorated formability and impact resistance. Comparative example 20 in which the film of comparative example 6 containing a small amount of dispersed modified polyolefin resin is laminated has greatly deteriorated room-temperature impact resistance, and comparative example 23 in which the film of comparative example 9 containing a large amount of modified polyolefin resin is laminated has greatly deteriorated formability.

Invention examples 27 to 31 are films in which titanium dioxide pigment is mixed with a mixed resin of modified polyolefin resin and polyester resin, and invention examples 63 to 67 in which the films are laminated under the laminating conditions of the present invention exhibit high formability, impact resistance, adhesion, and flavor property, and also provide a white uniform color tone. However, invention example 63 in which the film of invention example 27 in which the added amount of pigment is smaller than a desired range is laminated has slightly insufficient opacifying property of color tone. On the other hand, invention example 67 in which the film of invention example 31 in which the added amount of pigment is larger than a desired range is laminated has slightly deteriorated formability.

Invention examples 17 to 21 are films in which the blending ratio of polymerization catalyst and oxidation inhibitor in mixed resin is changed variously in the range of the present invention, and invention examples 53 to 57 in which the films are laminated under the laminating conditions of the present invention exhibit high formability, impact resistance, adhesion, and flavor property. However, invention example 53 containing a large amount of oxidation inhibitor has slightly deteriorated formability and impact resistance. On the other hand, comparative examples 27 and 28 in which the films of comparative examples 13 and 14 in which the blending ratio of polymerization catalyst and oxidation inhibitor in mixed resin deviates from the range of the present invention are laminated under the laminating conditions of the present invention have deteriorated formability, impact resistance, and adhesion.

Invention examples 22 and 23 are films in which the thickness of each layer of film is changed, and invention examples 58 and 59 in which the films are laminated under the laminating conditions of the present invention exhibit high formability, impact resistance, adhesion, and flavor property. Since the film of invention example 22 is slightly thin, invention example 58 in which this film is laminated has slightly deteriorated impact resistance.

Invention examples 41 and 73 to 76 are films obtained by changing the laminating conditions for the film of invention example 5 in the range of the present invention. If the conditions are within the range of the present invention, high formability, impact resistance, adhesion, and flavor property are exhibited regardless of the laminating temperature.

Invention examples 24 and 25 are films in which a lubricant, free radical inhibitor, and compatibilizing agent are mixed, respectively, in a mixed resin of modified polyolefin resin and polyester resin of the present invention, and invention examples 60 and 61 in which the films are laminated under the laminating conditions of the present invention exhibit high formability, impact resistance, adhesion, and flavor property. Further, invention examples 60 and 61 also have lubricity, free radical deterioration resistance, and compatibility depending on the function of added additive, and in particular, invention example 61 containing a compatibilizing agent exhibits excellent low-temperature impact resistance.

Invention example 26 is a film of the present invention that is manufactured by the two-axis stretching method, and invention examples 62 and 77 in which the film is laminated exhibit high performance. Invention example 77, which has a plane orientation coefficient of 0.015, exhibits a slightly deteriorated formability. Invention example 62, which has a plane orientation coefficient in the range of the present invention, exhibits very high formability and impact resistance.

Invention examples 33 to 36 are two-layer films in which a polyester resin layer containing no olefin is provided as an upper layer, and invention examples 69 to 72 in which the two-layer films are laminated have high low-temperature impact resistance and flavor property as compared with the single-layer film. However, invention example 71 in which the film of invention example 35 using a film containing polybutylene terephthalate as an upper layer is laminated has a slightly deteriorated flavor property.

TABLE 9

| | | | | | | | | | | | |
|---|---|---|---|---|---|---|---|---|---|---|---|
| | R1 layer | | | | | | | | | | |
| | Polyester resin | | | | | Polyolefin resin | | | | | |
| Sample film | Resin type | Polymerization catalyst (ppm) (X) | *1) Oxidation inhibitor (ppm) (Y) | X/Y | Additive | Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
| Invention example 1 | PET | GeO$_2$ 100 ppm | 400 ppm | 0.25 | None | EM4 | 8 | <−30 | 15 | 12 | 2000 | 22 |
| Invention example 2 | PET/PBT(60) | GeO$_2$ 100 ppm | 400 ppm | 0.25 | None | EM4 | 8 | <−30 | 15 | 12 | 2000 | 22 |
| Invention example 3 | PET/AD(20) | GeO$_2$ 100 ppm | 400 ppm | 0.25 | None | EM4 | 8 | <−30 | 15 | 12 | 2000 | 22 |
| Invention example 4 | PET/I(10) | GeO$_2$ 100 ppm | 400 ppm | 0.25 | None | EM2 | 18 | <−30 | 15 | 13 | 500 | 22 |
| Invention example 5 | PET/I(10) | GeO$_2$ 100 ppm | 400 ppm | 0.25 | None | EM4 | 8 | <−30 | 15 | 12 | 2000 | 22 |
| Invention example 6 | PET/I(10) | GeO$_2$ 100 ppm | 400 ppm | 0.25 | None | EM5 | 7 | <−30 | 15 | 12 | 2000 | 22 |
| Invention example 7 | PET/I(10) | GeO$_2$ 100 ppm | 400 ppm | 0.25 | None | EM6 | 5 | <−30 | 15 | 12 | 2000 | 22 |
| Invention example 8 | PET/I(10) | GeO$_2$ 100 ppm | 400 ppm | 0.25 | None | EM8 | 6 | 20 | 15 | 12 | 2000 | 22 |
| Invention example 9 | PET/I(10) | GeO$_2$ 100 ppm | 400 ppm | 0.25 | None | EM3 | 11 | <−30 | 5 | 3 | 3 | 22 |
| Invention example 10 | PET/I(10) | GeO$_2$ 100 ppm | 400 ppm | 0.25 | None | EM3 | 11 | <−30 | 5 | 5 | 70 | 22 |
| Invention example 11 | PET/I(10) | GeO$_2$ 100 ppm | 400 ppm | 0.25 | None | EM3 | 11 | <−30 | 10 | 8 | 30 | 22 |
| Invention example 12 | PET/I(10) | GeO$_2$ 100 ppm | 400 ppm | 0.25 | None | EM3 | 11 | <−30 | 10 | 10 | 250 | 22 |
| Invention example 13 | PET/I(10) | GeO$_2$ 100 ppm | 400 ppm | 0.25 | None | EM3 | 11 | <−30 | 15 | 15 | 500 | 22 |
| Invention example 14 | PET/I(10) | GeO$_2$ 100 ppm | 400 ppm | 0.25 | None | EM3 | 11 | <−30 | 15 | 18 | 20000 | 22 |
| Invention example 15 | PET/I(10) | GeO$_2$ 100 ppm | 400 ppm | 0.25 | None | EM3 | 11 | <−30 | 20 | 22 | 200000 | 22 |
| Invention example 16 | PET/I(10) | GeO$_2$ 100 ppm | 400 ppm | 0.25 | None | EM3 | 11 | <−30 | 28 | 20 | 8000 | 22 |
| Invention example 17 | PET/I(10) | GeO$_2$ 120 ppm | 600 ppm | 0.20 | None | EM6 | 5 | <−30 | 15 | 12 | 2000 | 22 |
| Invention example 18 | PET/I(10) | GeO$_2$ 100 ppm | 100 ppm | 1.0 | None | EM6 | 5 | <−30 | 15 | 12 | 2000 | 22 |
| Invention example 19 | PET/I(10) | GeO$_2$ 100 ppm | 10 ppm | 10 | None | EM6 | 5 | <−30 | 15 | 12 | 2000 | 22 |
| Invention example 20 | PET/I(10) | GeO$_2$ 50 ppm | 0.5 ppm | 100 | None | EM6 | 5 | <−30 | 15 | 12 | 2000 | 22 |
| Invention example 21 | PET/I(10) | GeO$_2$ 50 ppm | 0.05 ppm | 1000 | None | EM6 | 5 | <−30 | 15 | 12 | 2000 | 22 |
| Invention example 22 | PET/I(10) | GeO$_2$ 100 ppm | 400 ppm | 0.25 | None | EM6 | 5 | <−30 | 15 | 12 | 2000 | 10 |
| Invention example 23 | PET/I(10) | GeO$_2$ 100 ppm | 400 ppm | 0.25 | None | EM6 | 5 | <−30 | 15 | 12 | 2000 | 50 |
| Invention example 24 | PET/I(10) | GeO$_2$ 100 ppm | 400 ppm | 0.25 | *3) 3 wt % | EM3 | 11 | <−30 | 15 | 12 | 2000 | 22 |
| Invention example 25 | PET/I(10) | GeO$_2$ 100 ppm | 400 ppm | 0.25 | *4) 3 wt % | EM3 | 11 | <−30 | 15 | 12 | 2000 | 22 |
| Invention example 26 | PET/I(10) | GeO$_2$ 100 ppm | 400 ppm | 0.25 | None | EM4 | 8 | <−30 | 15 | 12 | 2000 | 22 |

*1) Tetrakis-[methylene (3,5-di-t-butyl-4-hydroxyhydrocinnamate)] methane is used as oxidation inhibitor.
*3) Silicone of lubricant is added by 3 weight part to 100 weight part of mixed resin.
*4) Bond First 20B (manufactured by Sumitomo Chemical Co., Ltd.) of compatibilizing agent is added by 3 weight part to 100 weight part of mixed resin.

TABLE 10

| Sample film | R0 layer Polyester resin Resin type | R0 layer Film thickness (μm) | Entire film Film thickness (R1 + R0) (μm) | Entire film Pigment Type | Entire film Pigment Content (wt %) *2) | Stretching |
|---|---|---|---|---|---|---|
| Invention example 1 | | | 22 | None | 0 | Non-stretched |
| Invention example 2 | | | 22 | None | 0 | Non-stretched |
| Invention example 3 | | | 22 | None | 0 | Non-stretched |
| Invention example 4 | | | 22 | None | 0 | Non-stretched |
| Invention example 5 | | | 22 | None | 0 | Non-stretched |
| Invention example 6 | | | 22 | None | 0 | Non-stretched |
| Invention example 7 | | | 22 | None | 0 | Non-stretched |
| Invention example 8 | | | 22 | None | 0 | Non-stretched |
| Invention example 9 | | | 22 | None | 0 | Non-stretched |
| Invention example 10 | | | 22 | None | 0 | Non-stretched |
| Invention example 11 | | | 22 | None | 0 | Non-stretched |
| Invention example 12 | | | 22 | None | 0 | Non-stretched |
| Invention example 13 | | | 22 | None | 0 | Non-stretched |
| Invention example 14 | | | 22 | None | 0 | Non-stretched |
| Invention example 15 | | | 22 | None | 0 | Non-stretched |
| Invention example 16 | | | 22 | None | 0 | Non-stretched |
| Invention example 17 | | | 22 | None | 0 | Non-stretched |
| Invention example 18 | | | 22 | None | 0 | Non-stretched |
| Invention example 19 | | | 22 | None | 0 | Non-stretched |
| Invention example 20 | | | 22 | None | 0 | Non-stretched |
| Invention example 21 | | | 22 | None | 0 | Non-stretched |
| Invention example 22 | | | 10 | None | 0 | Non-stretched |
| Invention example 23 | | | 50 | None | 0 | Non-stretched |
| Invention example 24 | | | 22 | None | 0 | Non-stretched |
| Invention example 25 | | | 22 | None | 0 | Non-stretched |
| Invention example 26 | | | 22 | None | 0 | Two-axis stretched |

*2) Pigment content means weight percentage (wt %) of pigment with respect to total film amount of entire resin and pigment.

TABLE 11

| | | R1 layer | | | | | | | | | |
|---|---|---|---|---|---|---|---|---|---|---|---|
| | | Polyester resin | | | | Polyolefin resin | | | | | |
| Sample film | Resin type | Polymerization catalyst (ppm) (X) | *1) Oxidation inhibitor (ppm) (Y) | X/Y | Additive | Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
| Invention example 27 | PET/I(10) | GeO$_2$ 100 ppm | 400 ppm | 0.25 | None | EM5 | 7 | <−30 | 15 | 12 | 2000 | 22 |
| Invention example 28 | PET/I(10) | GeO$_2$ 100 ppm | 400 ppm | 0.25 | None | EM5 | 7 | <−30 | 15 | 12 | 2000 | 22 |
| Invention example 29 | PET/I(10) | GeO$_2$ 100 ppm | 400 ppm | 0.25 | None | EM5 | 7 | <−30 | 15 | 12 | 2000 | 22 |
| Invention example 30 | PET/I(10) | GeO$_2$ 100 ppm | 400 ppm | 0.25 | None | EM5 | 7 | <−30 | 15 | 12 | 2000 | 22 |
| Invention example 31 | PET/I(10) | GeO$_2$ 100 ppm | 400 ppm | 0.25 | None | EM5 | 7 | <−30 | 15 | 12 | 2000 | 22 |
| Invention example 32 | PT4274 | Sb$_2$O$_3$ 250 ppm | 500 ppm | 0.50 | None | EM5 | 10 | <−30 | 15 | 12 | 2000 | 20 |
| Invention example 33 | PET/I(10) | GeO$_2$ 100 ppm | 400 ppm | 0.25 | None | EM5 | 7 | <−30 | 15 | 12 | 2000 | 20 |
| Invention example 34 | PET/I(10) | GeO$_2$ 100 ppm | 400 ppm | 0.25 | None | EM5 | 7 | <−30 | 15 | 12 | 2000 | 20 |
| Invention example 35 | PET/I(10) | GeO$_2$ 100 ppm | 400 ppm | 0.25 | None | EM5 | 7 | <−30 | 15 | 12 | 2000 | 20 |

TABLE 11-continued

| | R1 layer | | | | | | | | | | |
|---|---|---|---|---|---|---|---|---|---|---|---|
| | Polyester resin | | | | | Polyolefin resin | | | | | |
| Sample film | Resin type | Polymerization catalyst (ppm) (X) | *1) Oxidation inhibitor (ppm) (Y) | X/Y | Additive | Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
| Invention example 36 | PT4274 | Sb$_2$O$_3$ 250 ppm | 500 ppm | 0.50 | None | EM5 | 10 | <−30 | 15 | 12 | 2000 | 20 |
| Invention example 1 | PET | GeO$_2$ 100 ppm | 400 ppm | 0.25 | None | None | — | — | 0 | 0 | 0 | 22 |
| Comparative example 2 | PET/PBT(60) | GeO$_2$ 100 ppm | 400 ppm | 0.25 | None | None | — | — | 0 | 0 | 0 | 22 |
| Comparative example 3 | PET/AD(20) | GeO$_2$ 100 ppm | 400 ppm | 0.25 | None | None | — | — | 0 | 0 | 0 | 22 |
| Comparative example 4 | PET/I(10) | GeO$_2$ 100 ppm | 400 ppm | 0.25 | None | None | — | — | 0 | 0 | 0 | 22 |
| Comparative example 5 | PET/I(10) | GeO$_2$ 100 ppm | 400 ppm | 0.25 | None | None | — | — | 0 | 0 | 0 | 22 |
| Comparative example 6 | PET/I(10) | GeO$_2$ 100 ppm | 400 ppm | 0.25 | None | EM3 | 11 | <−30 | 2 | 2 | 3 | 22 |
| Comparative example 7 | PET/I(10) | GeO$_2$ 100 ppm | 400 ppm | 0.25 | None | EM3 | 11 | <−30 | 2 | 2 | 45 | 22 |
| Comparative example 8 | PET/I(10) | GeO$_2$ 100 ppm | 400 ppm | 0.25 | None | EM3 | 11 | <−30 | 35 | 28 | 15000 | 22 |
| Comparative example 9 | PET/I(10) | GeO$_2$ 100 ppm | 400 ppm | 0.25 | None | EM3 | 11 | <−30 | 35 | 28 | 120000 | 22 |
| Comparative example 10 | PET/I(10) | GeO$_2$ 100 ppm | 400 ppm | 0.25 | None | EM1 | 21 | <−30 | 15 | 14 | 40 | 22 |
| Comparative example 11 | PET/I(10) | GeO$_2$ 100 ppm | 400 ppm | 0.25 | None | EM7 | 1 | <−30 | 15 | 3 | 20 | 22 |
| Comparative example 12 | PET/I(10) | GeO$_2$ 100 ppm | 400 ppm | 0.25 | None | EPR | 0 | <−30 | 15 | 1 | 5 | 22 |
| Comparative example 13 | PET/I(10) | GeO$_2$ 40 ppm | 400 ppm | 0.10 | None | EM6 | 5 | <−30 | 15 | 12 | 2000 | 22 |
| Comparative example 14 | PET/I(10) | GeO$_2$ 40 ppm | 400 ppm | 0.10 | None | EM6 | 5 | <−30 | 15 | 12 | 2000 | 20 |

*1) Tetrakis-[methylene (3,5-di-t-butyl-4-hydroxyhydrocinnamate)] methane is used as oxidation inhibitor.

TABLE 12

| | R0 layer | | Entire film | | | |
|---|---|---|---|---|---|---|
| | Polyester | Film | Film thickness | Pigment | | |
| Sample film | resin Resin type | thickness (μm) | (R1 + R0) (μm) | Type | Content (wt %) *2) | Stretching |
| Invention example 27 | | | 22 | TiO$_2$ | 3 | Non-stretched |
| Invention example 28 | | | 22 | TiO$_2$ | 7 | Non-stretched |
| Invention example 29 | | | 22 | TiO$_2$ | 15 | Non-stretched |
| Invention example 30 | | | 22 | TiO$_2$ | 30 | Non-stretched |
| Invention example 31 | | | 22 | TiO$_2$ | 50 | Non-stretched |
| Invention example 32 | | | 20 | None | 0 | Non-stretched |
| Invention example 33 | PET | 5 | 20 | None | 0 | Non-stretched |
| Invention example 34 | PET/I(10) | 5 | 20 | None | 0 | Non-stretched |
| Invention example 35 | PET/PBT(60) | 5 | 20 | None | 0 | Non-stretched |
| Invention example 36 | PET | 5 | 20 | None | 0 | Non-stretched |
| Comparative example 1 | | | 22 | None | 0 | Non-stretched |
| Comparative example 2 | | | 22 | None | 0 | Non-stretched |
| Comparative example 3 | | | 22 | None | 0 | Non-stretched |
| Comparative example 4 | | | 22 | None | 0 | Non-stretched |
| Comparative example 5 | | | 22 | None | 0 | Two-axis stretched |
| Comparative example 6 | | | 22 | None | 0 | Non-stretched |

TABLE 12-continued

| | R0 layer | | Entire film | | | |
| | | | Film thickness | Pigment | | |
| Sample film | Polyester resin Resin type | Film thickness (μm) | (R1 + R0) (μm) | Type | Content (wt %) *2) | Stretching |
| --- | --- | --- | --- | --- | --- | --- |
| Comparative example 7 | | | 22 | None | 0 | Non-stretched |
| Comparative example 8 | | | 22 | None | 0 | Non-stretched |
| Comparative example 9 | | | 22 | None | 0 | Non-stretched |
| Comparative example 10 | | | 22 | None | 0 | Non-stretched |
| Comparative example 11 | | | 22 | None | 0 | Non-stretched |
| Comparative example 12 | | | 22 | None | 0 | Non-stretched |
| Comparative example 13 | | | 22 | None | 0 | Non-stretched |
| Comparative example 14 | PET | 5 | 20 | None | 0 | Non-stretched |

*2) Pigment content means weight percentage (wt %) of pigment with respect to total film amount of entire resin and pigment.

TABLE 13

| Laminated metal sheet | Sample film | Melting point of R1 layer polyester resin (°C.) | Laminating temp. (°C.) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Invention example 37 | Invention example 1 | 255 | 240 | 0 | ◎ | ◎ | ◎◎◎ | ◎ | ◎◎ | ◎◎ | ◎ | ◎ | ◎◎◎ | ◎ | ◎◎ | ◎◎ |
| Invention example 38 | Invention example 2 | 235 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 39 | Invention example 3 | 220 | 210 | 0 | ◎ | ◎ | ◎◎◎ | ◎ | ◎◎ | ◎◎ | ◎ | ◎ | ◎◎◎ | ◎ | ◎◎ | ◎◎ |
| Invention example 40 | Invention example 4 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 41 | Invention example 5 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 42 | Invention example 6 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 43 | Invention example 7 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 44 | Invention example 8 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 45 | Invention example 9 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 46 | Invention example 10 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 47 | Invention example 11 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 48 | Invention example 12 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 49 | Invention example 13 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 50 | Invention example 14 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 51 | Invention example 15 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |

TABLE 13-continued

| Laminated metal sheet | Sample film | Melting point of R1 layer polyester resin (°C.) | Laminating temp. (°C.) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Invention example 52 | Invention example 16 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 53 | Invention example 17 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 54 | Invention example 18 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 55 | Invention example 19 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 56 | Invention example 20 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 57 | Invention example 21 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 58 | Invention example 22 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 59 | Invention example 23 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 60 | Invention example 24 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 61 | Invention example 25 | 230 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 62 | Invention example 26 | 230 | 215 | 0.005 | ◎ | ◎ | ◎◎◎ | ◎ | ◎◎ | ◎◎ | ◎ | ◎ | ◎◎◎ | ◎ | ◎◎ | ◎◎ |

TABLE 14

| Laminated metal sheet | Sample film | Melting point of R1 layer polyester resin (°C) | Laminating temp. (°C) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Formability | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Invention example 63 | Invention example 27 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 64 | Invention example 28 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 65 | Invention example 29 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 66 | Invention example 30 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 67 | Invention example 31 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 68 | Invention example 32 | 255 | 215 | 0 | ⊚ | ⊚ | ⊚ | ⊚ | ⊚ | ⊚ | ⊚ | ⊚ | ⊚ | ⊚ | ⊚ | ⊚ |
| Invention example 69 | Invention example 33 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 70 | Invention example 34 | 230 | 215 | 0 | ⊚ | ⊚ | ⊚ | ⊚ | ⊚ | ⊚ | ⊚ | ⊚ | ⊚ | ⊚ | ⊚ | ⊚ |
| Invention example 71 | Invention example 35 | 255 | 215 | 0 | ⊚ | ⊚ | ⊚ | ⊚ | ⊚ | ⊚ | ⊚ | ⊚ | ⊚ | ⊚ | ⊚ | ⊚ |
| Invention example 72 | Invention example 36 | 230 | 260 | 0 | ⊚ | ⊚ | ⊚ | ⊚ | ⊚ | ⊚ | ⊚ | ⊚ | ⊚ | ⊚ | ⊚ | ⊚ |
| Invention example 73 | Invention example 5 | 230 | 230 | 0 | ⊚ | ⊚ | ⊚ | ⊚ | ⊚ | ⊚ | ⊚ | ⊚ | ⊚ | ⊚ | ⊚ | ⊚ |
| Invention example 74 | Invention example 5 | 230 | 190 | 0 | ⊚ | ⊚ | ⊚ | ⊚ | ⊚ | ⊚ | ⊚ | ⊚ | ⊚ | ⊚ | ⊚ | ⊚ |
| Invention example 75 | Invention example 5 | 230 | 170 | 0 | ⊚ | ⊚ | ⊚ | ⊚ | ⊚ | ⊚ | ⊚ | ⊚ | ⊚ | ⊚ | ⊚ | ⊚ |
| Invention example 76 | Invention example 5 | 230 | 200 | 0.015 | ⊚ | ⊚ | ⊚ | ⊚ | ⊚ | ⊚ | ⊚ | ⊚ | ⊚ | ⊚ | ⊚ | ⊚ |
| Comparative example 15 | Comparative example 1 | 215 | 200 | 0 | ⊚ | ⊚ | ⊚ | ⊚ | ⊚ | ⊚ | ⊚ | ⊚ | ⊚ | ⊚ | ⊚ | ⊚ |
| Comparative example 16 | Comparative example 2 | 220 | 210 | 0 | ⊚ | ⊚ | ⊚ | ⊚ | ⊚ | ⊚ | ⊚ | ⊚ | ⊚ | ⊚ | ⊚ | ⊚ |
| Comparative example 17 | Comparative example 3 | 230 | 210 | 0 | ⊚ | ⊚ | ⊚ | ⊚ | ⊚ | ⊚ | ⊚ | ⊚ | ⊚ | ⊚ | ⊚ | ⊚ |

TABLE 14-continued

| Laminated metal sheet | Sample film | Melting point of R1 layer polyester resin (°C.) | Laminating temp. (°C.) | Plane orientation coefficient | Thin-wall deep drawn can ||||||| Drawn and ironed can (DI can) |||||
|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Comparative example 18 | Comparative example 4 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 19 | Comparative example 5 | 240 | 220 | 0.015 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 20 | Comparative example 6 | 245 | 225 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 21 | Comparative example 7 | 255 | 235 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 22 | Comparative example 8 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 23 | Comparative example 9 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 24 | Comparative example 10 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 25 | Comparative example 11 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 26 | Comparative example 12 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 27 | Comparative example 13 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |
| Comparative example 28 | Comparative example 14 | 235 | 215 | 0 | ⊙ | ⊙ | ⊙⊙⊙ | ⊙ | ⊙⊙ | ⊙⊙ | ⊙ | ⊙ | ⊙⊙⊙ | ⊙ | ⊙⊙ | ⊙⊙ |

Example 4

As a resin raw material, modified polyolefin resin with group derived from carboxylic acid was cold blended with polyester resin in a blending ratio given in Tables 15 and 16 by using a tumbler blender, and then the blended resin was melted and kneaded at 270° C. by using a two-axis extruding machine, by which a raw material pellet of polyester resin in which modified polyolefin resin was dispersed was obtained. Partially, a commercially available resin (Sealer PT4274 manufactured by Mitsui-DuPont Polychemical Co., Ltd.) that had been pelletized in advance in a state in which modified polyolefin resin with group derived from carboxylic acid was dispersed in polyester resin, which was used as a resin raw material, was used as it was. In the tables, the resin type corresponding to the symbol of resin type of polyester resin and resin type of polyolefin resin is the same as that described in Example 3.

As a metal sheet, as in Example 3, a tin-free steel (hereinafter abbreviated to TFS) with a thickness of 0.18 mm for thin-wall deep drawn can and 0.23 mm for DI can, which had a degree of temper of DR9, metallic chromium layer of 80 mg/m$^2$, and chromium oxide layer of 15 mg/m$^2$ (metallic chromium conversion), was used, by which a both-side resin laminated metal-sheet was obtained by a method in which the raw material resin pellet was inserted in a one-axis extruding machine, a resin for R0 layer was inserted in a separate extruding machine in the case of two layers and simultaneously melted and extruded, molten resin was extruded directly onto one surface of the metal sheet, the extruded resin was once cooled while being held adherently between two rolls, and immediately after the resin was laminated on the opposite surface in the same manner, the resin laminated metal sheet was cooled rapidly in water. The temperature of metal sheet at the laminating time was 230° C. The lip opening width of T die was adjusted so that the thickness of resin film was 10 to 50 μm. The type of sample resin and the resin melting temperature at the laminating time are given in Tables 15 to 18. The used polyester resin and modified polyolefin resin with group derived from carboxylic acid are the same as those used in Example 3.

All of the grain diameter of modified polyolefin resin dispersed in resin film, various temperatures in the table, and the method for measuring the plane orientation coefficient of resin laminated metal sheet are the same as those in Example 3. As in Example 3, a thin-wall deep drawn can or a DI can was manufactured from the resin laminated metal sheet obtained as described above, and the can was subjected to straightening heat treatment to manufacture a sample can. The formability, impact resistance, adhesion, and flavor property of film of the manufactured can body were investigated as in Example 3.

The investigation results are given in Tables 17 and 18.
From Tables 15 to 18, the following facts are found for either can type.

Invention examples 78 to 80 and 81 are resin layers formed in a single layer, in which modified polyolefin resin specified in the present invention is dispersed in polyester resin in which polyester type of mixed resin is changed variously, and exhibit high formability, impact resistance, adhesion, and flavor property. Among these, invention example 80 using adipic acid copolymerized polyethylene terephthalate resin has high performance as a whole, but has a tendency toward deteriorated adhesion after heating and flavor property because of slightly low melting point of polyester resin and slightly low barrier property. Also, invention examples 108 and 112 manufactured from a commercially available resin in which modified polyolefin resin is dispersed in polyester resin similarly exhibit high performance. On the other hand, comparative examples 29 to 32 are examples of resins in which polyolefin resin is not contained in polyester resin in which polyester type is changed variously. These resins especially have low levels of formability and impact resistance.

Invention examples 81 to 85 use mixed resin in which various polyolefin resins of the present invention are dispersed in polyester resin, and exhibit high formability, impact resistance, adhesion, and flavor property. However, invention example 85 using polyolefin resin having a slightly high glass-transition temperature has a tendency toward slightly deteriorated formability and impact resistance. On the other hand, comparative examples 37 to 39 are mixed resins in which polyolefin resin containing a functional group derived from carboxylic acid whose percentage deviates from the range of the present invention is dispersed in polyester resin, and have inferior formability and impact resistance.

Invention examples 86 to 93 are resin layers obtained by laminating, under the laminating conditions of the present invention, mixed resins in which the blending ratio and dispersion state of modified polyolefin resin in polyester resin are changed variously in the range of the present invention, and exhibit high formability, impact resistance, adhesion, and flavor property. However, invention example 86 containing a small amount of dispersed modified polyolefin resin and invention example 92 (93) having a very large number of grains of modified polyolefin resin have a tendency toward slightly deteriorated impact resistance.

On the other hand, comparative examples 33 to 36 are resin layers in which the blending ratio of modified polyolefin resin in polyester resin does not meet the requirement of the present invention, and have greatly deteriorated formability and impact resistance. Comparative example 33 containing a small amount of dispersed modified polyolefin resin has greatly deteriorated room-temperature impact resistance, and comparative example 36 containing a large amount of modified polyolefin resin has greatly deteriorated formability. Comparative examples 35 and 36 containing a large amount of modified polyolefin resin also have a problem with flavor.

Invention examples 103 to 107 are mixed resin layers in which titanium dioxide pigment is mixed with a mixed resin of modified polyolefin resin and polyester resin, and exhibit high formability, impact resistance, adhesion, and flavor property, and also provide a white uniform color tone. However, invention example 103 in which the added amount of pigment is smaller than a desired range has slightly insufficient opacifying property of color tone. On the other hand, invention example 107 in which the added amount of pigment is larger than a desired range has slightly deteriorated formability.

Invention examples 94 to 98 are resin layers in which the blending ratio of polymerization catalyst and oxidation inhibitor in mixed resin is changed variously in the range of the present invention, and exhibit high formability, impact resistance, adhesion, and flavor property. However, invention example 94 containing a large amount of oxidation inhibitor has slightly deteriorated formability and impact resistance. On the other hand, comparative examples 40 and 41 in which the blending ratio of polymerization catalyst and oxidation inhibitor in mixed resin deviates from the range of the present invention have deteriorated formability, impact resistance, and adhesion.

Invention examples 99 and 100 are resin layers in which the thickness of each layer is changed, and exhibit high formability, impact resistance, adhesion, and flavor property. Since the resin layer of invention example 99 is slightly thin, the impact resistance is slightly deteriorated.

Invention examples 101 and 102 are resin layers in which a lubricant, free radical inhibitor, and compatibilizing agent are mixed, respectively, in a mixed resin of modified polyolefin resin and polyester resin of the present invention, and exhibit high formability, impact resistance, adhesion, and flavor property. Further, invention examples 101 and 102 also have lubricity, free radical deterioration resistance, and compatibility depending on the function of added additive, and in particular, invention example 102 containing a compatibilizing agent exhibits excellent low-temperature impact resistance.

Invention examples 109 to 112 are two-layer resins in which a polyester resin layer containing no olefin is provided as an upper layer, and have high low-temperature impact resistance and flavor property as compared with the single-layer resin. However, invention example 111 using a resin containing polybutylene terephthalate as an upper layer has a slightly deteriorated flavor property.

TABLE 15

| | | Polyester resin | | | | | R1 layer | | | | Polyester resin | | | |
|---|---|---|---|---|---|---|---|---|---|---|---|---|---|---|---|
| Sample film | Resin type | Polymerization catalyst (ppm) (X) | *1) Oxidation inhibitor (ppm) (Y) | X/Y | Additive | Polyester melting point (° C.) | Polyolefin resin | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
| Invention example 78 | PET | GeO₂ 100 ppm | 400 ppm | 0.25 | None | 255 | EM4 | 8 | <-30 | 15 | 14 | 2500 | 25 |
| Invention example 79 | PET/PBT(60) | GeO₂ 100 ppm | 400 ppm | 0.25 | None | 235 | EM4 | 8 | <-30 | 15 | 14 | 2500 | 25 |
| Invention example 80 | PET/AD(20) | GeO₂ 100 ppm | 400 ppm | 0.25 | None | 220 | EM4 | 8 | <-30 | 15 | 14 | 2500 | 25 |
| Invention example 81 | PET/I(10) | GeO₂ 100 ppm | 400 ppm | 0.25 | None | 230 | EM2 | 18 | <-30 | 15 | 14 | 1000 | 25 |
| Invention example 82 | PET/I(10) | GeO₂ 100 ppm | 400 ppm | 0.25 | None | 230 | EM4 | 8 | <-30 | 15 | 14 | 2500 | 25 |
| Invention example 83 | PET/I(10) | GeO₂ 100 ppm | 400 ppm | 0.25 | None | 230 | EM5 | 7 | <-30 | 15 | 14 | 2500 | 25 |
| Invention example 84 | PET/I(10) | GeO₂ 100 ppm | 400 ppm | 0.25 | None | 230 | EM6 | 5 | <-30 | 15 | 14 | 2500 | 25 |
| Invention example 85 | PET/I(10) | GeO₂ 100 ppm | 400 ppm | 0.25 | None | 230 | EM8 | 6 | 20 | 15 | 14 | 2500 | 25 |
| Invention example 86 | PET/I(10) | GeO₂ 100 ppm | 400 ppm | 0.25 | None | 230 | EM3 | 11 | <-30 | 5 | 4 | 4 | 25 |
| Invention example 87 | PET/I(10) | GeO₂ 100 ppm | 400 ppm | 0.25 | None | 230 | EM3 | 11 | <-30 | 5 | 8 | 100 | 25 |
| Invention example 88 | PET/I(10) | GeO₂ 100 ppm | 400 ppm | 0.25 | None | 230 | EM3 | 11 | <-30 | 10 | 10 | 50 | 25 |
| Invention example 89 | PET/I(10) | GeO₂ 100 ppm | 400 ppm | 0.25 | None | 230 | EM3 | 11 | <-30 | 10 | 12 | 500 | 25 |
| Invention example 90 | PET/I(10) | GeO₂ 100 ppm | 400 ppm | 0.25 | None | 230 | EM3 | 11 | <-30 | 15 | 18 | 800 | 25 |
| Invention example 91 | PET/I(10) | GeO₂ 100 ppm | 400 ppm | 0.25 | None | 230 | EM3 | 11 | <-30 | 15 | 20 | 22000 | 25 |
| Invention example 92 | PET/I(10) | GeO₂ 100 ppm | 400 ppm | 0.25 | None | 230 | EM3 | 11 | <-30 | 20 | 24 | 250000 | 25 |
| Invention example 93 | PET/I(10) | GeO₂ 100 ppm | 400 ppm | 0.25 | None | 230 | EM3 | 11 | <-30 | 28 | 22 | 10000 | 25 |
| Invention example 94 | PET/I(10) | GeO₂ 120 ppm | 600 ppm | 0.2 | None | 230 | EM6 | 5 | <-30 | 15 | 14 | 2500 | 25 |
| Invention example 95 | PET/I(10) | GeO₂ 100 ppm | 100 ppm | 1 | None | 230 | EM6 | 5 | <-30 | 15 | 14 | 2500 | 25 |

TABLE 15-continued

| | | Polyester resin | | | | | R1 layer Polyester resin | | | | | | | |
|---|---|---|---|---|---|---|---|---|---|---|---|---|---|---|
| Sample film | Resin type | Polymerization catalyst (ppm) (X) | *1) Oxidation inhibitor (ppm) (Y) | X/Y | Additive | Polyester melting point (° C.) | Polyolefin resin | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
| Invention example 96 | PET/I(10) | GeO₂ 100 ppm | 10 ppm | 10 | None | 230 | EM6 | 5 | <-30 | 15 | 14 | 2500 | 25 |
| Invention example 97 | PET/I(10) | GeO₂ 50 ppm | 0.5 ppm | 100 | None | 230 | EM6 | 5 | <-30 | 15 | 14 | 2500 | 25 |
| Invention example 98 | PET/I(10) | GeO₂ 100 ppm | 0.05 ppm | 1000 | None | 230 | EM6 | 5 | <-30 | 15 | 14 | 2500 | 25 |
| Invention example 99 | PET/I(10) | GeO₂ 100 ppm | 400 ppm | 0.25 | None | 230 | EM6 | 5 | <-30 | 15 | 14 | 2500 | 10 |
| Invention example 100 | PET/I(10) | GeO₂ 100 ppm | 400 ppm | 0.25 | None | 230 | EM6 | 5 | <-30 | 15 | 14 | 2500 | 50 |
| Invention example 101 | PET/I(10) | GeO₂ 100 ppm | 400 ppm | 0.25 | *3) 3 wt % | 230 | EM3 | 11 | <-30 | 15 | 14 | 2500 | 25 |
| Invention example 102 | PET/I(10) | GeO₂ 100 ppm | 400 ppm | 0.25 | *4) 3 wt % | 230 | EM3 | 11 | <-30 | 15 | 14 | 2500 | 25 |

*1) Tetrakis-[methylene (3,5-di-t-butyl-4-hydroxyhydrocinnamate)] methane is used as oxidation inhibitor.
*3) Silicone of lubricant is added by 3 weight part to 100 weight part of mixed resin.
*4) Bond First 20B (manufactured by Sumitomo Chemical Co., Ltd.) of compatibilizing agent is added by 3 weight part to 100 weight part of mixed resin. Table 15

TABLE 16

| Sample film | R1 layer | | | | | | | | | | | Film thickness (μm) |
|---|---|---|---|---|---|---|---|---|---|---|---|---|
| | Polyester resin | | | | Polyolefin resin | Polyester resin | | | | | | |
| | Resin type | Polymerization catalyst (ppm) (X) | *1) Oxidation inhibitor (ppm) (Y) | X/Y | Additive | | Polyester melting point (° C.) | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | |
| Invention example 103 | PET/I(10) | GeO$_2$ 100 ppm | 400 ppm | 0.25 | None | EM5 | 230 | 7 | <-30 | 15 | 14 | 2500 | 25 |
| Invention example 104 | PET/I(10) | GeO$_2$ 100 ppm | 400 ppm | 0.25 | None | EM5 | 230 | 7 | <-30 | 15 | 14 | 2500 | 25 |
| Invention example 105 | PET/I(10) | GeO$_2$ 100 ppm | 400 ppm | 0.25 | None | EM5 | 230 | 7 | <-30 | 15 | 14 | 2500 | 25 |
| Invention example 106 | PET/I(10) | GeO$_2$ 100 ppm | 400 ppm | 0.25 | None | EM5 | 230 | 7 | <-30 | 15 | 14 | 2500 | 25 |
| Invention example 107 | PT4274 | GeO$_2$ 100 ppm | 400 ppm | 0.25 | None | EM5 | 230 | 7 | <-30 | 15 | 14 | 2500 | 25 |
| Invention example 108 | PT4274 | Sb$_2$O$_3$ 250 ppm | 500 ppm | 0.5 | None | EM5 | 255 | 10 | <-30 | 15 | 14 | 2500 | 22 |
| Invention example 109 | PET/I(10) | GeO$_2$ 100 ppm | 400 ppm | 0.25 | None | EM5 | 230 | 7 | <-30 | 15 | 14 | 2500 | 20 |
| Invention example 110 | PET/I(10) | GeO$_2$ 100 ppm | 400 ppm | 0.25 | None | EM5 | 230 | 7 | 20 | 15 | 14 | 2500 | 20 |
| Invention example 111 | PET/I(10) | GeO$_2$ 100 ppm | 400 ppm | 0.25 | None | EM5 | 230 | 7 | <-30 | 15 | 14 | 2500 | 20 |
| Invention example 112 | PT4274 | Sb$_2$O$_3$ 250 ppm | 500 ppm | 0.5 | None | EM5 | 255 | 10 | <-30 | 15 | 14 | 2500 | 20 |
| Comparative example 29 | PET | GeO$_2$ 100 ppm | 400 ppm | 0.25 | None | None | 255 | — | — | 0 | 0 | 0 | 25 |
| Comparative example 30 | PET/PBT(60) | GeO$_2$ 100 ppm | 400 ppm | 0.25 | None | None | 235 | — | — | 0 | 0 | 0 | 25 |
| Comparative example 31 | PET/AD(20) | GeO$_2$ 100 ppm | 400 ppm | 0.25 | None | None | 220 | — | — | 0 | 0 | 0 | 25 |

TABLE 16-continued

| Sample film | Resin type | Polyester resin - Polymerization catalyst (ppm) (X) | Polyester resin - *1) Oxidation inhibitor (ppm) (Y) | X/Y | Additive | R1 layer - Polyester melting point (° C.) | Polyolefin resin | Polyester resin - Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) |
|---|---|---|---|---|---|---|---|---|---|---|---|---|---|
| Comparative example 32 | PET/I(10) | GeO$_2$ 100 ppm | 400 ppm | 0.25 | None | 230 | None | — | — | 0 | 0 | 0 | 25 |
| Comparative example 33 | PET/I(10) | GeO$_2$ 100 ppm | 400 ppm | 0.25 | None | 230 | EM3 | 11 | <−30 | 2 | 3 | 5 | 25 |
| Comparative example 34 | PET/I(10) | GeO$_2$ 100 ppm | 400 ppm | 0.25 | None | 230 | EM3 | 11 | <−30 | 2 | 3 | 50 | 25 |
| Comparative example 35 | PET/I(10) | GeO$_2$ 120 ppm | 400 ppm | 0.25 | None | 230 | EM3 | 11 | <−30 | 35 | 30 | 20000 | 25 |
| Comparative example 36 | PET/I(10) | GeO$_2$ 100 ppm | 400 ppm | 0.25 | None | 230 | EM3 | 11 | <−30 | 35 | 30 | 135000 | 25 |
| Comparative example 37 | PET/I(10) | GeO$_2$ 100 ppm | 400 ppm | 0.25 | None | 230 | EM1 | 21 | <−30 | 15 | 16 | 50 | 25 |
| Comparative example 38 | PET/I(10) | GeO$_2$ 100 ppm | 400 ppm | 0.25 | None | 230 | EM7 | 1 | <−30 | 15 | 4 | 40 | 25 |
| Comparative example 39 | PET/I(10) | GeO$_2$ 100 ppm | 400 ppm | 0.25 | None | 230 | EPR | 0 | <−30 | 15 | 1 | 4 | 25 |
| Comparative example 40 | PET/I(10) | GeO$_2$ 40 ppm | 400 ppm | 0.1 | None | 230 | EM6 | 5 | <−30 | 15 | 14 | 2500 | 25 |
| Comparative example 41 | PET/I(10) | GeO$_2$ 40 ppm | 400 ppm | 0.1 | None | 230 | EM6 | 5 | <−30 | 15 | 14 | 2500 | 20 |

*1) Tetrakis-[methylene (3,5-di-t-butyl-4-hydroxyhydrocinnamate)] methane is used as oxidation inhibitor.

TABLE 17

| Sample film | R0 layer Polyester resin Resin type | R0 layer Film thickness (μm) | Entire film Film thickness (R1 + R0) (μm) | Entire film Pigment Type | Entire film Pigment Content (wt %) *2 | Melting temp. of R1 layer resin at extrusion laminating time (° C.) | Investigation result Forma-bility | Thin-wall deep drawn can Impact resistance (room temp.) | Thin-wall deep drawn can Impact resistance (low temp.) | Thin-wall deep drawn can Adhesion after forming | Thin-wall deep drawn can Adhesion after heating | Thin-wall deep drawn can Flavor property | Forma-bility | Drawn and ironed can (DI can) Impact resistance (room temp.) | Drawn and ironed can (DI can) Impact resistance (low temp.) | Drawn and ironed can (DI can) Adhesion after forming | Drawn and ironed can (DI can) Adhesion after heating | Flavor property |
|---|---|---|---|---|---|---|---|---|---|---|---|---|---|---|---|---|---|---|
| Invention example 78 | | | 25 | None | 0 | 285 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 79 | | | 25 | None | 0 | 265 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 80 | | | 25 | None | 0 | 250 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 81 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 82 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 83 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 84 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 85 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 86 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 87 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 88 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 89 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 90 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 91 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 92 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 93 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 94 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |
| Invention example 95 | | | 25 | None | 0 | 260 | ⊚ | ⊚ | ⊚⊚⊚ | ⊚ | ⊚○ | ⊚○ | ⊚ | ⊚ | ⊚⊚⊚ | ⊚ | ⊚○ | ⊚○ |

TABLE 17-continued

| Sample film | R0 layer Polyester resin type | R0 layer Film thickness (μm) | Entire film Film thickness (R1+R0) (μm) | Entire film Pigment Type | Entire film Pigment Content (wt %) *2) | Melting temp. of R1 layer resin at extrusion laminating time (° C.) | Thin-wall deep drawn can Formability | Thin-wall Impact resistance (room temp.) | Thin-wall Impact resistance (low temp.) | Thin-wall Adhesion after forming | Thin-wall Adhesion after heating | Thin-wall Flavor property | DI can Impact resistance (room temp.) | DI can Impact resistance (low temp.) | DI can Adhesion after forming | DI can Adhesion after heating | DI can Flavor property |
|---|---|---|---|---|---|---|---|---|---|---|---|---|---|---|---|---|---|
| Invention example 96 | | | 25 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 97 | | | 25 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 98 | | | 25 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 99 | | | 25 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 100 | | | 10 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 101 | | | 50 | None | 0 | 260 | ◎ | ◎ | ◎◎◎ | ◎ | ◎◎ | ◎◎ | ◎ | ◎◎◎ | ◎ | ◎◎ | ◎◎ |
| Invention example 102 | | | 25 | None | 0 | 260 | ◎ | ◎ | ◎◎◎ | ◎ | ◎◎ | ◎◎ | ◎ | ◎◎◎ | ◎ | ◎◎ | ◎◎ |

*2) Pigment content means weight percentage (wt %) of pigment with respect to total film amount of entire resin and pigment. Pigment is added to R1 layer.

TABLE 18

| Sample film | R0 layer Polyester resin type | R0 layer Film thickness (μm) | Entire film Film thickness (R1 + R0) (μm) | Entire film Pigment Type | Entire film Pigment Content (wt %) *2 | Melting temp. of R1 layer resin at extrusion laminating time (°C) | Thin-wall deep drawn can Formability | Thin-wall deep drawn can Impact resistance (room temp.) | Thin-wall deep drawn can Impact resistance (low temp.) | Thin-wall deep drawn can Adhesion after forming | Thin-wall deep drawn can Adhesion after heating | Thin-wall deep drawn can Flavor property | Drawn and ironed can (DI can) Formability | Drawn and ironed can (DI can) Impact resistance (room temp.) | Drawn and ironed can (DI can) Impact resistance (low temp.) | Drawn and ironed can (DI can) Adhesion after forming | Drawn and ironed can (DI can) Adhesion after heating | Drawn and ironed can (DI can) Flavor property |
|---|---|---|---|---|---|---|---|---|---|---|---|---|---|---|---|---|---|---|
| Invention example 103 | | | 25 | TiO₂ | 3 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 104 | | | 25 | TiO₂ | 7 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 105 | | | 25 | TiO₂ | 15 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 106 | | | 25 | TiO₂ | 30 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 107 | | | 25 | TiO₂ | 50 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 108 | | | 25 | None | 0 | 285 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 109 | PET | 5 | 25 | None | 0 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 110 | PET/I (10) | 5 | 25 | None | 0 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 111 | PET/PBT (60) | 5 | 25 | None | 0 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Invention example 112 | PET | 5 | 25 | None | 0 | 285 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Comparative example 29 | | | 25 | None | 0 | 285 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Comparative example 30 | | | 25 | None | 0 | 265 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Comparative example 31 | | | 25 | None | 0 | 250 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Comparative example 32 | | | 25 | None | 0 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |
| Comparative example 33 | | | 25 | None | 0 | 260 | ⊙ | ⊙ | ⊚⊙ | ⊙ | ⊚⊙ | ⊚⊙ | ⊙ | ⊙ | ⊚⊙ | ⊙ | ⊚⊙ | ⊚⊙ |

TABLE 18-continued

| Sample film | R0 layer Polyester resin Resin type | R0 layer Film thickness (µm) | Entire film Film thickness (R1 + R0) (µm) | Entire film Pigment Type | Entire film Pigment Content (wt %) *2) | Melting temp. of R1 layer resin at extrusion laminating time (° C.) | Investigation result Thin-wall deep drawn can Forma-bility | Thin-wall deep drawn can Impact resistance (room temp.) | Thin-wall deep drawn can Impact resistance (low temp.) | Thin-wall deep drawn can Adhesion after forming | Thin-wall deep drawn can Adhesion after heating | Thin-wall deep drawn can Flavor property | Drawn and ironed can (DI can) Forma-bility | Drawn and ironed can (DI can) Impact resistance (room temp.) | Drawn and ironed can (DI can) Impact resistance (low temp.) | Drawn and ironed can (DI can) Adhesion after forming | Drawn and ironed can (DI can) Adhesion after heating | Drawn and ironed can (DI can) Flavor property |
|---|---|---|---|---|---|---|---|---|---|---|---|---|---|---|---|---|---|---|
| Comparative example 34 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 35 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 36 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 37 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 38 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 39 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 40 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 41 | | | 25 | None | 0 | 260 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |

*2) Pigment content means weight percentage (wt %) of pigment with respect to total film amount of entire resin and pigment. Pigment is added to R1 layer.

Example 5

As a resin raw material for R1 layer, modified polyolefin resin with group derived from carboxylic acid having a primary grain diameter of 0.3 μm was cold blended with polyester resin in a blending ratio given in Tables 19 and 20 by using a tumbler blender, and then the blended resin was melted and kneaded at 270° C. by using a two-axis extruding machine, by which a raw material pellet of polyester resin in which modified polyolefin resin was dispersed was obtained. On the other hand, polyester resin containing no modified polyolefin resin, which was a resin raw material for R0 layer, was inserted in a separate one-axis extruding machine, and each of molten resins was introduced into a multi-manifold type T die and extruded in two layers while the film thickness of R1 and R0 layers was controlled by the discharge amount of molten resin from the extruding machine, by which a resin film with a total thickness of 9.5 to 70 μm was manufactured continuously while being cooled by the surface of a rotating metallic roll.

The used polyester resin and modified polyolefin resin with group derived from carboxylic acid were as follows:

1. Polyester Resin (1) PET/PBT(90): Mixed resin with a ratio of polyethylene terephthalate (EFG10 manufactured by Kanebo Gohsen, Ltd.) to polybutylene terephthalate (Planac manufactured by Dainippon Ink & chemicals, Inc.) of 10:90, intrinsic viscosity: 0.6 dl/g, Tg: 27° C., Tc: 60° C., Tm: 215° C., Ge content: 10 ppm (2) PET/PBT(80): Mixed resin with a ratio of polyethylene terephthalate (EFG10 manufactured by Kanebo Gohsen, Ltd.) to polybutylene terephthalate (Planac manufactured by Dainippon Ink & chemicals, Inc.) of 20:80, intrinsic viscosity: 0.6 dl/g, Tg: 35° C., Tc: 75° C., Tm: 220° C., Ge content: 10 ppm (3) PET/PBT(70): Mixed resin with a ratio of polyethylene terephthalate (EFG10 manufactured by Kanebo Gohsen, Ltd.) to polybutylene terephthalate (Planac manufactured by Dainippon Ink & chemicals, Inc.) of 30:70, intrinsic viscosity: 0.62 dl/g, Tg: 45° C., Tc: 90° C., Tm: 230° C., Ge content: 20 ppm (4) PET/PBT(60): Mixed resin with a ratio of polyethylene terephthalate (EFG10 manufactured by Kanebo Gohsen, Ltd.) to polybutylene terephthalate (Planac manufactured by Dainippon Ink & chemicals, Inc.) of 40:60, intrinsic viscosity: 0.6 dl/g, Tg: 50° C., Tc: 105° C., Tm: 235° C. Ge content-10 ppm (5) PET/PBT(40): Mixed resin with a ratio of polyethylene terephthalate (EFG10 manufactured by Kanebo Gohsen, Ltd.) to polybutyleneterephthalate (Planac manufactured by Dainippon Ink & chemicals, Inc.) of 60:40, intrinsic viscosity: 0.6 dl/g, Tg: 60° C., Tc: 120° C., Tm: 240° C., Ge content: 10 ppm (6) PET/PBT(20): Mixed resin with a ratio of polyethylene terephthalate (EFG10 manufactured by Kanebo Gohsen, Ltd.) to polybutylene terephthalate (Planac manufactured by Dainippon Ink & chemicals, Inc.) of 80:20, intrinsic viscosity: 0.6 dl/g, Tg: 65° C., Tc: 140° C., Tm: 245° C., Ge content: 10 ppm (7) PET: Polyethylene terephthalate (EFG10 manufactured by Kanebo Gohsen, Ltd.), intrinsic viscosity: 0.62 dl/g, Tg: 72° C., Tc: 150° C., Tm: 255° C., Ge content: 20 ppm (8) PET/I (10): Ethylenephthalate-ethyleneisophthalate copolymerized resin with a ratio of terephthalic acid to isophthalic acid of 90:10 (IP121B manufactured by Kanebo Gohsen, Ltd.), intrinsic viscosity: 0.6 dl/g, Tg: 70° C., Tc: 170° C., Tm: 230° C., Ge content: 10 ppm 2. Modified Polyolefin Resin with Group Derived from Carboxylic Acid (1) EM1: Polymethyl methacrylate-(ethylene-ethyl acrylate copolymer) graft copolymer (Modiper A5200 manufactured by NOF Corp.), weight ratio of functional group derived from carboxylic acid: 21 wt %, glass-transition temperature: –30° C. or lower (2) EM2: Polymethyl methacrylate-(ethylene-ethyl acrylate-maleic anhydride copolymer) graft copolymer (Modiper A8200 manufactured by NOF Corp.), weight ratio of functional group derived from carboxylic acid: 18 wt %, glass-transition temperature: –30° C. or lower (3) EM3: Ethylene-ethyl acrylate-maleic anhydride copolymer (Bondine HX8290 manufactured by Sumitomo Chemical Co., Ltd.), weight ratio of functional group derived from carboxylic acid: 11 wt %, glass-transition temperature: –30° C. or lower (4) EM4: Ethylene-methacrylic acid copolymer (Nucrel N1560 manufactured by Mitsui-DuPont Polychemical Co., Ltd.), weight ratio of functional group derived from carboxylic acid: 8 wt %, glass-transition temperature: –30° C. or lower (5) EM5: 50% Zn neutralized substance of ethylene-methacrylic acid copolymer (Nucrel N1560 manufactured by Mitsui-DuPont Polychemical Co., Ltd. neutralized partially by Zn), weight ratio of functional group derived from carboxylic acid: 7 wt %, glass-transition temperature: –30° C. or lower (6) EM6: 60% Zn neutralized substance of ethylene-methacrylic acid copolymer (Himilan 1557 manufactured by Mitsui-DuPont Polychemical Co., Ltd.), weight ratio of functional group derived from carboxylic acid: 5 wt %, glass-transition temperature: –30° C. or lower (7) EM7: Ethylene-methacrylic acid copolymer (Nucrel N0200H manufactured by Mitsui-DuPont Polychemical Co., Ltd.), weight ratio of functional group derived from carboxylic acid: 1 wt %, glass-transition temperature: –30° C. or lower (8) EM8: Polystyrene-(ethylene-ethyl acrylate copolymer) graft copolymer (Modiper A5100 manufactured by NOF Corp.), weight ratio of functional group derived from carboxylic acid: 6 wt %, glass-transition temperature: 20° C.

(9) EPR: Ethylene-propylene rubber (EP07P manufactured by JSR Corp.), weight ratio of functional group derived from carboxylic acid: 0 wt %, glass-transition temperature: –30° C. or lower As a resin raw material for R1 layer, pelletized modified polyolefin resin with group derived form carboxylic acid and polyester resin are inserted in a one-axis extruding machine in the blending ratio shown in comparative example 16 in Table 20. On the other hand, polyester resin containing no modified polyolefin resin, which was a resin raw material for R0 layer, was inserted in a separate one-axis extruding machine, and each of molten resins was introduced into a multi-manifold type T die and extruded in two layers while the film thickness of R1 and R0 layers was controlled by the discharge amount of molten resin from the extruding machine, by which a resin film with a total thickness of 9.5 to 70 μm was manufactured continuously while being cooled by the surface of a rotating metallic roll.

A resin laminated metal sheet was obtained by a thermo-compression bonding method in which the resin film obtained as described above was hot-pressed on both surfaces of a tin-free steel (hereinafter abbreviated to TFS, thickness: 0.18 mm for thin-wall deep drawn can and 0.23 mm for DI can, degree of temper: DR9, metallic chromium layer: 80 mg/m$^2$, chromium oxide layer: 15 mg/m$^2$ (metallic chromium conversion)) heated by an induction heating system, and then the laminated metal sheet was rapidly cooled in water. The metal sheet temperature at the laminating time (laminating temperature) is given in Tables 21 and 22.

The grain diameter of modified polyolefin resin dispersed in R1 layer of resin film, various temperatures in the table, and the plane orientation coefficient of resin laminated metal sheet were measured by the same method as that in Example 1.

A thin-wall deep drawn can or a DI can was manufactured from the laminated metal sheet obtained as described above, and the can was subjected to straightening heat treatment to manufacture a sample can. The formability, impact resistance (room temperature, low temperature), adhesion after forming, adhesion after heating, and retort resistance of film of the manufactured can body were investigated. The retort resistance was evaluated by cloudiness of film at the can bottom after retorting (cloudiness resistance). The lid was obtained by forming the resin laminated metal sheet in the same way as a can lid of a commercially available 250 ml negative-pressure can (three-piece can).

The following is a detailed description of the investigation method.

1. Evaluation by Thickness-decreasing Deep Drawing 1-1 Can Manufacturing

A resin laminated metal sheet was subjected to first-stage drawing and redrawing under the following conditions, by which a thin-wall deep drawn can was obtained.

First-stage drawing
  Blank diameter . . . 150 to 160 mm
  First-stage drawing . . . drawing ratio: 1.65

Redrawing
  Primary redrawing . . . drawing ratio: 1.25
  Secondary redrawing . . . drawing ratio: 1.25
  Radius of curvature of die corner in redrawing process . . . 0.4 mm
  Load for pressing wrinkle at the time of redrawing . . . 39227N (4000 kg)

Average thickness decreasing percentage of can sidewall
  40 to 55% with respect to thickness of resin laminated metal sheet before forming 1-2 Straightening Heat Treatment Forming strain of film caused by can manufacturing was removed by keeping the can in a thermal environment of film melting point minus 15° C. for 30 seconds and then by rapidly cooling it.

Formability

Evaluation was made as described below by the limit of capability for manufacturing can without film failure. Grades not lower than ○ marked grade are acceptable.

Limit of forming (thickness decreasing percentage): Grade
Incapable of forming at thickness decreasing percentage of 40%: (Inferior)
Capable of forming up to thickness decreasing percentage of 40%
Capable of forming up to thickness decreasing percentage of 45%
Capable of forming up to thickness decreasing percentage of 50%
Capable of forming up to thickness decreasing percentage of 55%: (Superior)

(2) Evaluation of Room-temperature and Low-temperature Impact Resistance

A can body (thickness decreasing percentage: 50%) subjected to straightening heat treatment was necked, and the can body was filled with distilled water. After a lid was installed and tightened, an iron ball of 0.5 kg was dropped from a height of 30 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(Evaluation of Low-temperature Impact Resistance)

Test Result: Grade
Current value not lower than 50 mA: (Inferior)
Current value not lower than 30 mA and lower than 50 mA
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for 24 hours. Thereafter, the peeling length of resin in the can end portion was observed, and evaluation was made as described below. Grades not lower than ○ marked grade are acceptable.

Test Result: Grade
Peeling length longer than 10 mm (Inferior)
Peeling length longer than 5 mm and not longer than 10 mm
Peeling length longer than 2 mm and not longer than 5 mm
Peeling length not longer than 2 mm,
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 10%: (Inferior)
Peeling percentage higher than 5% and not higher than 10%
Peeling percentage higher than 2% and not higher than 5%

Peeling percentage higher than 0.5% and not higher than 2%
Peeling percentage not higher than 0.5%
No peeling: (Superior)

(5) Cloudiness of Film After Retorting

A can body (thickness decreasing percentage: 50%) subjected to straightening heat treatment was necked, and the can body was filled with distilled water. After a lid was installed and tightened, the can was cooled to 4° C., and thereafter retorting was performed in an atmosphere of 130° C. for one hour. After retorting, the degree of cloudiness of film at the can bottom was observed. Grades not lower than ○ marked grade are acceptable.

Test Result: Grade
Cloudiness more than 50% of the whole: (Inferior)
Cloudiness more than 10% of the whole and not more than 50%
Cloudiness more than 2% of the whole and not more than 10%
Very slight cloudiness (not more than 2% of the whole)
No change: (Superior)

2. Evaluation by Drawing and Ironing (DI Forming)

2-1 Can Manufacturing

A resin laminated metal sheet was drawn and ironed under the following conditions, by which a DI can was obtained.
First-stage drawing
  Blank diameter: 150 mm
  Drawing ratio: 1.6
Second-stage drawing
  Drawing ratio: 1.25
Ironing
  Ironing punch diameter: 3-stage ironing 65.8 mm dia
Total ironing percentage of can sidewall
  55 to 70% with respect to thickness of resin laminated metal sheet before forming 1-2 Straightening Heat Treatment Forming strain of film caused by can manufacturing was removed by keeping the can in a thermal environment of film melting point minus 15° C. for 30 seconds and then by rapidly cooling it.

(1) Formability

Evaluation was made as described below by the limit of capability for manufacturing can without film failure. Grades not lower than ○ marked grade are acceptable.

Limit of forming (total ironing percentage): Grade
Incapable of forming at total ironing percentage of 55%: (Inferior)
Capable of forming up to total ironing percentage of 55%
Capable of forming up to total ironing percentage of 60%
Capable of forming up to total ironing percentage of 65%
Capable of forming up to total ironing percentage of 70%: (Superior)

(2) Evaluation of Room-temperature and Low-temperature Impact Resistance

A can body (total ironing percentage: 65%) subjected to straightening heat treatment was necked, and the can body was filled with distilled water. After a lid was installed and tightened, an iron ball of 0.5 kg was dropped from a height of 25 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 30 mA: (Inferior)
Current value not lower than 10 mA and lower than 30 mA
Current value not lower than 5 mA and lower than 10 mA
Current value not lower than 1 mA and lower than 5 mA
Current value lower than 1 mA: (Superior)

(Evaluation of Low-temperature Impact Resistance)

Test Result: Grade
Current value not lower than 50 mA: (Inferior)
Current value not lower than 30 mA and lower than 50 mA
Current value not lower than 10 mA and lower than 30 mA
Current value not lower than 5 mA and lower than 10 mA
Current value not lower than 1 mA and lower than 5 mA
Current value lower than 1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for five hours. Thereafter, the peeling length of resin in the can end portion was observed, and evaluation was made as described below. Grades not lower than ○ marked grade are acceptable.

Test Result: Grade
Peeling length longer than 10 mm: (Inferior)
Peeling length longer than 5 mm and not longer than 10 mm
Peeling length longer than 2 mm and not longer than 5 mm
Peeling length not longer than 2 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 10%: (Inferior)
Peeling percentage higher than 5% and not higher than 10%
Peeling percentage higher than 2% and not higher than 5%
Peeling percentage higher than 0.5% and not higher than 2%
Peeling percentage not higher than 0.5%
No peeling: (Superior)

(5) Cloudiness of Film After Retorting (Cloudiness Resistance)

A can body (total ironing percentage: 65%) subjected to straightening heat treatment was necked, and the can body was filled with distilled water. After a lid was installed and tightened, the can was cooled to 4° C., and thereafter retorting was performed in an atmosphere of 130° C. for one hour. After retorting, the degree of cloudiness of film at the can bottom was observed. Grades not lower than ○ marked grade are acceptable.

Test Result: Grade
Cloudiness more than 50% of the whole: (Inferior)
Cloudiness more than 10% of the whole and not more than 50%
Cloudiness more than 2% of the whole and not more than 10%
Very slight cloudiness (not more than 2% of the whole)
No change: (Superior)

The investigation results are given in Tables 21 and 22.

From Tables 19 to 22, the following facts are found for either can type.

Invention examples 1 to 7 are films in which R1 layer is a resin layer in which modified polyolefin resin specified in the present invention is dispersed in polyester resin in which the mixing ratio of polyethylene terephthalate to polybutylene terephthalate is changed variously and R0 layer is a resin layer of polyethylene terephthalate specified in the present invention, and invention examples 38 to 44 in which these films are laminated under the laminating conditions of the present invention exhibit very high formability, impact resistance, adhesion, and cloudiness resistance. Among these, invention example 43 in which the film of invention example 6 using polyester resin having a low percentage of polybutylene terephthalate is laminated and invention example 44 in which the film of invention example 7 further using homopolyethylene terephthalate is laminated have a tendency for adhesion after heating and cloudiness resistance after retorting to be deteriorated as the percentage of polybutylene terephthalate becomes low, but still have high performance as a whole. Also, invention example 45 in which the film of invention example 8 using polyethylene terephthalate in which polyester resin is copolymerized by isophthalic acid is laminated has a tendency for adhesion after heating and cloudiness resistance after retorting to be deteriorated slightly, but still have high performance as a whole. On the other hand, invention examples 38 and 39 in which the films of invention examples 1 and 2 having a very high percentage of polybutylene terephthalate are laminated have a tendency toward deteriorated adhesion after heating because the melting point is slightly low, but have high performance as a whole. On the other hand, comparative examples 1 to 8 are examples of films in which polyester resin in which the mixing ratio of polyethylene terephthalate to polybutylene terephthalate is changed variously does not contain polyolefin resin. Comparative examples 23 to 30 in which these films are laminated especially have a low level of impact resistance.

Invention examples 9 to 13 are films using mixed resin in which various types of polyolefin resins are dispersed in polyester resin as R1 layer, and invention examples 46 to 50 in which these films are laminated exhibit high formability, impact resistance, adhesion, and cloudiness resistance. However, invention example 46 in which the film of invention example 9 using polyolefin resin having a slightly high percentage of functional group derived from carboxylic acid is laminated and invention example 50 in which the film of invention example 13 using polyolefin resin having a slightly high glass-transition temperature is laminated have a tendency toward slightly deteriorated low-temperature impact resistance. On the other hand, comparative examples 13 to 15 are mixed resins in which polyolefin resin containing a functional group derived from carboxylic acid whose percentage deviates from the range of the present invention is dispersed in polyester resin, and comparative examples 35 to 37 in which these mixed resins are laminated have deteriorated formability and impact resistance.

Comparative example 16 is a film in which modified polyolefin resin with group derived from carboxylic acid and polyester resin are simply mixed with each other, and comparative example 38 in which this film is laminated has greatly deteriorated formability and impact resistance because modified polyolefin resin is not dispersed in polyester resin in a fine granular form.

Invention examples 14 to 21 are films in which the blending ratio and dispersion state of modified polyolefin resin in polyester resin are changed variously in the range of the present invention, and invention examples 51 to 58 in which the films are laminated under the laminating conditions of the present invention exhibit high formability, impact resistance, adhesion, and cloudiness resistance. However, invention example 51 in which the film of invention example 14 containing a small amount of dispersed modified polyolefin resin is laminated and invention example 57 in which the film of invention example 20 containing a very large amount of modified polyolefin resin is laminated have a tendency toward slightly deteriorated low-temperature impact resistance.

On the other hand, comparative examples 9 to 12 are films in which the blending ratio of modified polyolefin resin in polyester resin does not meet the requirement of the present invention, and comparative examples 31 to 34 in which the films are laminated under the laminating conditions of the present invention have greatly deteriorated formability or impact resistance. Comparative examples 31 and 32 in which the films of comparative examples 9 and 10 containing a small amount of dispersed modified polyolefin resin are laminated have greatly deteriorated room-temperature impact resistance, and comparative examples 33 and 34 in which the films of comparative examples 11 and 12 containing a large amount of modified polyolefin resin are laminated have greatly deteriorated formability.

Invention examples 33 to 37 are films in which titanium dioxide pigment is mixed with a mixed resin of modified polyolefin resin and polyester resin, and invention examples 70 to 74 in which the films are laminated under the laminating conditions of the present invention exhibit high formability, impact resistance, adhesion, and cloudiness resistance, and also provide a white uniform color tone. However, invention example 70 in which the film of invention example 33 in which the added amount of pigment is smaller than a desired range is laminated has slightly insufficient opacifying property of color tone. On the other hand, invention example 74 in which the film of invention example 37 in which the added amount of pigment is larger than a desired range is laminated has slightly deteriorated formability.

Invention examples 22 to 28 are films in which the thickness of each layer of film is changed, and invention examples 59 to 65 in which the films are laminated under the laminating conditions of the present invention exhibit high formability, impact resistance, adhesion, and cloudiness resistance. Since the invention examples 22 and 28 are films in which the total thickness of film exceeds the desired range of the present invention, invention examples 59 and 65 in which the films are laminated have slightly deteriorated formability and impact resistance as compared with the film having a desired thickness. On the other hand, invention examples 17a to 20a are films in which the thickness or thickness ratio of each layer of film deviates from the desired range of the present invention, and invention examples 39a to 42a in which the films are laminated have slightly deteriorated balance of formability and impact resistance as compared with invention examples 22 to 28.

Invention examples 41 and 75 to 78 are films obtained by changing the laminating conditions of the film of invention example 4 in the range of the present invention. If the conditions are within the range of the present invention, high formability, impact resistance, adhesion, and cloudiness resistance are exhibited regardless of the laminating temperature. On the other hand, in comparative example 39, the film of invention example 4 was laminated under conditions lower than the lower limit of laminating temperature range of the present invention, so that the film did not adhere to a steel sheet, and therefore evaluation could not be made. On the other hand, in comparative example 40, the film of invention example 4 was laminated under conditions exceeding the upper limit of laminating temperature range of the present invention, so that the film fused to a laminate roll, and therefore evaluation could not be made.

Invention examples 29 to 31 are films in which a lubricant, free radical inhibitor, and compatibilizing agent are mixed, respectively, in a mixed resin of modified polyolefin resin and polyester resin of the present invention, and invention examples 66 to 68 in which the films are laminated under the laminating conditions of the present invention exhibit high formability, impact resistance, adhesion, and cloudiness resistance. Further, invention examples 66 to 68 also have lubricity, free radical deterioration resistance, and compatibility depending on the function of added additive, and in particular, invention example 68 exhibits excellent low-temperature impact-resistance.

Invention example 32 is a film of the present invention that is manufactured by the two-axis stretching method, and invention examples 69 and 79 in which the film is laminated exhibit high performance. Invention example 79, which has a plane orientation coefficient of 0.015, exhibits a slightly deteriorated formability. Invention example 69, which has a plane orientation coefficient in the range of the seventh invention, exhibits very high formability and impact resistance.

Invention examples 21a and 22a are films using polyester resin other than the present invention as R0 layer, and invention examples 43a and 44a in which the films are laminated have slightly deteriorated adhesion after heating.

TABLE 19

| Sample film | R1 layer - Polyester resin - Resin type | R1 layer - Polyester resin - Additive | R1 layer - Polyolefin resin - Resin type | R1 layer - Polyolefin resin - Weight percentage of functional group derived from carboxylic acid (wt %) | R1 layer - Polyolefin resin - Tg (°C.) | R1 layer - Blending ratio in entire resin (wt %) | R1 layer - Volume percentage of grains with diameter of 0.1 to 5 μm (vol %) | R1 layer - Number of grains with diameter of 0.1 to 5 μm in cube with one side of 10 μm (grains) | R1 layer - Film thickness (μm) | R0 layer - Polyester resin type | R0 layer - Film thickness (μm) | Entire film - Film thickness (R1 + R0) (μm) | Entire film - Thickness ratio of R1 layer to R0 layer R1/R0 | Pigment Type | Pigment Content (wt %) *1) | Stretching |
|---|---|---|---|---|---|---|---|---|---|---|---|---|---|---|---|---|
| Invention example 1 | PET/PBT(90) | None | EM4 | 8 | <-30 | 15 | 12 | 2000 | 22 | PET | 4 | 26 | 5.5 | None | 0 | Non-stretched |
| Invention example 2 | PET/PBT(80) | None | EM4 | 8 | <-30 | 15 | 12 | 2000 | 22 | PET | 4 | 26 | 5.5 | None | 0 | Non-stretched |
| Invention example 3 | PET/PBT(70) | None | EM4 | 8 | <-30 | 15 | 12 | 2000 | 22 | PET | 4 | 26 | 5.5 | None | 0 | Non-stretched |
| Invention example 4 | PET/PBT(60) | None | EM4 | 8 | <-30 | 15 | 12 | 2000 | 22 | PET | 4 | 26 | 5.5 | None | 0 | Non-stretched |
| Invention example 5 | PET/PBT(40) | None | EM4 | 8 | <-30 | 15 | 12 | 2000 | 22 | PET | 4 | 26 | 5.5 | None | 0 | Non-stretched |
| Invention example 6 | PET/PBT(20) | None | EM4 | 8 | <-30 | 15 | 12 | 2000 | 22 | PET | 4 | 26 | 5.5 | None | 0 | Non-stretched |
| Invention example 7 | PET | None | EM4 | 8 | <-30 | 15 | 12 | 2000 | 22 | PET | 4 | 26 | 5.5 | None | 0 | Non-stretched |
| Invention example 7 | PET/I(10) | None | EM4 | 8 | <-30 | 15 | 12 | 2000 | 22 | PET | 4 | 26 | 5.5 | None | 0 | Non-stretched |
| Invention example 8 | PET/PBT(60) | None | EM2 | 18 | <-30 | 15 | 13 | 500 | 22 | PET | 4 | 26 | 5.5 | None | 0 | Non-stretched |
| Invention example 9 | PET/PBT(60) | None | EM4 | 8 | <-30 | 15 | 12 | 2000 | 22 | PET | 4 | 26 | 5.5 | None | 0 | Non-stretched |
| Invention example 10 | PET/PBT(60) | None | EM5 | 7 | <-30 | 15 | 12 | 2000 | 22 | PET | 4 | 26 | 5.5 | None | 0 | Non-stretched |
| Invention example 11 | PET/PBT(60) | None | EM6 | 5 | <-30 | 15 | 12 | 2000 | 22 | PET | 4 | 26 | 5.5 | None | 0 | Non-stretched |
| Invention example 12 | PET/PBT(60) | None | EM8 | 6 | 20 | 15 | 12 | 2000 | 22 | PET | 4 | 26 | 5.5 | None | 0 | Non-stretched |
| Invention example 13 | PET/PBT(60) | None | EM3 | 11 | <-30 | 5 | 3 | 3 | 22 | PET | 4 | 26 | 5.5 | None | 0 | Non-stretched |
| Invention example 14 | PET/PBT(60) | None | EM3 | 11 | <-30 | 5 | 5 | 70 | 22 | PET | 4 | 26 | 5.5 | None | 0 | Non-stretched |
| Invention example 15 | PET/PBT(60) | None | EM3 | 11 | <-30 | 10 | 8 | 30 | 22 | PET | 4 | 26 | 5.5 | None | 0 | Non-stretched |
| Invention example 16 | PET/PBT(60) | None | EM3 | 11 | <-30 | 10 | 10 | 250 | 22 | PET | 4 | 26 | 5.5 | None | 0 | Non-stretched |
| Invention example 17 | PET/PBT(60) | None | EM3 | 11 | <-30 | 15 | 15 | 500 | 22 | PET | 4 | 26 | 5.5 | None | 0 | Non-stretched |
| Invention example 18 | PET/PBT(60) | None | EM3 | 11 | <-30 | 15 | 18 | 20000 | 22 | PET | 4 | 26 | 5.5 | None | 0 | Non-stretched |
| Invention example 19 | PET/PBT(60) | None | EM3 | 11 | <-30 | 15 | 18 | 20000 | 22 | PET | 4 | 26 | 5.5 | None | 0 | Non-stretched |

TABLE 19-continued

| Sample film | R1 layer | | | | | | | | | R0 layer | | | Entire film | | | |
|---|---|---|---|---|---|---|---|---|---|---|---|---|---|---|---|---|
| | Polyester resin | | Polyolefin resin | | | | | | | Polyester resin type | Film thickness (μm) | Film thickness (R1 + R0) (μm) | Thickness ratio of R1 layer to R0 layer R1/R0 | Pigment | | Stretching |
| | Resin type | Additive | Resin type | Weight percentage of functional group derived from carboxylic acid (wt %) | Tg (° C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) | | | | | Type | Content (wt %) | *1) |
| Invention example 20 | PET/PBT(60) | None | EM3 | 11 | <−30 | 20 | 22 | 200000 | 22 | PET | 4 | 26 | 5.5 | None | 0 | Non-stretched |
| Invention example 21 | PET/PBT(60) | None | EM3 | 11 | <−30 | 28 | 20 | 8000 | 22 | PET | 4 | 26 | 5.5 | None | 0 | Non-stretched |
| Invention example 22 | PET/PBT(60) | None | EM6 | 5 | <−30 | 15 | 12 | 2000 | 10 | PET | 1 | 11 | 10.0 | None | 0 | Non-stretched |
| Invention example 23 | PET/PBT(60) | None | EM6 | 5 | <−30 | 15 | 12 | 2000 | 15 | PET | 3 | 18 | 5.0 | None | 0 | Non-stretched |
| Invention example 24 | PET/PBT(60) | None | EM6 | 5 | <−30 | 15 | 12 | 2000 | 20 | PET | 3 | 23 | 6.7 | None | 0 | Non-stretched |
| Invention example 25 | PET/PBT(60) | None | EM6 | 5 | <−30 | 15 | 12 | 2000 | 25 | PET | 5 | 30 | 5.0 | None | 0 | Non-stretched |
| Invention example 26 | PET/PBT(60) | None | EM6 | 5 | <−30 | 15 | 12 | 2000 | 30 | PET | 4 | 34 | 7.5 | None | 0 | Non-stretched |
| Invention example 27 | PET/PBT(60) | None | EM6 | 5 | <−30 | 15 | 12 | 2000 | 45 | PET | 5 | 50 | 9.0 | None | 0 | Non-stretched |
| Invention example 28 | PET/PBT(60) | None | EM6 | 5 | <−30 | 15 | 12 | 2000 | 50 | PET | 10 | 60 | 5.0 | None | 0 | Non-stretched |
| Invention example 29 | PET/PBT(60) | *2) 0.3 wt % | EM3 | 11 | <−30 | 15 | 12 | 2000 | 22 | PET | 4 | 26 | 5.5 | None | 0 | Non-stretched |
| Invention example 30 | PET/PBT(60) | *3) 0.1 wt % | EM3 | 11 | <−30 | 15 | 12 | 2000 | 22 | PET | 4 | 26 | 5.5 | None | 0 | Non-stretched |
| Invention example 31 | PET/PBT(60) | *4) 3 wt % | EM3 | 11 | <−30 | 15 | 12 | 2000 | 22 | PET | 4 | 26 | 5.5 | None | 0 | Non-stretched |

*1) Pigment content means weight percentage (wt %) of pigment with respect to total film amount of entire resin and pigment. Pigment is added to R1 layer.
*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond First 20B (manufactured by Sumitomo Chemical Co., Ltd.) of compatibilizing agent is added by 3 weight part to 100 weight part of mixed resin

TABLE 20

| Sample film | R1 layer - Polyester resin - Resin type | R1 layer - Polyester resin - Additive type | R1 layer - Polyolefin resin - Resin type | R1 layer - Polyolefin resin - Weight percentage of functional group derived from carboxylic acid (wt %) | R1 layer - Polyolefin resin - Tg (°C) | R1 layer - Polyolefin resin - Blending ratio in entire resin (wt %) | R1 layer - Polyolefin resin - Volume percentage of grains with diameter of 0.1 to 5 μm (vol %) | R1 layer - Polyolefin resin - Number of grains with diameter of 0.1 to 5 μm in cube with one side of 10 μm (grains) | R1 layer - Film thickness (μm) | R0 layer - Polyester Resin type | R0 layer - Film thickness (μm) | Entire film - Thickness - Film thickness (R1 + R0) (μm) | Entire film - Thickness - ratio of R1 layer to R0 layer R1/R0 | Entire film - Pigment - Type | Entire film - Pigment - Content (wt %) *1) | Stretching *1) |
|---|---|---|---|---|---|---|---|---|---|---|---|---|---|---|---|---|
| Invention example 32 | PET/PBT(60) | None | EM4 | 8 | <−30 | 15 | 12 | 2000 | 22 | PET | 4 | 26 | 5.5 | None | 0 | Two-axis stretched |
| Invention example 33 | PET/PBT(60) | None | EM5 | 7 | <−30 | 15 | 12 | 2000 | 22 | PET | 4 | 26 | 5.5 | TiO$_2$ | 3 | Non-stretched |
| Invention example 34 | PET/PBT(60) | None | EM5 | 7 | <−30 | 15 | 12 | 2000 | 22 | PET | 4 | 26 | 5.5 | TiO$_2$ | 7 | Non-stretched |
| Invention example 35 | PET/PBT(60) | None | EM5 | 7 | <−30 | 15 | 12 | 2000 | 22 | PET | 4 | 26 | 5.5 | TiO$_2$ | 15 | Non-stretched |
| Invention example 36 | PET/PBT(60) | None | EM5 | 7 | <−30 | 15 | 12 | 2000 | 22 | PET | 4 | 26 | 5.5 | TiO$_2$ | 30 | Non-stretched |
| Invention example 37 | PET/PBT(60) | None | EM5 | 7 | <−30 | 15 | 12 | 2000 | 22 | PET | 4 | 26 | 5.5 | TiO$_2$ | 50 | Non-stretched |
| Comparative example 1 | PET/PBT(90) | None | None | — | — | 0 | 0 | 0 | 22 | PET | 4 | 26 | 5.5 | None | 0 | Non-stretched |
| Comparative example 2 | PET/PBT(80) | None | None | — | — | 0 | 0 | 0 | 22 | PET | 4 | 26 | 5.5 | None | 0 | Non-stretched |
| Comparative example 3 | PET/PBT(70) | None | None | — | — | 0 | 0 | 0 | 22 | PET | 4 | 26 | 5.5 | None | 0 | Non-stretched |
| Comparative example 4 | PET/PBT(60) | None | None | — | — | 0 | 0 | 0 | 22 | PET | 4 | 26 | 5.5 | None | 0 | Two-axis stretched |
| Comparative example 5 | PET/PBT(60) | None | None | — | — | 0 | 0 | 0 | 22 | PET | 4 | 26 | 5.5 | None | 0 | Non-stretched |
| Comparative example 6 | PET/PBT(40) | None | None | — | — | 0 | 0 | 0 | 22 | PET | 4 | 26 | 5.5 | None | 0 | Non-stretched |
| Comparative example 7 | PET/PBT(20) | None | None | — | — | 0 | 0 | 0 | 22 | PET | 4 | 26 | 5.5 | None | 0 | Non-stretched |
| Comparative example 8 | PET | None | None | — | — | 0 | 0 | 0 | 22 | PET | 4 | 26 | 5.5 | None | 0 | Non-stretched |
| Comparative example 9 | PET/PBT(60) | None | EM3 | 11 | <−30 | 2 | 2 | 3 | 22 | PET | 4 | 26 | 5.5 | None | 0 | Non-stretched |
| Comparative example 10 | PET/PBT(60) | None | EM3 | 11 | <−30 | 2 | 2 | 45 | 22 | PET | 4 | 26 | 5.5 | None | 0 | Non-stretched |
| Comparative example 11 | PET/PBT(60) | None | EM3 | 11 | <−30 | 35 | 28 | 15000 | 22 | PET | 4 | 26 | 5.5 | None | 0 | Non-stretched |
| Comparative example 12 | PET/PBT(60) | None | EM3 | 11 | <−30 | 35 | 28 | 120000 | 22 | PET | 4 | 26 | 5.5 | None | 0 | Non-stretched |

TABLE 20-continued

| Sample film | R1 layer | | | | | | | | | R0 layer | | | Entire film | | | |
|---|---|---|---|---|---|---|---|---|---|---|---|---|---|---|---|---|
| | Polyester resin | | Polyolefin resin | | | | | | | | | | Thickness | | Pigment | |
| | Resin type | Additive type | Resin type | Weight percentage of functional group derived from carboxylic acid (wt %) | Tg (° C.) | Blending ratio in entire resin (wt %) | Volume percentage of grains with diameter of 0.1 to 5 µm (vol %) | Number of grains with diameter of 0.1 to 5 µm in cube with one side of 10 µm (grains) | Film thickness (µm) | Polyester Resin type | Film thickness (µm) | Film thickness (R1 + R0) (µm) | ratio of R0 layer to R1 layer R1/R0 | Type | Content (wt %) *1) | Stretching *1) |
| Comparative example 13 | PET/PBT(60) | None | EM1 | 21 | <-30 | 15 | 14 | 40 | 22 | PET | 4 | 26 | 5.5 | None | 0 | Non-stretched |
| Comparative example 14 | PET/PBT(60) | None | EM7 | 1 | <-30 | 15 | 3 | 20 | 22 | PET | 4 | 26 | 5.5 | None | 0 | Non-stretched |
| Comparative example 15 | PET/PBT(60) | None | EPR | 0 | <-30 | 15 | 1 | 5 | 22 | PET | 4 | 26 | 5.5 | None | 0 | Non-stretched |
| Comparative example 16 | PET/PBT(60) | None | EM5 | 7 | <-30 | 15 | Not dispersed in fine grains | Not dispersed in fine grains | 7 | PET | 1 | 8 | 7.0 | None | 0 | Non-stretched |
| Invention example 17a | PET/PBT(60) | None | EM6 | 5 | <-30 | 15 | 12 | 2000 | 60 | PET | 10 | 70 | 6.0 | None | 0 | Non-stretched |
| Invention example 18a | PET/PBT(60) | None | EM6 | 5 | <-30 | 15 | 12 | 2000 | 20 | PET | 1.5 | 21.5 | 13.3 | None | 0 | Non-stretched |
| Invention example 19a | PET/PBT(60) | None | EM6 | 5 | <-30 | 15 | 12 | 2000 | 15 | PET | 8 | 23 | 1.9 | None | 0 | Non-stretched |
| Invention example 20a | PET/PBT(60) | None | EM4 | 8 | <-30 | 15 | 12 | 2000 | 22 | PET/PBT (60) | 4 | 26 | 5.5 | None | 0 | Non-stretched |
| Invention example 21a | PET/PBT(60) | None | EM4 | 8 | <-30 | 15 | 12 | 2000 | 22 | PET/I (10) | 4 | 26 | 5.5 | None | 0 | Non-stretched |

*1) Pigment content means weight percentage (wt %) of pigment with respect to total film amount of entire resin and pigment. Pigment is added to R1 layer.

TABLE 21

| Laminated metal sheet | Sample film | Melting point of R1 layer polyester resin (°C) | Laminating temp. (°C) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Cloudiness of retorted film | Forma-bility | Impact resistance (room temp.) | Impact resistance (low temp.) | Adhesion after forming | Adhesion after heating | Cloudiness of retorted film |
| Invention example 38 | Invention example 1 | 215 | 200 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 39 | Invention example 2 | 220 | 210 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 40 | Invention example 3 | 230 | 210 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 41 | Invention example 4 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 42 | Invention example 5 | 240 | 220 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 43 | Invention example 6 | 245 | 225 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 44 | Invention example 7 | 255 | 235 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 45 | Invention example 8 | 230 | 210 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 46 | Invention example 9 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 47 | Invention example 10 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 48 | Invention example 11 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 49 | Invention example 12 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 50 | Invention example 13 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 51 | Invention example 14 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 52 | Invention example 15 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 53 | Invention example 16 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 54 | Invention example 17 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 55 | Invention example 18 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 56 | Invention example 19 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 57 | Invention example 20 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 58 | Invention example 21 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |
| Invention example 59 | Invention example 22 | 235 | 215 | 0 | ⊚ | ⊚ | ⊚⊚⊚ | ○ | ⊚⊚ | ⊚⊚ | ⊚ | ⊚ | ⊚⊚⊚ | ○ | ⊚⊚ | ⊚⊚ |

TABLE 21-continued

| Laminated metal sheet | Sample film | Melting point of R1 layer polyester resin (° C.) | Laminating temp. (° C.) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Cloudiness of retorted film | Forma-bility | Impact resistance (room temp.) | Impact resistance (low temp.) | Adhesion after forming | Adhesion after heating | Cloudiness of retorted film |
| Invention example 60 | Invention example 23 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 61 | Invention example 24 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 62 | Invention example 25 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 63 | Invention example 26 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 64 | Invention example 27 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 65 | Invention example 28 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 66 | Invention example 29 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 67 | Invention example 30 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |
| Invention example 68 | Invention example 31 | 235 | 215 | 0 | ⊚ | ⊚ | ⊚⊚⊙ | ⊚ | ⊚⊙ | ⊚⊙ | ⊚ | ⊚ | ⊚⊚⊙ | ⊚ | ⊚⊙ | ⊚⊙ |

TABLE 22

| Laminated metal sheet | Sample film | Melting point of R1 layer polyester resin (°C) | Laminating temp. (°C) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Formability | Impact resistance (room temp.) | Impact resistance (low temp.) | Adhesion after forming | Adhesion after heating | Cloudiness of retorted film | Formability | Impact resistance (room temp.) | Impact resistance (low temp.) | Adhesion after forming | Adhesion after heating | Cloudiness of retorted film |
| Invention example 69 | Invention example 32 | 235 | 215 | 0.005 | ◎ | ◎ | ◎◎◎ | ◎ | ◎◎ | ◎◎ | ◎ | ◎ | ◎◎◎ | ◎ | ◎◎ | ◎◎ |
| Invention example 70 | Invention example 33 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 71 | Invention example 34 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 72 | Invention example 35 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 73 | Invention example 36 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 74 | Invention example 37 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Invention example 75 | Invention example 4 | 235 | 260 | 0 | ◎ | ◎ | ◎◎◎ | ◎ | ◎◎ | ◎◎ | ◎ | ◎ | ◎◎◎ | ◎ | ◎◎ | ◎◎ |
| Invention example 76 | Invention example 4 | 235 | 230 | 0 | ◎ | ◎ | ◎◎◎ | ◎ | ◎◎ | ◎◎ | ◎ | ◎ | ◎◎◎ | ◎ | ◎◎ | ◎◎ |
| Invention example 77 | Invention example 4 | 235 | 190 | 0 | ◎ | ◎ | ◎◎◎ | ◎ | ◎◎ | ◎◎ | ◎ | ◎ | ◎◎◎ | ◎ | ◎◎ | ◎◎ |
| Invention example 78 | Invention example 4 | 235 | 170 | 0 | ◎ | ◎ | ◎◎◎ | ◎ | ◎◎ | ◎◎ | ◎ | ◎ | ◎◎◎ | ◎ | ◎◎ | ◎◎ |
| Invention example 79 | Invention example 32 | 235 | 200 | 0.015 | ◎ | ◎ | ◎◎◎ | ◎ | ◎◎ | ◎◎ | ◎ | ◎ | ◎◎◎ | ◎ | ◎◎ | ◎◎ |
| Comparative example 23 | Comparative example 1 | 215 | 200 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 24 | Comparative example 2 | 220 | 210 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 25 | Comparative example 3 | 230 | 210 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 26 | Comparative example 4 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 27 | Comparative example 5 | 240 | 220 | 0.015 | ◎ | ◎ | ◎◎◎ | ◎ | ◎◎ | ◎◎ | ◎ | ◎ | ◎◎◎ | ◎ | ◎◎ | ◎◎ |
| Comparative example 28 | Comparative example 6 | 245 | 225 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 29 | Comparative example 7 | 255 | 235 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 30 | Comparative example 8 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 31 | Comparative example 9 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 32 | Comparative example 10 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |
| Comparative example 33 | Comparative example 11 | 235 | 215 | 0 | ◎ | ◎ | ◎◎◎ | ◎ | ◎◎ | ◎◎ | ◎ | ◎ | ◎◎◎ | ◎ | ◎◎ | ◎◎ |

TABLE 22-continued

| Laminated metal sheet | Sample film | Melting point of R1 layer polyester resin (° C.) | Laminating temp. (° C.) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Forma-bility | Impact resistance (room temp.) | Impact resistance (low temp.) | Adhesion after forming | Adhesion after heating | Cloudiness of retorted film | Forma-bility | Impact resistance (room temp.) | Impact resistance (low temp.) | Adhesion after forming | Adhesion after heating | Cloudiness of retorted film |
| Comparative example 34 | Comparative example 12 | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 35 | Comparative example 13 | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 36 | Comparative example 14 | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 37 | Comparative example 15 | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Comparative example 38 | Comparative example 16 | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 39a | Invention example 17a | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 40a | Invention example 18a | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 41a | Invention example 19a | 235 | 215 | 0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 42a | Invention example 20a | 235 | 215 | 0 | ⊚ | ⊚ | ⊚⊚⊚ | ⊚ | ○ | ⊚⊚ | ⊚ | ⊚ | ⊚⊚⊚ | ⊚ | ○ | ⊚⊚ |
| Invention example 43a | Invention example 21a | 235 | 215 | 0 | ⊚ | ⊚ | ⊚⊚⊚ | ⊚ | ○ | ⊚⊚ | ⊚ | ⊚ | ⊚⊚⊚ | ⊚ | ○ | ⊚⊚ |
| Invention example 44a | Invention example 22a | 235 | 270 | — | — | — | — | — | — | — | — | — | — | — | — | — |
| Comparative example 39 | Comparative example 4 | 235 | 160 | — | — | — | — | — | — | — | — | — | — | — | — | — |
| Comparative example 40 | Comparative example 4 | | | | | | | | | | | | | | | |

Example 6

Modified polyolefin resin with group derived from carboxylic acid having a primary grain diameter of 0.3 µm, which was a starting raw material, was cold blended with polyester resin in a blending ratio given in Tables 23 and 24 by using a tumbler blender, and then the blended resin was melted and kneaded at 260° C. by using a two-axis extruding machine, by which a raw material pellet of polyester resin in which modified polyolefin resin was dispersed was obtained. In the tables, the resin type corresponding to the symbol of resin type of polyester resin and resin type of polyolefin resin is the same as that described in Example 5.

As a metal sheet, as in Example 5, a tin-free steel (hereinafter abbreviated to TFS) with a thickness of 0.18 mm for thin-wall deep drawn can and 0.23 mm for DI can, which had a degree of temper of DR9, metallic chromium layer of 80 mg/m$^2$, and chromium oxide layer of 15 mg/m$^2$ (metallic chromium conversion), was used, by which a both-side laminated metal sheet was obtained by a method in which the raw material resin pellet was inserted in a one-axis extruding machine as a resin for R1 layer, a resin for R0 layer was inserted in a separate extruding machine and simultaneously melted and extruded, molten resin was put in a T die by a combining adapter, two-layer molten resin was extruded directly onto one surface of the metal sheet, the extruded resin was once cooled while being held adherently between two rolls, and immediately after the resin was laminated on the opposite surface in the same manner, the resin laminated metal sheet was cooled rapidly in water. The temperature of metal sheet at the laminating time was 230° C. The lip opening width of T die was adjusted so that the thickness of resin film was 9.5 to 70 µm. The type of sample resin and the resin melting temperature at the laminating time are given in Tables 23 and 24. The used polyester resin and modified polyolefin resin with group derived from carboxylic acid are the same as those used in Example 5.

Pelletized modified polyolefin resin with group derived from carboxylic acid, which was a starting raw material, was mixed with polyester resin in a blending ratio given in comparative example 61 in Table 25, the mixed resin was melted and kneaded at 265° C. by using a one-axis extruding machine, and the obtained mixed resin of modified polyolefin resin and polyester resin was extruded from a T die as R1 layer, by which the resin that had been directly extruded to a thickness of 26 µm was laminated to the TFS.

All of the grain diameter of modified polyolefin resin dispersed in resin film, various temperatures in the table, and the method for measuring the plane orientation coefficient of resin laminated metal sheet are the same as those in Example 5. As in Example 5, a thin-wall deep drawn can or a DI can was manufactured from the laminated metal sheet obtained as described above, and the can was subjected to straightening heat treatment to manufacture a sample can. The formability, impact resistance, adhesion, and retort resistance of film of the manufactured can body were investigated as in Example 5.

The investigation results are given in Tables 25 and 26.

From Tables 23 to 26, the following facts are found for either can type.

Invention examples 80 to 90 are films using a resin layer in which modified polyolefin resin specified in the present invention is dispersed in polyester resin in which the ratio of polyethylene terephthalate to polybutylene terephthalate is changed variously as R1 layer, and exhibit high formability, impact resistance, adhesion, and cloudiness resistance. Among these, invention example 89 using polyester resin having a low percentage of polybutylene terephthalate and invention example 90 further using homopolyethylene terephthalate have a tendency for adhesion after heating and cloudiness resistance after retorting to be deteriorated as the percentage of polybutylene terephthalate becomes low, but still have high performance as a whole. Also, invention example 91 using polyethylene terephthalate in which polyester resin is copolymerized by isophthalic acid has a tendency for adhesion after heating and cloudiness resistance after retorting to be deteriorated slightly, but still have high performance as a whole. On the other hand, invention examples 80 and 81 having a very high percentage of polybutylene terephthalate have a tendency toward deteriorated adhesion after heating because the melting point is slightly low, but have high performance as a whole. On the other hand, comparative examples 47 to 53 are examples in which polyester resin in which the mixing ratio of polyethylene terephthalate to polybutylene-terephthalate is changed variously does not contain polyolefin resin, and especially have a low level of impact resistance.

Invention examples 91 to 96 are films using mixed resin in which various types of polyolefin resins are dispersed in polyester resin as R1 layer, and exhibit high formability, impact resistance, adhesion, and cloudiness resistance. However, invention example 92 using polyolefin resin having a slightly high percentage of functional group derived from carboxylic acid and invention example 96 using polyolefin resin having a slightly high glass-transition temperature have a tendency toward slightly deteriorated low-temperature impact resistance. On the other hand, comparative examples 58 to 60 are mixed resins in which polyolefin resin containing a functional group derived from carboxylic acid whose percentage deviates from the range of the present invention is dispersed in polyester resin, and have deteriorated formability and impact resistance.

Comparative example 61 is a resin in which modified polyolefin resin with group derived from carboxylic acid and polyester resin are simply mixed with each other, and has greatly deteriorated formability and impact resistance because modified polyolefin resin is not dispersed in polyester resin in a fine granular form.

Invention examples 97 to 104 are resins in which the blending ratio and dispersion state of modified polyolefin resin in polyester resin are changed variously in the range of the present invention, and exhibit high formability, impact resistance, adhesion, and cloudiness resistance. However, invention example 97 containing a small amount of dispersed modified polyolefin resin and invention example 103 containing a very large amount of modified polyolefin resin have a tendency toward slightly deteriorated low-temperature impact resistance.

On the other hand, comparative examples 54 to 57 are resins in which the blending ratio of modified polyolefin resin in polyester resin does not meet the requirement of the present invention, and have greatly deteriorated formability or impact resistance. Comparative examples 54 and 55 containing a small amount of dispersed modified polyolefin resin have greatly deteriorated room-temperature impact resistance, and comparative examples 56 and 57 containing a large amount of modified polyolefin resin have greatly deteriorated formability.

Invention examples 115 to 119 are resins in which titanium dioxide pigment is mixed with a mixed resin of modified polyolefin resin and polyester resin, and exhibit high formability, impact resistance, adhesion, and cloudiness resistance, and also provide a white uniform color tone. However, invention example 115 in which the added amount of pigment is smaller than a desired range has slightly insufficient opacifying property of color tone. On the other hand, invention example 119 in which the added amount of pigment is larger than a desired range has slightly deteriorated formability.

Invention examples 105 to 111 are resins in which the thickness of each layer of film is changed, and exhibit high formability, impact resistance, adhesion, and cloudiness resistance. Since the invention examples 105 and 111 are resins in which the total thickness of film exceeds the desired range of the present invention, both formability and impact resistance are slightly deteriorated as compared with the resin having a desired film thickness. On the other hand, invention examples 120 to 123 are resins in which the thickness or thickness ratio of each layer of film-deviates from the desired range of the present invention, and have slightly deteriorated balance of formability and impact resistance as compared with invention examples 105 to 111.

Invention examples 112 to 114 are resins in which a lubricant, free radical inhibitor, and compatibilizing agent are mixed, respectively, in a mixed resin of modified polyolefin resin and polyester resin of the present invention, and exhibit high formability, impact resistance, adhesion, and cloudiness resistance. Further, invention examples 112 to 114 also have lubricity, free radical deterioration resistance, and compatibility depending on the function of added additive, and in particular, invention example 114 exhibits excellent low-temperature impact resistance.

Invention examples 124 and 125 are resins using polyester resin other than the present invention as R0 layer, and have slightly deteriorated adhesion after heating.

TABLE 23

| | R1 layer | | | | | | |
|---|---|---|---|---|---|---|---|
| | Polyester resin | | | Polyolefin resin | | | |
| | | | | | Weight percentage | | Blending |
| Sample film | Resin type | Melting point of polyester resin (° C.) | Additive | Resin type | of functional group derived from carboxylic acid (wt %) | Tg (° C.) | ratio in entire resin (wt %) |
| Invention example 80 | PET/PBT(90) | 215 | None | EM4 | 8 | <−30 | 15 |
| Invention example 81 | PET/PBT(80) | 220 | None | EM4 | 8 | <−30 | 15 |
| Invention example 82 | PET/PBT(70) | 230 | None | EM4 | 8 | <−30 | 15 |
| Invention example 83 | PET/PBT(60) | 235 | None | EM4 | 8 | <−30 | 15 |
| Invention example 84 | PET/PBT(60) | 235 | None | EM4 | 8 | <−30 | 15 |
| Invention example 85 | PET/PBT(60) | 235 | None | EM4 | 8 | <−30 | 15 |
| Invention example 86 | PET/PBT(60) | 235 | None | EM4 | 8 | <−30 | 15 |
| Invention example 87 | PET/PBT(60) | 235 | None | EM4 | 8 | <−30 | 15 |
| Invention example 88 | PET/PBT(40) | 240 | None | EM4 | 8 | <−30 | 15 |
| Invention example 89 | PET/PBT(20) | 245 | None | EM4 | 8 | <−30 | 15 |
| Invention example 90 | PET | 255 | None | EM4 | 8 | <−30 | 15 |
| Invention example 91 | PET/I(10) | 230 | None | EM4 | 8 | <−30 | 15 |
| Invention example 92 | PET/PBT(60) | 235 | None | EM2 | 18 | <−30 | 15 |
| Invention example 93 | PET/PBT(60) | 235 | None | EM4 | 8 | <−30 | 15 |
| Invention example 94 | PET/PBT(60) | 235 | None | EM5 | 7 | <−30 | 15 |
| Invention example 95 | PET/PBT(60) | 235 | None | EM6 | 5 | <−30 | 15 |
| Invention example 96 | PET/PBT(60) | 235 | None | EM8 | 6 | 20 | 15 |
| Invention example 97 | PET/PBT(60) | 235 | None | EM3 | 11 | <−30 | 5 |
| Invention example 98 | PET/PBT(60) | 235 | None | EM3 | 11 | <−30 | 5 |
| Invention example 99 | PET/PBT(60) | 235 | None | EM3 | 11 | <−30 | 10 |
| Invention example 100 | PET/PBT(60) | 235 | None | EM3 | 11 | <−30 | 10 |
| Invention example 101 | PET/PBT(60) | 235 | None | EM3 | 11 | <−30 | 15 |
| Invention example 102 | PET/PBT(60) | 235 | None | EM3 | 11 | <−30 | 15 |

TABLE 23-continued

| Invention example 103 | PET/PBT(60) | 235 | None | EM3 | 11 | <−30 | 20 |
| Invention example 104 | PET/PBT(60) | 235 | None | EM3 | 11 | <−30 | 28 |
| Invention example 105 | PET/PBT(60) | 235 | None | EM6 | 5 | <−30 | 15 |
| Invention example 106 | PET/PBT(60) | 235 | None | EM6 | 5 | <−30 | 15 |
| Invention example 107 | PET/PBT(60) | 235 | None | EM6 | 5 | <−30 | 15 |
| Invention example 108 | PET/PBT(60) | 235 | None | EM6 | 5 | <−30 | 15 |
| Invention example 109 | PET/PBT(60) | 235 | None | EM6 | 5 | <−30 | 15 |
| Invention example 110 | PET/PBT(60) | 235 | None | EM6 | 5 | <−30 | 15 |
| Invention example 111 | PET/PBT(60) | 235 | None | EM6 | 5 | <−30 | 15 |

| Sample film | R1 layer Polyolefin resin | | R0 layer | Pigment | | Melting temp. of R1 layer resin at extrusion laminating time (° C.) |
| | Volume percentage of grains with diameter of 0.1 to 5 μm (vol %) | Number of grains with diameter of 0.1 to 5 μm in cube with one side of 10 μm (grains) | Polyester resin Resin type | Type | Content (wt %) *1) | |
| --- | --- | --- | --- | --- | --- | --- |
| Invention example 80 | 14 | 2500 | PET | None | 0 | 245 |
| Invention example 81 | 14 | 2500 | PET | None | 0 | 250 |
| Invention example 82 | 14 | 2500 | PET | None | 0 | 260 |
| Invention example 83 | 14 | 2500 | PET | None | 0 | 240 |
| Invention example 84 | 14 | 2500 | PET | None | 0 | 250 |
| Invention example 85 | 14 | 2500 | PET | None | 0 | 265 |
| Invention example 86 | 14 | 2500 | PET | None | 0 | 280 |
| Invention example 87 | 14 | 2500 | PET | None | 0 | 290 |
| Invention example 88 | 14 | 2500 | PET | None | 0 | 270 |
| Invention example 89 | 14 | 2500 | PET | None | 0 | 275 |
| Invention example 90 | 14 | 2500 | PET | None | 0 | 285 |
| Invention example 91 | 14 | 2500 | PET | None | 0 | 260 |
| Invention example 92 | 15 | 1000 | PET | None | 0 | 265 |
| Invention example 93 | 14 | 2500 | PET | None | 0 | 265 |
| Invention example 94 | 14 | 2500 | PET | None | 0 | 265 |
| Invention example 95 | 14 | 2500 | PET | None | 0 | 265 |
| Invention example 96 | 14 | 2500 | PET | None | 0 | 265 |
| Invention example 97 | 4 | 4 | PET | None | 0 | 265 |
| Invention example 98 | 8 | 100 | PET | None | 0 | 265 |
| Invention example 99 | 10 | 50 | PET | None | 0 | 265 |
| Invention example 100 | 12 | 500 | PET | None | 0 | 265 |
| Invention example 101 | 18 | 800 | PET | None | 0 | 265 |
| Invention example 102 | 20 | 22000 | PET | None | 0 | 265 |
| Invention example 103 | 24 | 250000 | PET | None | 0 | 265 |
| Invention example 104 | 22 | 10000 | PET | None | 0 | 265 |

TABLE 23-continued

|  |  |  |  |  |  |  |
|---|---|---|---|---|---|---|
| Invention example 105 | 14 | 2500 | PET | None | 0 | 265 |
| Invention example 106 | 14 | 2500 | PET | None | 0 | 265 |
| Invention example 107 | 14 | 2500 | PET | None | 0 | 265 |
| Invention example 108 | 14 | 2500 | PET | None | 0 | 265 |
| Invention example 109 | 14 | 2500 | PET | None | 0 | 265 |
| Invention example 110 | 14 | 2500 | PET | None | 0 | 265 |
| Invention example 111 | 14 | 2500 | PET | None | 0 | 265 |

*1) Pigment content means weight percentage (wt %) of pigment with respect to total film amount of entire resin and pigment. Pigment is added to R1 layer.

TABLE 24

| | R1 layer | | | | | | |
|---|---|---|---|---|---|---|---|
| | Polyester resin | | | Polyolefin resin | | | Blending |
| Sample film | Resin type | Melting point of polyester resin (° C.) | Additive | Resin type | Weight percentage of functional group derived from carboxylic acid (wt %) | Tg (° C.) | ratio in entire resin (wt %) |
| Invention example 112 | PET/PBT(60) | 235 | *2) 0.3 wt % | EM3 | 11 | <−30 | 15 |
| Invention example 113 | PET/PBT(60) | 235 | *3) 0.1 wt % | EM3 | 11 | <−30 | 15 |
| Invention example 114 | PET/PBT(60) | 235 | *4) 3 wt % | EM3 | 11 | <−30 | 15 |
| Invention example 115 | PET/PBT(60) | 235 | None | EM5 | 7 | <−30 | 15 |
| Invention example 116 | PET/PBT(60) | 235 | None | EM5 | 7 | <−30 | 15 |
| Invention example 117 | PET/PBT(60) | 235 | None | EM5 | 7 | <−30 | 15 |
| Invention example 118 | PET/PBT(60) | 235 | None | EM5 | 7 | <−30 | 15 |
| Invention example 119 | PET/PBT(60) | 235 | None | EM5 | 7 | <−30 | 15 |
| Comparative example 47 | PET/PBT(90) | 215 | None | None | — | — | 0 |
| Comparative example 48 | PET/PBT(80) | 220 | None | None | — | — | 0 |
| Comparative example 49 | PET/PBT(70) | 230 | None | None | — | — | 0 |
| Comparative example 50 | PET/PBT(60) | 235 | None | None | — | — | 0 |
| Comparative example 51 | PET/PBT(40) | 245 | None | None | — | — | 0 |
| Comparative example 52 | PET/PBT(20) | 255 | None | None | — | — | 0 |
| Comparative example 53 | PET | 235 | None | None | — | — | 0 |
| Comparative example 54 | PET/PBT(60) | 235 | None | EM3 | 11 | <−30 | 2 |
| Comparative example 55 | PET/PBT(60) | 235 | None | EM3 | 11 | <−30 | 2 |
| Comparative example 56 | PET/PBT(60) | 235 | None | EM3 | 11 | <−30 | 35 |
| Comparative example 57 | PET/PBT(60) | 235 | None | EM3 | 11 | <−30 | 35 |
| Comparative example 58 | PET/PBT(60) | 235 | None | EM1 | 21 | <−30 | 15 |
| Comparative example 59 | PET/PBT(60) | 235 | None | EM7 | 1 | <−30 | 15 |
| Comparative example 60 | PET/PBT(60) | 235 | None | EPR | 0 | <−30 | 15 |
| Comparative example 61 | PET/PBT(60) | 235 | None | EM5 | 7 | <−30 | 15 |

TABLE 24-continued

| Sample film | | | | | | |
|---|---|---|---|---|---|---|
| Invention example 120 | PET/PBT(60) | 235 | None | EM6 | 5 | <-30 | 15 |
| Invention example 121 | PET/PBT(60) | 235 | None | EM6 | 5 | <-30 | 15 |
| Invention example 122 | PET/PBT(60) | 235 | None | EM6 | 5 | <-30 | 15 |
| Invention example 123 | PET/PBT(60) | 235 | None | EM6 | 5 | <-30 | 15 |
| Invention example 124 | PET/PBT(60) | 235 | None | EM4 | 8 | <-30 | 15 |
| Invention example 125 | PET/PBT(60) | 235 | None | EM4 | 8 | <-30 | 15 |

| Sample film | R1 layer Polyolefin resin | | R0 layer | Pigment | | Melting temp. of R1 layer resin at extrusion laminating time (° C.) |
|---|---|---|---|---|---|---|
| | Volume percentage of grains with diameter of 0.1 to 5 μm (vol %) | Number of grains with diameter of 0.1 to 5 μm in cube with one side of 10 μm (grains) | Polyester resin Resin type | Type | Content (wt %) *1) | |
| Invention example 112 | 14 | 2500 | PET | None | 0 | 265 |
| Invention example 113 | 14 | 2500 | PET | None | 0 | 265 |
| Invention example 114 | 14 | 2500 | PET | None | 0 | 265 |
| Invention example 115 | 14 | 2500 | PET | $TiO_3$ | 3 | 265 |
| Invention example 116 | 14 | 2500 | PET | $TiO_2$ | 7 | 265 |
| Invention example 117 | 14 | 2500 | PET | $TiO_2$ | 15 | 265 |
| Invention example 118 | 14 | 2500 | PET | $TiO_2$ | 30 | 265 |
| Invention example 119 | 14 | 2500 | PET | $TiO_3$ | 50 | 265 |
| Comparative example 47 | 0 | 0 | PET | None | 0 | 245 |
| Comparative example 48 | 0 | 0 | PET | None | 0 | 250 |
| Comparative example 49 | 0 | 0 | PET | None | 0 | 260 |
| Comparative example 50 | 0 | 0 | PET | None | 0 | 265 |
| Comparative example 51 | 0 | 0 | PET | None | 0 | 275 |
| Comparative example 52 | 0 | 0 | PET | None | 0 | 285 |
| Comparative example 53 | 0 | 0 | PET | None | 0 | 265 |
| Comparative example 54 | 3 | 5 | PET | None | 0 | 265 |
| Comparative example 55 | 3 | 50 | PET | None | 0 | 265 |
| Comparative example 56 | 30 | 20000 | PET | None | 0 | 265 |
| Comparative example 57 | 30 | 135000 | PET | None | 0 | 265 |
| Comparative example 58 | 16 | 50 | PET | None | 0 | 265 |
| Comparative example 59 | 4 | 40 | PET | None | 0 | 265 |
| Comparative example 60 | 1 | 4 | PET | None | 0 | 265 |
| Comparative example 61 | Not dispersed in fine grains | Not dispersed in fine grains | PET | None | 0 | 265 |
| Invention example 120 | 14 | 2500 | PET | None | 0 | 265 |
| Invention example 121 | 14 | 2500 | PET | None | 0 | 265 |
| Invention example 122 | 14 | 2500 | PET | None | 0 | 265 |
| Invention example 123 | 14 | 2500 | PET | None | 0 | 265 |
| Invention example 124 | 14 | 2500 | PET/PBT(60) | None | 0 | 265 |

TABLE 24-continued

| Invention example 125 | 14 | 2500 | PET/I(10) | None | 0 | 265 |

*1) Pigment content means weight percentage (wt %) of pigment with respect to total film amount of entire resin and pigment. Pigment is added to R1 layer.

*2) Silicone of lubricant is added by 3 weight part to 100 weight part of mixed resin.

*3) Tetrakis-[Methylene (3,5-di-t-butyl-4-hydroxyhydrocinnamate)] methane of free radical inhibitor is added by 0.1 weight part to 100 weight part of mixed resin.

*4) Bond First 20B (manufactured by Sumitomo Chemical Co., Ltd.) of compatibilizing agent is added by 3 weight part to 100 weight part of mixed resin.

TABLE 25

| Extrusion laminated metal sheet | Resin film thickness | | | Investigation result | | | | | | Drawn and ironed can (DI can) | | | | |
|---|---|---|---|---|---|---|---|---|---|---|---|---|---|---|
| | R1 layer (μm) | R0 layer (μm) | Total film thickness (R1 + R0) (μm) | Thickness ratio of R1 layer to R0 layer R1/R0 | Thin-wall deep drawn can | | | | | | | | | |
| | | | | | Formability | Impact resistance (room temp.) | Impact resistance (low temp.) | Adhesion after forming | Adhesion after heating | Cloudiness of retorted film | Formability | Impact resistance (room temp.) | Impact resistance (low temp.) | Adhesion after forming | Adhesion after heating | Cloudiness of retorted film |
| Invention example 80 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 81 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 82 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 83 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 84 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 85 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 86 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 87 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 88 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 89 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 90 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 91 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 92 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 93 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 94 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 95 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 96 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 97 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 98 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 99 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |
| Invention example 100 | 22 | 4 | 26 | 5.5 | ◎ | ◎◎ | ◎◎◎ | ◎ | ◎◎ | ◎◎ | ◎ | ◎ | ◎◎◎ | ◎ | ◎◎ | ◎◎ |

TABLE 25-continued

| Extrusion laminated metal sheet | Resin film thickness | | | | Investigation result | | | | | | Drawn and ironed can (DI can) | | | | |
|---|---|---|---|---|---|---|---|---|---|---|---|---|---|---|---|
| | R1 layer (μm) | R0 layer (μm) | Total film thickness (R1 + R0) (μm) | Thickness ratio of R1 layer to R0 layer R1/R0 | Thin-wall deep drawn can | | | | | | | | | | |
| | | | | | Formability | Impact resistance (room temp.) | Impact resistance (low temp.) | Adhesion after forming | Adhesion after heating | Cloudiness of retorted film | Formability | Impact resistance (room temp.) | Impact resistance (low temp.) | Adhesion after forming | Adhesion after heating | Cloudiness of retorted film |
| Invention example 101 | 22 | 4 | 26 | 5.5 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 102 | 22 | 4 | 26 | 5.5 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 103 | 22 | 4 | 26 | 5.5 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 104 | 22 | 4 | 26 | 5.5 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 105 | 10 | 1 | 11 | 10.0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 106 | 15 | 3 | 18 | 5.0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 107 | 20 | 3 | 23 | 6.7 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 108 | 25 | 5 | 30 | 5.0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 109 | 30 | 4 | 34 | 7.5 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 110 | 45 | 5 | 50 | 9.0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |
| Invention example 111 | 50 | 10 | 60 | 5.0 | ⊚ | ⊚ | ⊚⊚⊚ | ⊚ | ⊚⊚ | ⊚⊚ | ⊚ | ⊚ | ⊚⊚⊚ | ⊚ | ⊚⊚ | ⊚⊚ |

TABLE 26

| Extrusion laminated metal sheet | Resin film thickness | | | | Investigation result | | | | | | | | | | | |
|---|---|---|---|---|---|---|---|---|---|---|---|---|---|---|---|---|
| | | | | | Thin-wall deep drawn can | | | | | | Drawn and ironed can (DI can) | | | | | |
| | R1 layer (μm) | R0 layer (μm) | Total film thickness (R1 + R0) (μm) | Thickness ratio of R1 layer to R0 layer R1/R0 | Formability | Impact resistance (room temp.) | Impact resistance (low temp.) | Adhesion after forming | Adhesion after heating | Cloudiness of retorted film | Formability | Impact resistance (room temp.) | Impact resistance (low temp.) | Adhesion after forming | Adhesion after heating | Cloudiness of retorted film |
| Invention example 112 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 113 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 114 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 115 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 116 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 117 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 118 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Invention example 119 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 47 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 48 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 49 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 50 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 51 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 52 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 53 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 54 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 55 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 56 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 57 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 58 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |
| Comparative example 59 | 22 | 4 | 26 | 5.5 | ⊚ | ⊚ | ⊚ | ⊚ | ⊚ | ⊚ | ⊚ | ⊚ | ⊚ | ⊚ | ⊚ | ⊚ |

TABLE 26-continued

| Extrusion laminated metal sheet | Resin film thickness | | | | Investigation result | | | | | | | | | | | |
|---|---|---|---|---|---|---|---|---|---|---|---|---|---|---|---|---|
| | | | | | Thin-wall deep drawn can | | | | | | Drawn and ironed can (DI can) | | | | | |
| | R1 layer (μm) | R0 layer (μm) | Total film thickness (R1 + R0) (μm) | Thickness ratio of R1 layer to R0 layer R1/R0 | Formability | Impact resistance (room temp.) | Impact resistance (low temp.) | Adhesion after forming | Adhesion after heating | Cloudiness of retorted film | Formability | Impact resistance (room temp.) | Impact resistance (low temp.) | Adhesion after forming | Adhesion after heating | Cloudiness of retorted film |
| Comparative example 60 | 22 | 4 | 26 | 5.5 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 61 | 22 | 4 | 26 | 5.5 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 120 | 7 | 1 | 8 | 7.0 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 121 | 60 | 10 | 70 | 6.0 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 122 | 20 | 1.5 | 21.5 | 13.3 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 123 | 15 | 8 | 23 | 1.9 | ⊚ | ⊚ | ⊚⊚ | ⊚ | ⊚⊚ | ⊚⊚ | ⊚ | ⊚ | ⊚⊚ | ⊚ | ⊚⊚ | ⊚⊚ |
| Comparative example 124 | 22 | 4 | 26 | 5.5 | ⊚ | ⊚ | ⊚⊚ | ⊚ | ○ | ⊚⊚ | ⊚ | ⊚ | ⊚⊚ | ⊚ | ○ | ⊚⊚ |
| Comparative example 125 | 22 | 4 | 26 | 5.5 | ⊚ | ⊚ | ⊚⊚ | ⊚ | ○ | ⊚⊚ | ⊚ | ⊚ | ⊚⊚ | ⊚ | ○ | ⊚⊚ |

Example 7

As a resin raw material for R1 layer, modified polyolefin resin with group derived from carboxylic acid was cold blended with polyester resin in a blending ratio given in Tables 27 to 29 by using a tumbler blender, and then the blended resin was melted and kneaded at 270° C. by using a two-axis extruding machine, by which a raw material pellet of polyester resin in which modified polyolefin resin was dispersed was obtained. The raw material resin pellet was inserted in a one-axis extruding machine, and on the other hand, modified polyolefin resin, which was a resin raw material for R2 layer, was inserted in a separate one-axis extruding machine, and each of molten resins was introduced into a multi-manifold type T die and extruded in two layers while the film thickness of R1 and R2 layers was controlled by the discharge amount of molten resin from the extruding machine, by which a resin film was manufactured continuously while being cooled by the surface of a rotating metallic roll.

Also, in the case of three-layer construction having R0 layer, polyester resin, which was a resin raw material for R0 layer, was inserted in a separate one-axis extruding machine, and each of molten resins was introduced into a multi-manifold type T die and extruded in three layers while the film thickness of R0, R1 and R2 layers was controlled by the discharge amount of molten resin from the extruding machine, by which a resin film was manufactured continuously while being cooled by the surface of a rotating metallic roll.

The used polyester resin and modified polyolefin resin with group derived from carboxylic acid were as follows:
Polyester resin (1) PET: Polyethylene terephthalate resin, intrinsic viscosity: 0.62 dl/g (2) PET/I: Isophthalic acid copolymerized-polyethylene terephthalate resin with a ratio of terephthalic acid to isophthalic acid of 90:10, intrinsic viscosity: 0.62 dl/g (3) PET/PBT: Mixed resin with a ratio of polyethylene terephthalate to polybutylene terephthalate of 40:60, intrinsic viscosity: 0.6 dl/g (4) PET/AD: Adipic acid copolymerized polyethylene terephthalate resin with a ratio of terephthalic acid to adipic acid of 80:20, intrinsic viscosity: 0.6 dl/g 2. Modified Polyolefin Resin with Group Derived from Carboxylic Acid (1) EM1: Polymethylmethacrylate-(ethylene-ethyl acrylate copolymer) graft copolymer (Modiper A5200 manufactured by NOF Corp.), weight ratio (carboxylic acid conversion) of functional group derived from carboxylic acid: 21 wt %, glass-transition temperature: −30° C. or lower (2) EM2: Polymethyl methacrylate-(ethylene-ethyl acrylate-maleic anhydride copolymer) graft copolymer (Modiper A8200 manufactured by NOF Corp.), weight ratio (carboxylic acid conversion) of functional group derived from carboxylic acid: 18 wt %, glass-transition temperature: −30° C. or lower (3) EM3: Ethylene-ethyl acrylate-maleic anhydride copolymer (Bondine HX8290 manufactured by Sumitomo Chemical Co., Ltd.), weight ratio (carboxylic acid conversion) of functional group derived from carboxylic acid: 11 wt %, glass-transition temperature: −30° C. or lower (4) EM4: Ethylene-methacrylic acid copolymer (Nucrel N1560 manufactured by Mitsui-DuPont Polychemical Co., Ltd.), weight ratio (carboxylic acid conversion) of functional group derived from carboxylic acid: 8 wt %, glass-transition temperature: −30° C. or lower (5) EM5: 50% Zn neutralized substance of ethylene-methacrylic acid copolymer (Nucrel N1560 manufactured by Mitsui-DuPont Polychemical Co., Ltd. neutralized partially by Zn), weight ratio (carboxylic acid conversion) of functional group derived from carboxylic acid: 7 wt %, glass-transition temperature: −30° C. or lower (6) EM6: 60% Zn neutralized substance of ethylene-methacrylic acid copolymer (Himilan 1557 manufactured by Mitsui-DuPont Polychemical Co., Ltd.), weight ratio (carboxylic acid conversion) of functional group derived from carboxylic acid: 5 wt %, glass-transition temperature: −30° C. or lower (7) EM7: Ethylene-methacrylic acid copolymer (Nucrel NO200H manufactured by Mitsui-DuPont Polychemical Co., Ltd.), weight ratio (carboxylic acid conversion) of functional group derived from carboxylic acid: 1 wt %, glass-transition temperature: −30° C. or lower (8) EM8: Polystyrene-(ethylene-ethyl acrylate copolymer) graft copolymer (Modiper A5100 manufactured by NOF Corp.), weight ratio (carboxylic acid conversion) of functional group derived from carboxylic acid: 6 wt %, glass-transition temperature: 20° C.

(9) EPR: Ethylene-propylene rubber (EP07P manufactured by JSR Corp.), weight ratio (carboxylic acid conversion) of functional group derived from carboxylic acid: 0 wt %, glass-transition temperature: −30° C. or lower Furthermore, as a resin raw material, a commercially available resin (Sealer PT4274 manufactured by Mitsui-DuPont Polychemical Co., Ltd.) that had been pelletized in advance in a state in which modified polyolefin resin with group derived from carboxylic acid was dispersed in polyester resin was inserted in a one-axis extruding machine in the blending ratio shown in invention examples 41 and 46 in Table 28, and on the other hand, modified polyolefin resin, which was a resin raw material for R2 layer, was inserted in a separate one-axis extruding machine, and each of molten resins was introduced into a multi-manifold type T die and extruded in two layers while the film thickness of R1 and R2 layers was controlled by the discharge amount of molten resin from the extruding machine, by which a resin film was manufactured continuously while being cooled by the surface of a rotating metallic roll. In the case of three-layer construction having R0 layer, polyester resin, which was a resin raw material for R0 layer, was inserted in a separate one-axis extruding machine, and each of molten resins was introduced into a multi-manifold type T die and extruded in three layers while the film thickness of R0, R1 and R2 layers was controlled by the discharge amount of molten resin from the extruding machine, by which a resin film was manufactured continuously while being cooled by the surface of a rotating metallic roll.

A resin laminated metal sheet was obtained by a thermo-compression bonding method in which the resin film obtained as described above was hot-pressed on both surfaces of a tin-free steel (hereinafter abbreviated to TFS) heated by an induction heating system, and then the laminated-metal sheet was rapidly cooled in water. The metal sheet temperature at the laminating time (laminating temperature) is given in Tables 30 and 31. The thickness of TFS was 0.18 mm for thin-wall deep drawn can and 0.23 mm for DI can, the degree of temperature was DR9 for both cans, and the coating amount of metallic chromium and chromium oxide of surface chrome plating layer were 80 mg/m$^2$ and 15 mg/m$^2$ (metallic chromium conversion), respectively.

The grain diameter of modified polyolefin resin dispersed in R1 layer of resin film, various temperatures in the table, and the plane orientation coefficient of resin laminated metal sheet were measured by the same method as that in Example 1.

Further, a thin-wall deep drawn can or a DI can was manufactured from the laminated metal sheet obtained as described above, and the can was subjected to straightening heat treatment to manufacture a sample can. The formability, impact resistance (room temperature, low temperature), adhesion after forming, adhesion after heating, and flavor property of film of the manufactured can body were investigated.

The following is a detailed description of the investigation method.

1. Evaluation by Thickness-decreasing Deep Drawing 1-1 Can Manufacturing

A resin laminated metal sheet was subjected to first-stage drawing and redrawing under the following conditions, by which a thin-wall deep drawn can was obtained.

First-stage drawing
  Blank diameter . . . 150 to 160 mm
  First-stage drawing . . . drawing ratio: 1.65
Redrawing
  Primary redrawing . . . drawing ratio: 1.25
  Secondary redrawing . . . drawing ratio: 1.25
  Radius of curvature of die corner in redrawing process . . . 0.4 mm
  Load for pressing wrinkle at the time of redrawing . . . 39227N (4000 kg)
Average thickness decreasing percentage of can sidewall
  45 to 60% with respect to thickness of resin laminated metal sheet before forming 1-2 Straightening Heat Treatment Forming strain of film caused by can manufacturing was removed by keeping the can in a thermal environment of film melting point minus 15° C. for 30 seconds and then by rapidly cooling it.

(1) Formability

Evaluation was made as described below by the limit of capability for manufacturing can without film failure. Grades not lower than ○ marked grade are acceptable.

Limit of forming (thickness decreasing percentage): Grade
Incapable of forming at thickness decreasing percentage of 45%: (Inferior)
Capable of forming up to thickness decreasing percentage of 45%
Capable of forming up to thickness decreasing percentage of 50%
Capable of forming up to thickness decreasing percentage of 55%
Capable of forming up to thickness decreasing percentage of 60%: (Superior)

(2) Evaluation of Room-temperature and Low-temperature Impact Resistance

A can body (thickness decreasing percentage: 55%) subjected to straightening heat treatment was necked, and the can body was filled with distilled-water. After a lid was installed and tightened, an iron ball of 0.5 kg was dropped from a height of 30 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 3 mA: (Inferior)
Current value not lower than 1 mA and lower than 3 mA
Current value not lower than 0.5 mA and lower than 1 mA
Current value not lower than 0.1 mA and lower than 0.5 mA
Current value lower than 0.1 mA: (Superior)

(Evaluation of Low-temperature Impact Resistance)

Test Result: Grade
Current value not lower than 5 mA: (Inferior)
Current value not lower than 3 mA and lower than 5 mA
Current value not lower than 1 mA and lower than 3 mA
Current value not lower than 0.5 mA and lower than 1 mA
Current value not lower than 0.1 mA and lower than 0.5 mA
Current value lower than 0.1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for 24 hours. Thereafter, the peeling length of resin in the can end portion was observed, and evaluation was made as described below. Grades not lower than ○ marked grade are acceptable.

Test Result: Grade
Peeling length longer than 5 mm: (Inferior).
Peeling length longer than 2 mm and not longer than 5 mm
Peeling length longer than 1 mm and not longer than 2 mm
Peeling length not longer than 1 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage-higher than 5%: (Inferior)
Peeling percentage higher than 2% and not higher than 5%
Peeling percentage higher than 1% and not higher than 2%
Peeling percentage not higher than 1%.
No peeling: (Superior)

(5) Flavor Property

The internal surface of can body subjected to straightening heat treatment was cleaned, and flavor aqueous solution (d-limonene 20 ppm aqueous solution) was put in the can and left at ordinary temperature for 20 days after sealing. Thereafter, the can was unsealed, and a portion expelled by ether immersion was determined by gas chromatography as adsorption of d-limonene per can, by which flavor property was evaluated. Grades not lower than ○ marked grade are acceptable.

Test Result: Grade
Adsorption larger than 200 μg/can: (Inferior)
Adsorption larger than 100 μg/can and not larger than 200 μg/can
Adsorption larger than 30 μg/can and not larger than 100 μg/can
Adsorption larger than 10 μg/can and not larger than 30 μg/can
Adsorption not larger than 10 μg/can: (Superior)

2. Evaluation by Drawing and Ironing (Di Forming)

2-1 Can Manufacturing

A resin laminated metal sheet was drawn and ironed under the following conditions, by which a DI can was obtained.
First-stage drawing
  Blank diameter: 150 mm
  Drawing ratio: 1.6
Second-stage drawing
  Drawing ratio: 1.25
Ironing
  Ironing punch diameter: 3-stage ironing 65.8 mm dia
Total ironing percentage of can sidewall
  60 to 75% with respect to thickness of resin laminated metal sheet before forming 2-2 Straightening Heat Treatment Forming strain of film caused by can manufacturing was removed by keeping the can in a thermal environment of film melting point minus 15° C. for 30 seconds and then by rapidly cooling it.

(1) Formability

Evaluation was made as described below by the limit of capability for manufacturing can without film failure. Grades not lower than ○ marked grade are acceptable.

Limit of forming (total ironing percentage): Grade
Incapable of forming at total ironing percentage of 60%: (Inferior)
Capable of forming up to total ironing percentage of 60%
Capable of forming up to total ironing percentage of 65%
Capable of forming up to total ironing percentage of 70%
Capable of forming up to total ironing percentage of 75%: (Superior)

(2) Evaluation of Room-temperature and Low-temperature Impact Resistance

A can body (total ironing percentage: 70%) subjected to straightening heat treatment was necked, and the can body was filled with distilled water. After a lid was installed and tightened, an iron ball of 0.5 kg was dropped from a height of 25 cm to give a shock to the can bottom. Thereafter, the lid was opened, and 1% salt water was poured in the can so that a portion that had suffered shock was immersed. After immersion for five minutes, a load of 6 V was applied across a platinum electrode immersed in the liquid and a can metal portion, and the current value after five minutes was read, by which evaluation was made as described below. The same tests were conducted at room temperature of 20° C. and at a temperature of 0° C. The former test was for evaluating room-temperature impact resistance, and the latter test was for evaluating low-temperature impact resistance. Grades not lower than ○ marked grade are acceptable.

(Evaluation of Room-temperature Impact Resistance)

Test Result: Grade
Current value not lower than 3 mA: (Inferior)
Current value not lower than 1 mA and lower than 3 mA
Current value not lower than 0.5 mA and lower than 1 mA
Current value not lower than 0.1 mA and lower than 0.5 mA
Current value lower than 0.1 mA: (Superior)

(Evaluation of Low-Temperature Impact Resistance)

Test Result: Grade
Current value not lower than 5 mA: (Inferior)
Current value not lower than 3 mA and lower than 5 mA
Current value not lower than 1 mA and lower than 3 mA
Current value not lower than 0.5 mA and lower than 1 mA
Current value not lower than 0.1 mA and lower than 0.5 mA
Current value lower than 0.1 mA: (Superior)

(3) Adhesion After Forming

The internal surface of can body subjected to straightening heat treatment was cleaned, and the can was immersed in aqueous solution containing 1.5 wt % citric acid and 1.5 wt % sodium chloride for five hours. Thereafter, the peeling length of resin in the can end portion was observed, and evaluation was made as described below. Grades not lower than ○ marked grade are acceptable.

Test Result: Grade
Peeling length longer than 5 mm: (Inferior)
Peeling length longer than 2 mm and not longer than 5 mm
Peeling length longer than 1 mm and not longer than 2 mm
Peeling length not longer than 1 mm
No peeling: (Superior)

(4) Adhesion After Heating

The internal surface of can body subjected to straightening heat treatment was cleaned, and the can was heated without content therein at 210° C. for 10 minutes in an oven. Thereafter, the degree of peeling of resin in the can end portion was observed, and evaluation was made as described below. Grades not lower than ○ marked grade are acceptable.

Test Result: Grade
Peeling percentage higher than 5%: (Inferior)
Peeling percentage higher than 2% and not higher than 5%
Peeling percentage higher than 1% and not higher than 2%
Peeling percentage not higher than 1%
No peeling: (Superior)

(5) Flavor Property

The internal surface of can body subjected to straightening heat treatment was cleaned, and flavor aqueous solution (d-limonene 20 ppm aqueous solution) was put in the can and left at ordinary temperature for 20 days after sealing. Thereafter, the can was unsealed, and a portion expelled by ether immersion was determined by gas chromatography as adsorption of d-limonene per can, by which flavor property was evaluated. Grades not lower than ○ marked grade are acceptable.

Test Result: Grade
Adsorption larger than 200 μg/can: (Inferior)
Adsorption larger than 100 μg/can and not larger than 200 μg/can
Adsorption larger than 30 μg/can and not larger than 100 μg/can
Adsorption larger than 10 μg/can and not larger than 30 μg/can
Adsorption not larger than 10 μg/can: (Superior)

The investigation results are given in Tables 30 and 31.
From Tables 27 to 31, the following facts are found for either can type.
Invention examples 1 to 4 are films in which R1 layer is a mixed resin layer in which modified polyolefin resin specified in the present invention is dispersed in various types of polyester resins and a modified polyolefin resin layer specified in the present invention is also used in R2 layer, and invention examples 47 to 50 in which these films are laminated on the metal sheet of the present invention exhibit high formability, impact resistance, adhesion, and flavor property. Among these, invention example 49 using adipic acid copolymerized polyethylene terephthalate resin has high performance as a whole, but has a tendency toward low adhesion after heating and flavor property because of slightly low melting point of polyester resin and slightly low barrier property. Also, invention example 87 in which the film of invention example 41 manufactured from a commercially available resin in which modified polyolefin resin is dispersed in polyester resin similarly exhibits high performance. On the other hand, comparative examples 1 to 5 are examples of films in which modified polyolefin resin specified in the present invention is not contained in polyester resin in which polyester type is changed variously. Comparative examples 20 to 24 in which these films are laminated especially have low levels of formability and impact resistance.

Invention examples 4 to 10 are films using a mixed resin in which various types of modified polyolefin resins specified in the present invention are dispersed in polyester resin, and invention examples 50 to 56 in which the films are laminated exhibit high formability, impact resistance, adhesion, and flavor property. In particular, invention examples 50 and 52 to 54 in which the films of invention examples 4 and 6 to 8 using modified polyolefin resin containing a proper amount of functional group derived from carboxylic acid and having a glass-transition temperature of −30° C. or lower are laminated have excellent formability, impact resistance, adhesion, and flavor property. On the other hand, comparative example 6 is a film using, as R1 layer, a mixed resin in which polyolefin resin containing no functional group derived from carboxylic acid is dispersed in polyester resin, and comparative example 25 in which the film is laminated has greatly deteriorated formability and impact resistance.

Invention examples 11 to 18 are films in which the blending ratio and dispersion state of modified polyolefin resin dispersed in polyester resin of R1 mixed resin layer are changed variously in the range of the present invention, and invention examples 57 to 64 in which the films are laminated on a metal sheet exhibit high formability, impact resistance, adhesion, and flavor property. In particular, invention examples 58, 60 and 61 in which the films of invention examples 12, 14 and 15 containing a proper amount of dispersed modified polyolefin resin and having a proper number of grains per a fixed volume are laminated have excellent formability, impact resistance, adhesion, and flavor property.

On the other hand, comparative examples 7 to 10 are films in which the blending ratio of modified polyolefin resin in polyester resin of R1 mixed resin layer does not meet the requirement of the present invention, and comparative examples 26 to 29 in which the films are laminated have greatly deteriorated formability or impact resistance. Comparative example 26 in which the film of comparative example 7 having a small number of grains of dispersed modified polyolefin resin is laminated and comparative example 29 in which the film of comparative example 10 having a large number of grains of modified polyolefin resin is laminated have greatly deteriorated formability and impact resistance.

Invention examples 19 to 25 are films in which the thickness of R1 layer and R2 layer of film is changed in the range specified in the present invention, and invention examples 65 to 71 in which the films are laminated on a metal sheet exhibit high formability, impact resistance, adhesion, and flavor property. Among these, invention examples 66, 67 and 69 in which the films of invention examples 20, 21 and 23 in which the thickness ratio of R1 layer to R2 layer is in the range of 5 to 10 and the thickness of R1 layer is in the range of 15 to 25 μm are laminated have excellent formability, impact resistance, adhesion, and flavor property. Also, invention example 13a is a film in which the thickness ratio R1/R2 of mixed resin layer of R1 to modified polyolefin layer of R2 is lower than the desired range of the present invention, and invention example 32a in which this film is laminated has slightly deteriorated mechanical properties of film and adhesion to a substrate metal sheet as compared with invention examples 65 to 71. On the other hand, invention example 14a is a film in which the ratio R1/R2 is higher than the proper range of the present invention, and invention example 33a in which this film is laminated has slightly deteriorated adhesion to a substrate metal sheet as compared with invention examples 65 to 71.

Invention examples 26 to 31 are films using various types of modified polyolefin resins specified in the present invention as R2 layer, and invention examples 72 to 77 in which the films are laminated exhibit high formability, impact-resistance, adhesion, and flavor property. In particular, invention examples 73 to 75 in which the films of invention examples 27 to 29 using modified polyolefin resin containing a proper amount of functional group derived from carboxylic acid and having a glass-transition temperature of −30° C. or lower are laminated have excellent formability, impact resistance, adhesion, and flavor property. On the other hand, comparative example 13 is a film using, as R2 layer, polyolefin resin containing no functional group derived from carboxylic acid, and comparative example 32 in which the film is laminated has greatly deteriorated formability and impact resistance.

Invention examples 32 to 34 are films in which a lubricant, free radical inhibitor, and compatibilizing agent are mixed, respectively, in a mixed resin of modified polyolefin resin and polyester resin of the present invention, and invention examples 78 to 80 in which the films are laminated exhibit high formability, impact resistance, adhesion, and flavor property. Further, invention examples 78 to 80 also have lubricity, free radical deterioration resistance, and compatibility depending on the function of added additive, and in particular, invention example 80 containing a compatibilizing agent exhibits excellent low-temperature impact resistance.

Invention example 35 is a film of the present invention that is manufactured by the two-axis stretching method, and invention examples 81 and 97 in which the film is laminated exhibit high performance. Invention example 97, which has a plane orientation coefficient of 0.015, exhibits a slightly deteriorated formability. However, invention example 81, which has a plane orientation coefficient in the range of the present invention, has a high level of impact-resistance.

Invention examples 36 to 40 are films in which titanium dioxide pigment is mixed with the film of the present invention, and invention examples 82 to 86 in which the films are laminated exhibit high formability, impact resistance, adhesion, and flavor property, and also provide a white uniform color tone. However, invention example 82 in which the film of invention example 36 in which the added amount of pigment is smaller than a desired range is laminated has slightly insufficient opacifying property of color tone. On the other hand, invention example 86 in which the film of invention example 40 in which the added amount of pigment is larger than a desired range is laminated has slightly deteriorated formability.

Invention examples 93 to 96 are films obtained by changing the laminating conditions for the film of invention example 4 in the range of the present invention. If the conditions are within the range of the present invention, high formability, impact resistance, adhesion, and flavor property are exhibited regardless of the laminating temperature.

Invention examples 42 to 46 are three-layer films in which a polyester resin layer of R0 layer containing no olefin and a mixed resin layer of R1 layer and a modified polyolefin layer of R2 layer are laminated (R0 layer is laminated on R1 layer), and invention examples 88 to 92 in which the three-layer films are laminated have very high formability, impact resistance, adhesion, and flavor property. In particular, invention examples 88, 89 and 92 in which the films using, as R0 layer, a polyester resin layer with a proper thickness that consists of polyethylene terephthalate or isophthalic acid copolymerized polyethylene terephthalate are laminated have excellent low-temperature impact resistance and flavor property.

Invention examples 15a and 16a are three-layer films in which a polyester resin layer of R0 layer containing no olefin and a mixed resin layer of R1 layer and a modified polyolefin layer of R2 layer are laminated (R0 layer is laminated on R1 layer) but R2 layer deviates from the proper range of the present invention, and invention examples 34a and 35a in which the three-layer films are laminated have deteriorated adhesion as compared with invention examples 42 to 46 in which R2 layer is within the proper range of the present invention.

TABLE 27

| Sample film | R0 layer Polyester resin type | R0 layer Film thickness (μm) | R1 layer Polyester resin Resin type | R1 layer Polyester resin Additive | R1 layer Polyolefin resin Resin type | R1 layer Polyolefin resin Weight percentage of group derived from carboxylic acid (wt %) | R1 layer Polyolefin resin Tg (°C) | R1 layer Blending ratio in entire resin (wt %) | R1 layer Volume percentage of grains with diameter of 0.1 to 5 μm (vol %) | R1 layer Number of grains with diameter of 0.1 to 5 μm in cube with one side of 10 μm (grains) | R1 layer Film thickness (μm) | R2 layer Polyolefin resin Resin type | R2 layer Polyolefin resin Weight percentage of group derived from carboxylic acid (wt %) | R2 layer Polyolefin resin Tg (°C) | R2 layer Film thickness (μm) | Entire film Film thickness (R1 + R0) (μm) | Entire film Thickness ratio of R1 layer to R0 layer R1/R0 | Pigment Type | Pigment Content (wt % *1) | Stretching |
|---|---|---|---|---|---|---|---|---|---|---|---|---|---|---|---|---|---|---|---|---|
| Inventive example 1 | PET | | EM4 | None | | 8 | <-30 | 15 | 12 | 2000 | 22 | EM6 | 5 | <-30 | 4 | 26 | 5.5 | None | 0 | Non-stretched |
| Inventive example 2 | PET/PBT | | EM4 | None | | 8 | <-30 | 15 | 12 | 2000 | 22 | EM6 | 5 | <-30 | 4 | 26 | 5.5 | None | 0 | Non-stretched |
| Inventive example 3 | PET/AD | | EM4 | None | | 8 | <-30 | 15 | 12 | 2000 | 22 | EM6 | 5 | <-30 | 4 | 26 | 5.5 | None | 0 | Non-stretched |
| Inventive example 4 | PET/I | | EM4 | None | | 8 | <-30 | 15 | 12 | 2000 | 22 | EM6 | 5 | <-30 | 4 | 26 | 5.5 | None | 0 | Non-stretched |
| Inventive example 5 | PET/I | | EM1 | None | | 21 | <-30 | 15 | 14 | 40 | 22 | EM6 | 5 | <-30 | 4 | 26 | 5.5 | None | 0 | Non-stretched |
| Inventive example 6 | PET/I | | EM2 | None | | 18 | <-30 | 15 | 13 | 500 | 22 | EM6 | 5 | <-30 | 4 | 26 | 5.5 | None | 0 | Non-stretched |
| Inventive example 7 | PET/I | | EM5 | None | | 7 | <-30 | 15 | 12 | 2000 | 22 | EM6 | 5 | <-30 | 4 | 26 | 5.5 | None | 0 | Non-stretched |
| Inventive example 8 | PET/I | | EM6 | None | | 5 | <-30 | 15 | 12 | 2000 | 22 | EM6 | 5 | <-30 | 4 | 26 | 5.5 | None | 0 | Non-stretched |
| Inventive example 9 | PET/I | | EM7 | None | | 1 | <-30 | 15 | 3 | 20 | 22 | EM6 | 5 | <-30 | 4 | 26 | 5.5 | None | 0 | Non-stretched |
| Inventive example 10 | PET/I | | EM8 | None | | 6 | 20 | 15 | 12 | 2000 | 22 | EM6 | 5 | <-30 | 4 | 26 | 5.5 | None | 0 | Non-stretched |
| Inventive example 11 | PET/I | | EM3 | None | | 11 | <-30 | 5 | 3 | 3 | 22 | EM6 | 5 | <-30 | 4 | 26 | 5.5 | None | 0 | Non-stretched |
| Inventive example 12 | PET/I | | EM3 | None | | 11 | <-30 | 5 | 5 | 70 | 22 | EM6 | 5 | <-30 | 4 | 26 | 5.5 | None | 0 | Non-stretched |
| Inventive example 13 | PET/I | | EM3 | None | | 11 | <-30 | 10 | 8 | 30 | 22 | EM6 | 5 | <-30 | 4 | 26 | 5.5 | None | 0 | Non-stretched |
| Inventive example 14 | PET/I | | EM3 | None | | 11 | <-30 | 10 | 10 | 250 | 22 | EM6 | 5 | <-30 | 4 | 26 | 5.5 | None | 0 | Non-stretched |
| Inventive example 15 | PET/I | | EM3 | None | | 11 | <-30 | 15 | 15 | 500 | 22 | EM6 | 5 | <-30 | 4 | 26 | 5.5 | None | 0 | Non-stretched |
| Inventive example 16 | PET/I | | EM3 | None | | 11 | <-30 | 15 | 18 | 20000 | 22 | EM6 | 5 | <-30 | 4 | 26 | 5.5 | None | 0 | Non-stretched |

TABLE 27-continued

| Sample film | R0 layer | | | R1 layer | | | | | | | | | | R2 layer | | | | Entire film | | Pigment | | Stretching |
|---|---|---|---|---|---|---|---|---|---|---|---|---|---|---|---|---|---|---|---|---|---|---|
| | Polyester resin type | Film thickness (μm) | | Polyester resin | | | Polyolefin resin | | | | | | | Polyolefin resin | | | | | | | | |
| | | | | Additive | Resin type | | Resin type | Weight percentage of group derived from carboxylic acid (wt %) | Tg (°C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (°C.) | Film thickness (μm) | Film thickness (R1 + R0) (μm) | Thickness ratio of R1 layer to R0 layer R1/R0 | Type | Content (wt %) *1) | |
| Inventive example 17 | PET/I | | None | EM3 | | 11 | <-30 | 20 | 22 | 200000 | 22 | EM6 | 5 | <-30 | 4 | 26 | 5.5 | None | 0 | Non-stretched |
| Inventive example 18 | PET/I | | None | EM3 | | 11 | <-30 | 28 | 20 | 8000 | 22 | EM6 | 5 | <-30 | 4 | 26 | 5.5 | None | 0 | Non-stretched |
| Inventive example 19 | PET/I | | None | EM6 | | 5 | <-30 | 15 | 12 | 2000 | 10 | EM6 | 5 | <-30 | 1 | 11 | 10.0 | None | 0 | Non-stretched |
| Inventive example 20 | PET/I | | None | EM6 | | 5 | <-30 | 15 | 12 | 2000 | 15 | EM6 | 5 | <-30 | 3 | 18 | 5.0 | None | 0 | Non-stretched |
| Inventive example 21 | PET/I | | None | EM6 | | 5 | <-30 | 15 | 12 | 2000 | 20 | EM6 | 5 | <-30 | 3 | 23 | 6.7 | None | 0 | Non-stretched |
| Inventive example 22 | PET/I | | None | EM6 | | 5 | <-30 | 15 | 12 | 2000 | 20 | EM6 | 5 | <-30 | 10 | 30 | 2.0 | None | 0 | Non-stretched |
| Inventive example 23 | PET/I | | None | EM6 | | 5 | <-30 | 15 | 12 | 2000 | 25 | EM6 | 5 | <-30 | 3 | 28 | 8.3 | None | 0 | Non-stretched |
| Inventive example 24 | PET/I | | None | EM6 | | 5 | <-30 | 15 | 12 | 2000 | 35 | EM6 | 5 | <-30 | 5 | 40 | 7.0 | None | 0 | Non-stretched |
| Inventive example 25 | PET/I | | None | EM6 | | 5 | <-30 | 15 | 12 | 2000 | 40 | EM6 | 5 | <-30 | 6 | 46 | 6.7 | None | 0 | Non-stretched |

*1) Pigment content means weight percentage (wt %) of pigment with respect to total film amount of entire resin and pigment: Pigment is added to R1 layer.

TABLE 28

| Sample film | R0 layer Polyester resin type | R0 layer Film thickness (μm) | R1 layer Polyester resin Resin type | R1 layer Polyester resin Additive | R1 layer Polyolefin resin Resin type | R1 layer Polyolefin resin Weight percentage of group derived from carboxylic acid (wt %) | R1 layer Polyolefin resin Tg (°C) | R1 layer Blending ratio in entire resin (wt %) | R1 layer Volume percentage of grains with diameter of 0.1 to 5 μm (vol %) | R1 layer Number of grains with diameter of 0.1 to 5 μm in cube with one side of 10 μm (grains) | R1 layer Film thickness (μm) | R2 layer Polyolefin resin Resin type | R2 layer Polyolefin resin Weight percentage of group derived from carboxylic acid (wt %) | R2 layer Polyolefin resin Tg (°C) | R2 layer Film thickness (μm) | Entire film Film thickness (R1+R0) (μm) | Entire film Thickness ratio of R1 layer to R0 layer R1/R0 | Entire film Pigment Type | Entire film Pigment Content (wt %*1) | Stretching |
|---|---|---|---|---|---|---|---|---|---|---|---|---|---|---|---|---|---|---|---|---|
| Inventive example 26 | PET/I | | EM6 | None | | 5 | <-30 | 15 | 12 | 2000 | 22 | EM1 | 21 | <-30 | 4 | 26 | 5.5 | None | 0 | Non-stretched |
| Inventive example 27 | PET/I | | EM6 | None | | 5 | <-30 | 15 | 12 | 2000 | 22 | EM2 | 18 | <-30 | 4 | 26 | 5.5 | None | 0 | Non-stretched |
| Inventive example 28 | PET/I | | EM6 | None | | 5 | <-30 | 15 | 12 | 2000 | 22 | EM4 | 8 | <-30 | 4 | 26 | 5.5 | None | 0 | Non-stretched |
| Inventive example 29 | PET/I | | EM6 | None | | 5 | <-30 | 15 | 12 | 2000 | 22 | EM5 | 7 | <-30 | 4 | 26 | 5.5 | None | 0 | Non-stretched |
| Inventive example 30 | PET/I | | EM6 | None | | 5 | <-30 | 15 | 12 | 2000 | 22 | EM7 | 1 | <-30 | 4 | 26 | 5.5 | None | 0 | Non-stretched |
| Inventive example 31 | PET/I | | EM6 | None | | 5 | <-30 | 15 | 12 | 2000 | 22 | EM8 | 6 | 20 | 4 | 26 | 5.5 | None | 0 | Non-stretched |
| Inventive example 32 | PET/I | | EM3 | *2) 0.3 wt % | | 11 | <-30 | 15 | 12 | 2000 | 22 | EM6 | 5 | <-30 | 4 | 26 | 5.5 | None | 0 | Non-stretched |
| Inventive example 33 | PET/I | | EM3 | *3) 0.1 wt % | | 11 | <-30 | 15 | 12 | 2000 | 22 | EM6 | 5 | <-30 | 4 | 26 | 5.5 | None | 0 | Non-stretched |
| Inventive example 34 | PET/I | | EM3 | *4) 3 wt % | | 11 | <-30 | 15 | 12 | 2000 | 22 | EM6 | 5 | <-30 | 4 | 26 | 5.5 | None | 0 | non-stretched |
| Inventive example 35 | PET/I | | EM4 | None | | 8 | <-30 | 15 | 12 | 2000 | 22 | EM6 | 5 | <-30 | 4 | 26 | 5.5 | None | 0 | Non-stretched |
| Inventive example 36 | PET/I | | EM5 | None | | 7 | <-30 | 15 | 12 | 2000 | 22 | EM6 | 5 | <-30 | 4 | 26 | 5.5 | TiO₂ | 3 | Two-axis stretched |
| Inventive example 37 | PET/I | | EM5 | None | | 7 | <-30 | 15 | 12 | 2000 | 22 | EM6 | 5 | <-30 | 4 | 26 | 5.5 | TiO₂ | 7 | Non-stretched |
| Inventive example 38 | PET/I | | EM5 | None | | 7 | <-30 | 15 | 12 | 2000 | 22 | EM6 | 5 | <-30 | 4 | 26 | 5.5 | TiO₂ | 15 | Non-stretched |
| Inventive example 39 | PET/I | | EM5 | None | | 7 | <-30 | 15 | 12 | 2000 | 22 | EM6 | 5 | <-30 | 4 | 26 | 5.5 | TiO₂ | 30 | Non-stretched |
| Inventive example 40 | PET/I | | EM5 | None | | 7 | <-30 | 15 | 12 | 2000 | 22 | EM6 | 5 | <-30 | 4 | 26 | 5.5 | TiO₂ | 50 | Non-stretched |
| Inventive example 41 | PET (PT) | | | None | | 15 | <-30 | 15 | 15 | 2500 | 25 | EM6 | 5 | <-30 | 3 | 28 | 8.3 | None | 0 | Non-stretched |

TABLE 28-continued

| Sample film | R0 layer | | | R1 layer | | | | | | | | | R2 layer | | | | Entire film | | | | |
|---|---|---|---|---|---|---|---|---|---|---|---|---|---|---|---|---|---|---|---|---|---|
| | Polyester resin | | | Polyester resin | | | Polyolefin resin | | | | | | Polyolefin resin | | | | | | Pigment | | |
| | resin type | Film thickness (μm) | Resin type | Additive | Resin type | Weight percentage of group derived from carboxylic acid (wt %) | Tg (°C.) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (°C.) | Film thickness (μm) | Film thickness (R1 + R0) (μm) | Thickness ratio of R1 layer to R0 layer R1/R0 | Type | Content (wt %) *1) | Stretching |
| Inventive example 42 | PET | 8 | PET/I 4274) | None | EM6 | 5 | <-30 | 15 | 12 | 2000 | 22 | EM6 | 5 | <-30 | 4 | 26 | 5.5 | None | 0 | Non-stretched |
| Inventive example 43 | PET/I | 4 | PET/I | None | EM6 | 5 | <-30 | 15 | 12 | 2000 | 22 | EM6 | 5 | <-30 | 4 | 26 | 5.5 | None | 0 | Non-stretched |
| Inventive example 44 | PET/ PBT | 4 | PET/I | None | EM6 | 5 | <-30 | 15 | 12 | 2000 | 22 | EM6 | 5 | <-30 | 4 | 26 | 5.5 | None | 0 | Non-stretched |
| Inventive example 45 | PET/ AD | 4 | PET/I | None | EM6 | 5 | <-30 | 15 | 12 | 2000 | 22 | EM6 | 5 | <-30 | 4 | 26 | 5.5 | None | 0 | Non-stretched |
| Inventive example 46 | PET | 4 | PET (PT 4274) | None | EM6 | 15 | <-30 | 15 | 15 | 2500 | 25 | EM6 | 5 | <-30 | 3 | 28 | 8.3 | None | 0 | Non stretched |

*1) Pigment Content means weight percentage (wt %) of pigment with respect to total film amount of entire resin and pigment. Pigment is added to R1 layer.
*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond first 20B (manufactured by Sumitomo Chemical Co., Ltd.) of compatibilizing agent is added by 3 weight part to 100 weight part of mixed resin.

TABLE 29

| Sample film | R0 layer | | R1 layer | | | | | | | | R2 layer | | | | Entire film | | | | |
|---|---|---|---|---|---|---|---|---|---|---|---|---|---|---|---|---|---|---|---|
| | | | Polyester resin | | Polyolefin resin | | | | | | Polyolefin resin | | | | | | Pigment | | |
| | Polyester resin type | Film thickness (μm) | Resin type | Additive | Resin type | Weight percentage of group derived from carboxylic acid (wt %) | Tg (°C) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (°C) | Film thickness (μm) | Film thickness (R1 + R0) (μm) | Thickness ratio of R1 layer to R0 layer R1/R0 | Type | Content (wt % *1) | Stretching |
| Comparative example 1 | PET | — | None | None | — | — | — | — | — | 22 | EM6 | 5 | <-30 | 4 | 26 | 5.5 | None | 0 | Non-stretched |
| Comparative example 2 | PET/PBT | — | None | None | — | — | — | — | — | 22 | EM6 | 5 | <-30 | 4 | 26 | 5.5 | None | 0 | Non-stretched |
| Comparative example 3 | PET/AD | — | None | None | — | — | — | — | — | 22 | EM6 | 5 | <-30 | 4 | 26 | 5.5 | None | 0 | Non-stretched |
| Comparative example 4 | PET/I | — | None | None | — | — | — | — | — | 22 | EM6 | 5 | <-30 | 4 | 26 | 5.5 | None | 0 | Non-stretched |
| Comparative example 5 | PET/I | — | None | None | — | — | — | — | — | 22 | EM6 | 5 | <-30 | 4 | 26 | 5.5 | None | 0 | Two-axis stretched |
| Comparative example 6 | PET/I | — | None | EPR | 0 | <-30 | 15 | 1 | 5 | 22 | EM6 | 5 | <-30 | 4 | 26 | 5.5 | None | 0 | Non-stretched |
| Comparative example 7 | PET/I | — | None | EM3 | 11 | <-30 | 2 | 2 | 3 | 22 | EM6 | 5 | <-30 | 4 | 26 | 5.5 | None | 0 | Non-stretched |
| Comparative example 8 | PET/I | — | None | EM3 | 11 | <-30 | 2 | 2 | 45 | 22 | EM6 | 5 | <-30 | 4 | 26 | 5.5 | None | 0 | Non-stretched |
| Comparative example 9 | PET/I | — | None | EM3 | 11 | <-30 | 32 | 28 | 15000 | 22 | EM6 | 5 | <-30 | 4 | 26 | 5.5 | None | 0 | Non-stretched |
| Comparative example 10 | PET/I | — | None | EM3 | 11 | <-30 | 32 | 28 | 120000 | 22 | EM6 | 5 | <-30 | 4 | 26 | 5.5 | None | 0 | Non-stretched |
| Comparative example 11 | PET/I | — | None | EM4 | 8 | <-30 | 15 | 12 | 2000 | 22 | None | — | — | — | — | — | None | 0 | Non-stretched |
| Comparative example 12 | PET (PT 4274) | — | None | | 15 | <-30 | 15 | 15 | 2500 | 25 | None | — | — | — | — | — | None | 0 | Non-stretched |
| Inventive example 13a | PET/I | — | None | EM4 | 8 | <-30 | 15 | 12 | 2000 | 10 | EM6 | 5 | <-30 | 12 | 22 | 0.8 | None | 0 | Non-stretched |
| Inventive example 14a | PET/I | — | None | EM4 | 8 | <-30 | 15 | 12 | 2000 | 32 | EM6 | 5 | <-30 | 3 | 35 | 10.7 | None | 0 | Non-stretched |
| Inventive example 13 | PET/I | — | None | EM4 | 8 | <-30 | 15 | 12 | 2000 | 22 | EPR | 0 | <-30 | 4 | 26 | 5.5 | None | 0 | Non-stretched |

TABLE 29-continued

| Sample film | R0 layer | | | | R1 layer | | | | | | | | R2 layer | | | | Entire film | | | | |
|---|---|---|---|---|---|---|---|---|---|---|---|---|---|---|---|---|---|---|---|---|---|
| | Polyester resin | | | | Polyester resin | | | Polyolefin resin | | | | | Polyolefin resin | | | | | | Pigment | | |
| | resin type | Film thickness (μm) | Resin type | Additive | Resin type | Weight percentage of group derived from carboxylic acid (wt %) | Tg (°C) | Blending ratio in entire resin (wt %) | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (°C) | Film thickness (μm) | Film thickness (R1 + R0) (μm) | Thickness ratio of R1 layer to R0 layer R1/R0 | Type | Content (wt %) *1) | Stretching |
| Inventive example 14 | PET | 4 | PET/I | None | EM4 | 8 | <-30 | 15 | 12 | 2000 | 22 | None | — | — | — | — | — | None | 0 | Non-stretched |
| Comparative example 15 | PET | 4 | PET (PT 4274) | None | | 15 | <-30 | 15 | 15 | 2500 | 25 | None | — | — | — | — | — | None | 0 | Non-stretched |
| Inventive example 15a | PET | 4 | PET/I | None | EM4 | 8 | <-30 | 15 | 12 | 2000 | 10 | EM6 | 5 | <-30 | 12 | 22 | 0.8 | None | 0 | Non-stretched |
| Inventive example 16a | PET | 4 | PET/I | None | EM4 | 8 | <-30 | 15 | 12 | 2000 | 32 | EM6 | 5 | <-30 | 3 | 35 | 10.7 | None | 0 | Non-stretched |

*1) Pigment content means weight percentage (wt %) of pigment with respect to total film amount of entire resin and pigment. Pigment is added to R1 layer

TABLE 30

| Laminated metal sheet | Sample film | Melting point of R1 layer polyester resin (°C) | Laminating temp. (°C) | Plane orientation coefficient | Thin-wall deep drawn can | | | | | | Drawn and ironed can (DI can) | | | | | |
|---|---|---|---|---|---|---|---|---|---|---|---|---|---|---|---|---|
| | | | | | Formability | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Invention example 47 | Invention example 1 | 255 | 235 | 0 | ◎ | ◎ | ◎◎◎ | ◎ | ◎◎ | ◎◎ | ◎ | ◎ | ◎◎◎ | ◎ | ◎◎ | ◎◎ |
| Invention example 48 | Invention example 2 | 235 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 49 | Invention example 3 | 220 | 210 | 0 | ◎ | ◎ | ◎◎◎ | ◎ | ◎◎ | ◎◎ | ◎ | ◎ | ◎◎◎ | ◎ | ◎◎ | ◎◎ |
| Invention example 50 | Invention example 4 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 51 | Invention example 5 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 52 | Invention example 6 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 53 | Invention example 7 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 54 | Invention example 8 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 55 | Invention example 9 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 56 | Invention example 10 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 57 | Invention example 11 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 58 | Invention example 12 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 59 | Invention example 13 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 60 | Invention example 14 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 61 | Invention example 15 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 62 | Invention example 16 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 63 | Invention example 17 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 64 | Invention example 18 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 65 | Invention example 19 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 66 | Invention example 20 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 67 | Invention example 21 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 68 | Invention example 22 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |

TABLE 30-continued

| Laminated metal sheet | Sample film | Melting point of R1 layer polyester resin (° C.) | Laminating temp. (° C.) | Plane orientation coefficient | Thin-wall deep drawn can | | | | | | Drawn and ironed can (DI can) | | | | |
|---|---|---|---|---|---|---|---|---|---|---|---|---|---|---|---|
| | | | | | Formability | Impact resistance (room temp.) | Impact resistance (low temp.) | Adhesion after forming | Adhesion after heating | Flavor property | Formability | Impact resistance (room temp.) | Impact resistance (low temp.) | Adhesion after forming | Adhesion after heating | Flavor property |
| Invention example 69 | Invention example 23 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 70 | Invention example 24 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 71 | Invention example 25 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 72 | Invention example 26 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 73 | Invention example 27 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 74 | Invention example 28 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 75 | Invention example 29 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 76 | Invention example 30 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 77 | Invention example 31 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 78 | Invention example 32 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 79 | Invention example 33 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 80 | Invention example 34 | 230 | 220 | 0 | ◎ | ◎ | ◎◎◎ | ◎ | ◎◎ | ◎◎ | ◎ | ◎ | ◎◎◎ | ◎ | ◎◎ | ◎◎ |
| Invention example 81 | Invention example 35 | 230 | 220 | 0.005 | ◎ | ◎ | ◎◎◎ | ◎ | ◎◎ | ◎◎ | ◎ | ◎ | ◎◎◎ | ◎ | ◎◎ | ◎◎ |

TABLE 31

| Laminated metal sheet | Sample film | Melting point of R1 layer polyester resin (° C.) | Laminating temp. (° C.) | Plane orientation coefficient | Thin-wall deep drawn can | | | |
|---|---|---|---|---|---|---|---|---|
| | | | | | Formability | Impact resistance (room temp.) | Impact resistance (low temp.) | Adhesion after forming |
| Invention example 82 | Invention example 36 | 230 | 220 | 0 | ⊙ | ⊙ | ⊙⊙⊙ | ⊙ |
| Invention example 83 | Invention example 37 | 230 | 220 | 0 | ⊙ | ⊙ | ⊙⊙⊙ | ⊙ |
| Invention example 84 | Invention example 38 | 230 | 220 | 0 | ⊙ | ⊙ | ⊙⊙⊙ | ⊙ |
| Invention example 85 | Invention example 39 | 230 | 220 | 0 | ⊙ | ⊙ | ⊙⊙⊙ | ⊙ |
| Invention example 86 | Invention example 40 | 230 | 220 | 0 | ⊙ | ⊙ | ⊙⊙⊙ | ⊙ |
| Invention example 87 | Invention example 41 | 255 | 235 | 0 | ⊙ | ⊙ | ⊙⊙⊙ | ⊙ |
| Invention example 88 | Invention example 42 | 230 | 220 | 0 | ⊙ | ⊙ | ⊙⊙⊙ | ⊙ |
| Invention example 89 | Invention example 43 | 230 | 220 | 0 | ⊙ | ⊙ | ⊙⊙⊙ | ⊙ |
| Invention example 90 | Invention example 44 | 230 | 220 | 0 | ⊙ | ⊙ | ⊙⊙⊙ | ⊙ |
| Invention example 91 | Invention example 45 | 230 | 220 | 0 | ⊙ | ⊙ | ⊙⊙⊙ | ⊙ |
| Invention example 92 | Invention example 46 | 255 | 235 | 0 | ⊙ | ⊙ | ⊙⊙⊙ | ⊙ |
| Invention example 93 | Invention example 4 | 230 | 260 | 0 | ⊙ | ⊙ | ⊙⊙⊙ | ⊙ |
| Invention example 94 | Invention example 4 | 230 | 240 | 0 | ⊙ | ⊙ | ⊙⊙⊙ | ⊙ |
| Invention example 95 | Invention example 4 | 230 | 200 | 0 | ⊙ | ⊙ | ⊙⊙⊙ | ⊙ |
| Invention example 96 | Invention example 4 | 230 | 170 | 0 | ⊙ | ⊙ | ⊙⊙⊙ | ⊙ |
| Invention example 97 | Invention example 35 | 235 | 200 | 0.015 | ⊙ | ⊙ | ⊙⊙⊙ | ⊙ |
| Comparative example 20 | Comparative example 1 | 255 | 235 | 0 | ⊙ | ⊙ | ⊙⊙⊙ | ⊙ |
| Comparative example 21 | Comparative example 2 | 235 | 220 | 0 | ⊙ | ⊙ | ⊙⊙⊙ | ⊙ |
| Comparative example 22 | Comparative example 3 | 220 | 210 | 0 | ⊙ | ⊙ | ⊙⊙⊙ | ⊙ |
| Comparative example 23 | Comparative example 4 | 230 | 220 | 0 | ⊙ | ⊙ | ⊙⊙⊙ | ⊙ |
| Comparative example 24 | Comparative example 5 | 230 | 220 | 0.005 | ⊙ | ⊙ | ⊙⊙⊙ | ⊙ |
| Comparative example 25 | Comparative example 6 | 230 | 220 | 0 | ⊙ | ⊙ | ⊙⊙⊙ | ⊙ |
| Comparative example 26 | Comparative example 7 | 230 | 220 | 0 | ⊙ | ⊙ | ⊙⊙⊙ | ⊙ |
| Comparative example 27 | Comparative example 8 | 230 | 220 | 0 | ⊙ | ⊙ | ⊙⊙⊙ | ⊙ |
| Comparative example 28 | Comparative example 9 | 230 | 220 | 0 | ⊙ | ⊙ | ⊙⊙⊙ | ⊙ |
| Comparative example 29 | Comparative example 10 | 230 | 220 | 0 | ⊙ | ⊙ | ⊙⊙⊙ | ⊙ |
| Comparative example 30 | Comparative example 11 | 230 | 220 | 0 | ⊙ | ⊙ | ⊙⊙⊙ | ⊙ |
| Comparative example 31 | Comparative example 12 | 255 | 235 | 0 | ⊙ | ⊙ | ⊙⊙⊙ | ⊙ |
| Invention example 32a | Invention example 13a | 230 | 220 | 0 | ⊙ | ⊙ | ⊙⊙⊙ | ⊙ |
| Invention example 33a | Invention example 14a | 230 | 220 | 0 | ⊙ | ⊙ | ⊙⊙⊙ | ⊙ |
| Comparative example 32 | Comparative example 13 | 230 | 220 | 0 | ⊙ | ⊙ | ⊙⊙⊙ | ⊙ |
| Comparative example 33 | Comparative example 14 | 230 | 220 | 0 | ⊙ | ⊙ | ⊙⊙⊙ | ⊙ |
| Comparative example 34 | Comparative example 15 | 255 | 235 | 0 | ⊙ | ⊙ | ⊙⊙⊙ | ⊙ |
| Invention example 34a | Invention example 15a | 230 | 220 | 0 | ⊙ | ⊙ | ⊙⊙⊙ | ⊙ |
| Invention example 35a | Invention example 16a | 230 | 220 | 0 | ⊙ | ⊙ | ⊙⊙⊙ | ⊙ |

TABLE 31-continued

| Laminated metal sheet | Thin-wall deep drawn can | | Drawn and ironed can (DI can) | | | | | |
|---|---|---|---|---|---|---|---|---|
| | Adhesion after heating | Flavor property | Formability | Impact resistance (room temp.) | Impact resistance (low temp.) | Adhesion after forming | Adhesion after heating | Flavor Property |
| Invention example 82 | ◎◎ | ◎◎ | ◎ | ◎ | ◎◎◎ | ◎ | ◎◎ | ◎◎ |
| Invention example 83 | ◎◎ | ◎◎ | ◎ | ◎ | ◎◎◎ | ◎ | ◎◎ | ◎◎ |
| Invention example 84 | ◎◎ | ◎◎ | ◎ | ◎ | ◎◎◎ | ◎ | ◎◎ | ◎◎ |
| Invention example 85 | ◎◎ | ◎◎ | ◎ | ◎ | ◎◎◎ | ◎ | ◎◎ | ◎◎ |
| Invention example 86 | ◎◎ | ◎◎ | ◎ | ◎ | ◎◎◎ | ◎ | ◎◎ | ◎◎ |
| Invention example 87 | ◎◎ | ◎◎ | ◎ | ◎ | ◎◎◎ | ◎ | ◎◎ | ◎◎ |
| Invention example 88 | ◎◎ | ◎◎ | ◎ | ◎ | ◎◎◎ | ◎ | ◎◎ | ◎◎ |
| Invention example 89 | ◎◎ | ◎◎ | ◎ | ◎ | ◎◎◎ | ◎ | ◎◎ | ◎◎ |
| Invention example 90 | ◎◎ | ◎◎ | ◎ | ◎ | ◎◎◎ | ◎ | ◎◎ | ◎◎ |
| Invention example 91 | ◎◎ | ◎◎ | ◎ | ◎ | ◎◎◎ | ◎ | ◎◎ | ◎◎ |
| Invention example 92 | ◎◎ | ◎◎ | ◎ | ◎ | ◎◎◎ | ◎ | ◎◎ | ◎◎ |
| Invention example 93 | ◎◎ | ◎◎ | ◎ | ◎ | ◎◎◎ | ◎ | ◎◎ | ◎◎ |
| Invention example 94 | ◎◎ | ◎◎ | ◎ | ◎ | ◎◎◎ | ◎ | ◎◎ | ◎◎ |
| Invention example 95 | ◎◎ | ◎◎ | ◎ | ◎ | ◎◎◎ | ◎ | ◎◎ | ◎◎ |
| Invention example 96 | ◎◎ | ◎◎ | ◎ | ◎ | ◎◎◎ | ◎ | ◎◎ | ◎◎ |
| Invention example 97 | ◎◎ | ◎◎ | ◎ | ◎ | ◎◎◎ | ◎ | ◎◎ | ◎◎ |
| Comparative example 20 | ◎◎ | ◎◎ | ◎ | ◎ | ◎◎◎ | ◎ | ◎◎ | ◎◎ |
| Comparative example 21 | ◎◎ | ◎◎ | ◎ | ◎ | ◎◎◎ | ◎ | ◎◎ | ◎◎ |
| Comparative example 22 | ◎◎ | ◎◎ | ◎ | ◎ | ◎◎◎ | ◎ | ◎◎ | ◎◎ |
| Comparative example 23 | ◎◎ | ◎◎ | ◎ | ◎ | ◎◎◎ | ◎ | ◎◎ | ◎◎ |
| Comparative example 24 | ◎◎ | ◎◎ | ◎ | ◎ | ◎◎◎ | ◎ | ◎◎ | ◎◎ |
| Comparative example 25 | ◎◎ | ◎◎ | ◎ | ◎ | ◎◎◎ | ◎ | ◎◎ | ◎◎ |
| Comparative example 26 | ◎◎ | ◎◎ | ◎ | ◎ | ◎◎◎ | ◎ | ◎◎ | ◎◎ |
| Comparative example 27 | ◎◎ | ◎◎ | ◎ | ◎ | ◎◎◎ | ◎ | ◎◎ | ◎◎ |
| Comparative example 28 | ◎◎ | ◎◎ | ◎ | ◎ | ◎◎◎ | ◎ | ◎◎ | ◎◎ |
| Comparative example 29 | ◎◎ | ◎◎ | ◎ | ◎ | ◎◎◎ | ◎ | ◎◎ | ◎◎ |
| Comparative example 30 | ◎◎ | ◎◎ | ◎ | ◎ | ◎◎◎ | ◎ | ◎◎ | ◎◎ |
| Comparative example 31 | ◎◎ | ◎◎ | ◎ | ◎ | ◎◎◎ | ◎ | ◎◎ | ◎◎ |
| Invention example 32a | ◎◎ | ◎◎ | ◎ | ◎ | ◎◎◎ | ◎ | ◎◎ | ◎◎ |
| Invention example 33a | ◎◎ | ◎◎ | ◎ | ◎ | ◎◎◎ | ◎ | ◎◎ | ◎◎ |
| Comparative example 32 | ◎◎ | ◎◎ | ◎ | ◎ | ◎◎◎ | ◎ | ◎◎ | ◎◎ |
| Comparative example 33 | ◎◎ | ◎◎ | ◎ | ◎ | ◎◎◎ | ◎ | ◎◎ | ◎◎ |
| Comparative example 34 | ◎◎ | ◎◎ | ◎ | ◎ | ◎◎◎ | ◎ | ◎◎ | ◎◎ |
| Invention example 34a | ◎◎ | ◎◎ | ◎ | ◎ | ◎◎◎ | ◎ | ◎◎ | ◎◎ |
| Invention example 35a | ◎◎ | ◎◎ | ◎ | ◎ | ◎◎◎ | ◎ | ◎◎ | ◎◎ |

Example 8

As a resin raw material for R1 layer, modified polyolefin resin with group derived from carboxylic acid was cold blended with polyester resin in a blending ratio given in Tables 32 to 34 by using a tumbler blender, and then the blended resin was melted and kneaded at 270° C. by using a two-axis extruding machine, by which a raw material pellet of polyester resin in which modified polyolefin resin was dispersed was obtained. In the tables, the resin type corresponding to the symbol of resin type of polyester resin and resin type of polyolefin resin is the same as that described in Example 7. As some resin raw material for R1 layer, a commercially available resin (Sealer PT4274 manufactured by Mitsui-DuPont Polychemical Co., Ltd.) that had been pelletized in advance in a state in which modified polyolefin resin with group derived from carboxylic acid was dispersed in polyester resin was used as it was.

As a metal sheet, as in Example 7, a TFS with a thickness of 0.18 mm for thin-wall deep drawn can and 0.23 mm for DI can, which had a degree of temper of DR9, metallic chromium layer of 80 mg/m$^2$, and chromium oxide layer of 15 mg/m$^2$ (metallic chromium conversion), was used, by which a both-side laminated metal sheet was obtained by a method in which the raw material resin pellet for R1 layer was inserted in a one-axis extruding machine, modified polyolefin, which was a resin raw material for R2 layer, was inserted in a separate extruding machine in the case of two layers, each of molten resins was introduced into a multi-manifold type T die and extruded in two layers while the film thickness of R1 and R2 layers was controlled by the discharge amount of molten resin from the extruding machine, molten resin was directly extruded onto one surface of the metal sheet heated to 230° C. in advance, the extruded resin was once cooled while being held adherently between two rolls, and immediately after the resin was laminated on the opposite surface in the same manner, the resin laminated metal sheet was cooled rapidly in water.

Also, in the case of three-layer construction having R0 layer, a both-side laminated metal sheet was obtained by a method in which polyester resin, which was a resin raw material for R0 layer, was inserted in a separate one-axis extruding machine, each of molten resins was introduced into a multi-manifold type T die and extruded in three layers while the film thickness of R0, R1 and R2 layers was controlled by the discharge amount of molten resin from the extruding machine, molten resin was directly extruded onto one surface of the metal sheet heated to 230° C. in advance, the extruded resin was once cooled while being held adherently between two rolls, and immediately after the resin was laminated on the opposite surface in the same manner, the resin laminated metal sheet was cooled rapidly in water. The lip opening width of T die was adjusted so that the thickness of resin film was as given in Tables 32 to 34. The type of sample resin and the resin melting temperature at the extrusion laminating time are given in Tables 32 and 37. The used polyester resin and modified polyolefin resin with group derived from carboxylic acid are the same as those used in Example 7.

All of the grain diameter of modified polyolefin resin dispersed in resin film, various temperatures in the table, and the method for measuring the plane orientation coefficient of resin laminated metal sheet are the same as those in Example 7. As in Example 7, a thin-wall deep drawn can or a DI can was manufactured from the laminated metal sheet obtained as described above, and the can was subjected to straightening heat treatment to manufacture a sample can. The formability, impact resistance, adhesion, and flavor property of film of the manufactured can body were investigated as in Example 7.

The investigation results are given in Tables 35 and 37.

From Tables 32 to 37, the following facts are found for either can type.

Invention examples 98 to 101 are resin laminated steel sheets in which R1 layer is a mixed resin layer in which modified polyolefin resin specified in the present invention is dispersed in various types of polyester resins and a modified polyolefin resin layer specified in the present invention is also used in R2 layer, and exhibit high formability, impact resistance, adhesion, and flavor property. Among these, invention example 100 using adipic acid copolymerized polyethylene terephthalate resin has high performance as a whole, but has a tendency toward low adhesion after heating and flavor property because of slightly low melting point of polyester resin and slightly low barrier property. Also, invention example 137 of resin laminated steel sheet manufactured from a commercially available resin in which modified polyolefin resin is dispersed in polyester resin similarly exhibits high performance. On the other hand, comparative examples 39 to 42 are examples of resin laminated steel sheets in which modified polyolefin resin specified in the present invention is not contained in polyester resin in which polyester type is changed variously, and especially have low levels of formability and impact resistance.

Invention examples 101 to 107 are examples of resin laminated steel sheets using a mixed resin in which various types of modified polyolefin resins specified in the present invention are dispersed in polyester resin, and exhibit high formability, impact resistance, adhesion, and flavor property. In particular, invention examples 101 and 103 to 105 using modified polyolefin resin containing a proper amount of functional group derived from carboxylic acid and having a glass-transition temperature of –30° C. or lower have excellent formability, impact resistance, and adhesion. On the other hand, comparative example 43 is an example using, as R1 layer, a mixed resin in which polyolefin resin containing no functional group derived from carboxylic acid is dispersed in polyester resin, and has greatly deteriorated formability and impact resistance.

Invention examples 108 to 115 are resin laminated steel sheets in which the blending ratio and dispersion state of modified polyolefin resin dispersed in polyester resin of R1 mixed resin layer are changed variously in the range of the present invention, and exhibit high formability, impact resistance, and adhesion. In particular, invention examples 109, 111 and 112 containing a proper amount of dispersed modified polyolefin resin and having a proper number of grains per a fixed volume have excellent formability, impact resistance, adhesion, and flavor property.

On the other hand, comparative examples 44 to 47 are examples in which the blending ratio of modified polyolefin resin in polyester resin of R1 mixed resin layer does not meet the requirement of the present invention, and have greatly deteriorated formability or impact resistance. Comparative example 44 containing a small amount of dispersed modified polyolefin resin and comparative example 47 containing a large amount of modified polyolefin resin have greatly deteriorated formability and impact resistance.

Invention examples 116 to 122 are examples in which the thickness of R1 layer and R2 layer is changed in the range specified in the present invention, and exhibit high formability, impact resistance, adhesion, and flavor property.

Among these, invention examples 117, 118 and 120 in which the thickness ratio R1/R2 of R1 layer to R2 layer is in the range of 5 to 10 and the thickness of R1 layer is in the range of 15 to 25 μm have excellent formability, impact resistance, adhesion, and flavor property. Also, invention example 143 is an example in which the thickness ratio R1/R2 of R1 layer to R2 layer is lower than the proper range of the present invention, and has slightly deteriorated mechanical properties of resin and adhesion to a substrate metal sheet as compared with invention examples 116 to 122. On the other hand, invention example 144 is an example in which the ratio R1/R2 is higher than the proper range of the present invention, and has slightly deteriorated adhesion to a substrate metal sheet as compared with invention examples 116 to 122.

Invention examples 123 to 128 are resin laminated steel sheets using various types of modified polyolefin resins specified in the present invention as R2 layer, and exhibit high formability, impact resistance, adhesion, and flavor property. In particular, invention examples 124 to 126 using modified polyolefin resin containing a proper amount of functional group derived from carboxylic acid and having a glass-transition temperature of −30° C. or lower have excellent formability, impact resistance, adhesion, and flavor property.

Invention examples 129 to 131 are resin laminated steel sheets in which a lubricant, free radical inhibitor, and compatibilizing agent are mixed, respectively, in a mixed resin of modified polyolefin resin and polyester resin of the present invention, and exhibit high formability, impact resistance, adhesion, and flavor property. Further, invention examples 129 to 131 also have lubricity, free radical deterioration resistance, and compatibility depending on the function of added additive, and in particular, invention example 131 containing a compatibilizing agent exhibits excellent low-temperature impact resistance.

Invention examples 132 to 136 are resin laminated steel sheets in which titanium dioxide pigment is mixed with the resin layer of the present invention, and exhibit high formability, impact resistance, adhesion, and flavor property, and also provide a white uniform color tone. However, invention example 132 in which the added amount of pigment is smaller than a desired range has slightly insufficient opacifying property of color tone. On the other hand, invention example 136 in which the added amount of pigment is larger than a desired range has slightly deteriorated formability.

Invention examples 138 to 142 are steel sheets on which three-layer resin in which a polyester resin layer containing no olefin (R0 layer) is further provided on R1 layer is laminated, have very high formability, impact resistance, adhesion, and flavor property. In particular, invention examples 138, 139 and 142 using, as R0 layer, a polyester resin layer with a proper thickness that consists of polyethylene terephthalate or isophthalic acid copolymerized polyethylene terephthalate specified in the present invention have excellent low-temperature impact resistance and flavor property.

Invention examples 145 and 146 are steel sheets on which three-layer resin in which a polyester resin layer containing no olefin (R0 layer) is further provided on R1 layer is laminated, and have deteriorated adhesion as compared with invention examples 138 to 142 because the thickness ratio R1/R2 of R1 layer to R2 layer deviates from the proper range of the present invention.

TABLE 32

| | R0 layer | | R1 layer | | | | | |
|---|---|---|---|---|---|---|---|---|
| | | | Polyester resin | | | Polyolefin resin | | |
| Sample film | Polyester resin type | Resin layer thickness (μm) | Resin type | Melting point (° C.) | Additive | Resin type | Weight percentage of group derived from carboxylic acid (wt %) | Tg (° C.) | Blending ratio in entire resin (wt %) |
| Inventive example 98 | | | PET | 255 | None | EM4 | 8 | <−30 | 15 |
| Inventive example 99 | | | PET/PBT | 235 | None | EM4 | 8 | <−30 | 15 |
| Inventive example 100 | | | PET/AD | 220 | None | EM4 | 8 | <−30 | 15 |
| Inventive example 101 | | | PET/I | 230 | None | EM4 | 8 | <−30 | 15 |
| Inventive example 102 | | | PET/I | 230 | None | EM1 | 21 | <−30 | 15 |
| Inventive example 103 | | | PET/I | 230 | None | EM2 | 18 | <−30 | 15 |
| Inventive example 104 | | | PET/I | 230 | None | EM5 | 7 | <−30 | 15 |
| Inventive example 105 | | | PET/I | 230 | None | EM6 | 5 | <−30 | 15 |
| Inventive example 106 | | | PET/I | 230 | None | EM7 | 1 | <−30 | 15 |
| Inventive example 107 | | | PET/I | 230 | None | EM8 | 6 | 20 | 15 |
| Inventive example 108 | | | PET/I | 230 | None | EM3 | 11 | <−30 | 5 |
| Inventive example 109 | | | PET/I | 230 | None | EM3 | 11 | <−30 | 5 |

TABLE 32-continued

| | | | | | | | |
|---|---|---|---|---|---|---|---|
| Inventive example 110 | PET/I | 230 | None | EM3 | 11 | <−30 | 10 |
| Inventive example 111 | PET/I | 230 | None | EM3 | 11 | <−30 | 10 |
| Inventive example 112 | PET/I | 230 | None | EM3 | 11 | <−30 | 15 |
| Inventive example 113 | PET/I | 230 | None | EM3 | 11 | <−30 | 15 |
| Inventive example 114 | PET/I | 230 | None | EM3 | 11 | <−30 | 20 |
| Inventive example 115 | PET/I | 230 | None | EM3 | 11 | <−30 | 28 |
| Inventive example 116 | PET/I | 230 | None | EM6 | 5 | <−30 | 15 |
| Inventive example 117 | PET/I | 230 | None | EM6 | 5 | <−30 | 15 |
| Inventive example 118 | PET/I | 230 | None | EM6 | 5 | <−30 | 15 |
| Inventive example 119 | PET/I | 230 | None | EM6 | 5 | <−30 | 15 |
| Inventive example 120 | PET/I | 230 | None | EM6 | 5 | <−30 | 15 |
| Inventive example 121 | PET/I | 230 | None | EM6 | 5 | <−30 | 15 |
| Inventive example 122 | PET/I | 230 | None | EM6 | 5 | <−30 | 15 |

| | R1 layer Polyolefin resin | | | R2 layer Polyolefin resin | | | | |
|---|---|---|---|---|---|---|---|---|
| Sample film | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (° C.) | Resin layer thickness (μm) | Melting temp. of R1 layer resin at extrusion laminating time (° C.) |
| Inventive example 98 | 14 | 2500 | 22 | EM6 | 21 | <−30 | 4 | 285 |
| Inventive example 99 | 14 | 2500 | 22 | EM6 | 18 | <−30 | 4 | 265 |
| Inventive example 100 | 14 | 3000 | 22 | EM6 | 8 | <−30 | 4 | 250 |
| Inventive example 101 | 14 | 2500 | 22 | EM6 | 7 | <−30 | 4 | 260 |
| Inventive example 102 | 16 | 50 | 22 | EM6 | 1 | <−30 | 4 | 260 |
| Inventive example 103 | 15 | 1000 | 22 | EM6 | 6 | 20 | 4 | 260 |
| Inventive example 104 | 14 | 2500 | 22 | EM6 | 5 | <−30 | 4 | 260 |
| Inventive example 105 | 14 | 2500 | 22 | EM6 | 5 | <−30 | 4 | 260 |
| Inventive example 106 | 4 | 40 | 22 | EM6 | 5 | <−30 | 4 | 260 |
| Inventive example 107 | 14 | 2500 | 22 | EM6 | 5 | <−30 | 4 | 260 |
| Inventive example 108 | 4 | 4 | 22 | EM6 | 5 | <−30 | 4 | 260 |
| Inventive example 109 | 8 | 100 | 22 | EM6 | 5 | <−30 | 4 | 260 |
| Inventive example 110 | 10 | 50 | 22 | EM6 | 5 | <−30 | 4 | 260 |
| Inventive example 111 | 12 | 500 | 22 | EM6 | 5 | <−30 | 4 | 260 |
| Inventive example 112 | 18 | 800 | 22 | EM6 | 5 | <−30 | 4 | 260 |
| Inventive example 113 | 20 | 22000 | 22 | EM6 | 5 | <−30 | 4 | 260 |
| Inventive example 114 | 24 | 250000 | 22 | EM6 | 5 | <−30 | 4 | 260 |
| Inventive example 115 | 22 | 10000 | 22 | EM6 | 5 | <−30 | 4 | 260 |
| Inventive example 116 | 14 | 2500 | 10 | EM6 | 5 | <−30 | 1 | 260 |

TABLE 32-continued

| | | | | | | | | |
|---|---|---|---|---|---|---|---|---|
| Inventive example 117 | 14 | 2500 | 15 | EM6 | 5 | <−30 | 3 | 260 |
| Inventive example 118 | 14 | 2500 | 20 | EM6 | 5 | <−30 | 3 | 260 |
| Inventive example 119 | 14 | 2500 | 20 | EM6 | 5 | <−30 | 10 | 260 |
| Inventive example 120 | 14 | 2500 | 25 | EM6 | 5 | <−30 | 3 | 260 |
| Inventive example 121 | 14 | 2500 | 35 | EM6 | 5 | <−30 | 5 | 260 |
| Inventive example 122 | 14 | 2500 | 40 | EM6 | 5 | <−30 | 6 | 260 |

TABLE 33

| | R0 layer | | R1 layer | | | | | |
|---|---|---|---|---|---|---|---|---|
| | | | Polyester resin | | | Polyolefin resin | | |
| Sample film | Polyester resin type | Resin layer thickness (μm) | Resin type | Melting point (° C.) | Additive | Resin type | Weight percentage of group derived from carboxylic acid (wt %) | Tg (° C.) | Blending ratio in entire resin (wt %) |
| Inventive example 123 | | | PET | 230 | None | EM6 | 5 | <−30 | 15 |
| Inventive example 124 | | | PET/I | 230 | None | EM6 | 5 | <−30 | 15 |
| Inventive example 125 | | | PET/I | 230 | None | EM6 | 5 | <−30 | 15 |
| Inventive example 126 | | | PET/I | 230 | None | EM6 | 5 | <−30 | 15 |
| Inventive example 127 | | | PET/I | 230 | None | EM6 | 5 | <−30 | 15 |
| Inventive example 128 | | | PET/I | 230 | None | EM6 | 5 | <−30 | 15 |
| Inventive example 129 | | | PET/I | 230 | *2) 0.3 wt % | EM3 | 11 | <−30 | 15 |
| Inventive example 130 | | | PET/I | 230 | *3) 0.1 wt % | EM3 | 11 | <−30 | 15 |
| Inventive example 131 | | | PET/I | 230 | *4) 3 wt % | EM3 | 11 | <−30 | 15 |
| Inventive example 132 | | | PET/I | 230 | None | EM5 | 7 | <−30 | 15 |
| Inventive example 133 | | | PET/I | 230 | None | EM5 | 7 | <−30 | 15 |
| Inventive example 134 | | | PET/I | 230 | None | EM5 | 7 | <−30 | 15 |
| Inventive example 135 | | | PET/I | 230 | None | EM5 | 7 | <−30 | 15 |
| Inventive example 136 | | | PET/I | 230 | None | EM5 | 7 | <−30 | 15 |
| Inventive example 137 | | | PET (PT 4274) | 255 | None | | 15 | <−30 | 15 |
| Inventive example 138 | PET | 8 | PET/I | 230 | None | EM6 | 5 | <−30 | 15 |
| Inventive example 139 | PET/I | 4 | PET/I | 230 | None | EM6 | 5 | <−30 | 15 |
| Inventive example 140 | PET/PBT | 4 | PET/I | 230 | None | EM6 | 5 | <−30 | 15 |
| Inventive example 141 | PET/AD | 4 | PET/I | 230 | None | EM6 | 5 | <−30 | 15 |
| Inventive example 142 | PET | 4 | PET (PT 4274) | 255 | None | | 15 | <−30 | 15 |

TABLE 33-continued

| | R1 layer | | | R2 layer Polyolefin resin | | | | |
|---|---|---|---|---|---|---|---|---|
| | Polyolefin resin | | | | | | | |
| Sample film | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (° C.) | Resin layer thickness (μm) | Melting temp. of R1 layer resin at extrusion laminating time (° C.) |
| Inventive example 123 | 14 | 2500 | 22 | EM1 | 21 | <−30 | 4 | 260 |
| Inventive example 124 | 14 | 2500 | 22 | EM2 | 18 | <−30 | 4 | 260 |
| Inventive example 125 | 14 | 2500 | 22 | EM4 | 8 | <−30 | 4 | 260 |
| Inventive example 126 | 14 | 2500 | 22 | EM5 | 7 | <−30 | 4 | 260 |
| Inventive example 127 | 14 | 2500 | 22 | EM7 | 1 | <−30 | 4 | 260 |
| Inventive example 128 | 14 | 2500 | 22 | EM8 | 6 | 20 | 4 | 260 |
| Inventive example 129 | 14 | 2500 | 22 | EM6 | 5 | <−30 | 4 | 260 |
| Inventive example 130 | 14 | 2500 | 22 | EM6 | 5 | <−30 | 4 | 260 |
| Inventive example 131 | 14 | 2500 | 22 | EM6 | 5 | <−30 | 4 | 260 |
| Inventive example 132 | 14 | 2500 | 22 | EM6 | 5 | <−30 | 4 | 260 |
| Inventive example 133 | 14 | 2500 | 22 | EM6 | 5 | <−30 | 4 | 260 |
| Inventive example 134 | 14 | 2500 | 22 | EM6 | 5 | <−30 | 4 | 260 |
| Inventive example 135 | 14 | 2500 | 22 | EM6 | 5 | <−30 | 4 | 260 |
| Inventive example 136 | 14 | 2500 | 22 | EM6 | 5 | <−30 | 4 | 260 |
| Inventive example 137 | 17 | 2500 | 25 | EM6 | 5 | <−30 | 3 | 285 |
| Inventive example 138 | 14 | 2500 | 22 | EM6 | 5 | <−30 | 4 | 260 |
| Inventive example 139 | 14 | 2500 | 22 | EM6 | 5 | <−30 | 4 | 260 |
| Inventive example 140 | 14 | 2500 | 22 | EM6 | 5 | <−30 | 4 | 260 |
| Inventive example 141 | 14 | 2500 | 22 | EM6 | 5 | <−30 | 4 | 260 |
| Inventive example 142 | 17 | 2500 | 25 | EM6 | 5 | <−30 | 3 | 285 |

*2) Silicone of lubricant is added by 3 weight part to 100 weight part of mixed resin.
*3) Tetrakis-[methylene (3,5-di-t-butyl-4-hydroxyhydrocinnamate)] methane of free radical inhibitor is added by 0.1 weight part to 100 weight part of mixed resin.
*4) Bond First 20B (manufactured by Sumitomo Chemical Co., Ltd.) of compatibilizing agent is added by 3 weight part to 100 weight part of mixed resin.

TABLE 34

| | R0 layer | | | | | R1 layer | | | |
|---|---|---|---|---|---|---|---|---|---|
| | | | Polyester resin | | | Polyolefin resin | | | |
| Sample film | Polyester resin type | Resin layer thickness (μm) | Resin type | Melting point (° C.) | Additive | Resin type | Weight percentage of group derived from carboxylic acid (wt %) | Tg (° C.) | Blending ratio in entire resin (wt %) |
| Comparative example 39 | | | PET | 255 | None | None | — | — | 0 |

TABLE 34-continued

| Sample | | | | | | | | | |
|---|---|---|---|---|---|---|---|---|---|
| Comparative example 40 | | | PET/PBT | 235 | None | None | — | — | 0 |
| Comparative example 41 | | | PET/AD | 220 | None | None | — | — | 0 |
| Comparative example 42 | | | PET/I | 230 | None | None | — | — | 0 |
| Comparative example 43 | | | PET/I | 230 | None | EPR | 0 | <−30 | 15 |
| Comparative example 44 | | | PET/I | 230 | None | EM3 | 11 | <−30 | 2 |
| Comparative example 45 | | | PET/I | 230 | None | EM3 | 11 | <−30 | 2 |
| Comparative example 46 | | | PET/I | 230 | None | EM3 | 11 | <−30 | 35 |
| Comparative example 47 | | | PET/I | 230 | None | EM3 | 11 | <−30 | 35 |
| Comparative example 48 | | | PET/I | 230 | None | EM4 | 8 | <−30 | 15 |
| Comparative example 49 | | | PET (PT 4274) | 255 | None | | 15 | <−30 | 15 |
| Comparative example 143 | | | PET/I | 230 | None | EM4 | 8 | <−30 | 15 |
| Comparative example 144 | | | PET/I | 230 | None | EM4 | 8 | <−30 | 15 |
| Comparative example 50 | PET | 4 | PET/I | 230 | None | EM4 | 8 | <−30 | 15 |
| Comparative example 51 | PET | 4 | PET (PT 4274) | 255 | None | | 15 | <−30 | 15 |
| Inventive example 145 | PET | 4 | PET/I | 230 | None | EM4 | 8 | <−30 | 15 |
| Inventive example 146 | PET | 4 | PET/I | 230 | None | EM4 | 8 | <−30 | 15 |

| | R1 layer | | | R2 layer Polyolefin resin | | | | |
|---|---|---|---|---|---|---|---|---|
| | Polyolefin resin | | | | | | | |
| Sample film | Volume percentage of grains with diameter of 0.1 to 5 μm (vol %) | Number of grains with diameter of 0.1 to 5 μm in cube with one side of 10 μm (grains) | Film thickness (μm) | Resin type | Weight percentage of group derived from carboxylic acid (wt %) | Tg (° C.) | Resin layer thickness (μm) | Melting temp. of R1 layer resin at extrusion laminating time (° C.) |
| Comparative example 39 | 0 | 0 | 22 | EM6 | 5 | <−30 | 4 | 285 |
| Comparative example 40 | 0 | 0 | 22 | EM6 | 5 | <−30 | 4 | 265 |
| Comparative example 41 | 0 | 0 | 22 | EM6 | 5 | <−30 | 4 | 250 |
| Comparative example 42 | 0 | 0 | 22 | EM6 | 5 | <−30 | 4 | 260 |
| Comparative example 43 | 1 | 4 | 22 | EM6 | 5 | <−30 | 4 | 260 |
| Comparative example 44 | 3 | 5 | 22 | EM6 | 5 | <−30 | 4 | 260 |
| Comparative example 45 | 3 | 50 | 22 | EM6 | 5 | <−30 | 4 | 260 |
| Comparative example 46 | 30 | 20000 | 22 | EM6 | 5 | <−30 | 4 | 260 |
| Comparative example 47 | 30 | 135000 | 22 | EM6 | 5 | <−30 | 4 | 260 |
| Comparative example 48 | 15 | 2500 | 22 | None | — | — | — | 260 |
| Comparative example 49 | 17 | 2500 | 25 | None | — | — | — | 285 |
| Comparative example 143 | 15 | 2500 | 10 | EM6 | 5 | <−30 | 12 | 260 |
| Comparative example 144 | 15 | 2500 | 32 | EM6 | 5 | <−30 | 3 | 260 |
| Comparative example 50 | 15 | 2500 | 22 | None | — | — | — | 260 |
| Comparative example 51 | 17 | 2500 | 25 | None | — | — | — | 285 |

TABLE 34-continued

| | | | | | | | | |
|---|---|---|---|---|---|---|---|---|
| Inventive example 145 | 15 | 2500 | 10 | EM6 | 5 | <−30 | 12 | 260 |
| Inventive example 146 | 15 | 2500 | 32 | EM6 | 5 | <−30 | 3 | 260 |

TABLE 35

| | Entire resin layer | | | | Investigation result Thin-wall deep drawn can | | | |
|---|---|---|---|---|---|---|---|---|
| | Total resin | Thickness ratio of R1 layer to R2 layer | Pigment | | | Impact resistance | Impact resistance | Adhesion |
| Sample film | thickness (μm) | R1/R2 | Type | Content (wt %) *1) | Formability | (room temp.) | (low temp.) | after forming |
| Invention example 98 | 26 | 5.5 | None | 0 | ◎ | ◎ | ◎◎◎ | ◎ |
| Invention example 99 | 26 | 5.5 | None | 0 | ◎ | ◎ | ◎◎◎ | ◎ |
| Invention example 100 | 26 | 5.5 | None | 0 | ◎ | ◎ | ◎◎◎ | ◎ |
| Invention example 101 | 26 | 5.5 | None | 0 | ◎ | ◎ | ◎◎◎ | ◎ |
| Invention example 102 | 26 | 5.5 | None | 0 | ◎ | ◎ | ◎◎◎ | ◎ |
| Invention example 103 | 26 | 5.5 | None | 0 | ◎ | ◎ | ◎◎◎ | ◎ |
| Invention example 104 | 26 | 5.5 | None | 0 | ◎ | ◎ | ◎◎◎ | ◎ |
| Invention example 105 | 26 | 5.5 | None | 0 | ◎ | ◎ | ◎◎◎ | ◎ |
| Invention example 106 | 26 | 5.5 | None | 0 | ◎ | ◎ | ◎◎◎ | ◎ |
| Invention example 107 | 26 | 5.5 | None | 0 | ◎ | ◎ | ◎◎◎ | ◎ |
| Invention example 108 | 26 | 5.5 | None | 0 | ◎ | ◎ | ◎◎◎ | ◎ |
| Invention example 109 | 26 | 5.5 | None | 0 | ◎ | ◎ | ◎◎◎ | ◎ |
| Invention example 110 | 26 | 5.5 | None | 0 | ◎ | ◎ | ◎◎◎ | ◎ |
| Invention example 111 | 26 | 5.5 | None | 0 | ◎ | ◎ | ◎◎◎ | ◎ |
| Invention example 112 | 26 | 5.5 | None | 0 | ◎ | ◎ | ◎◎◎ | ◎ |
| Invention example 113 | 26 | 5.5 | None | 0 | ◎ | ◎ | ◎◎◎ | ◎ |
| Invention example 114 | 26 | 5.5 | None | 0 | ◎ | ◎ | ◎◎◎ | ◎ |
| Invention example 115 | 26 | 5.5 | None | 0 | ◎ | ◎ | ◎◎◎ | ◎ |
| Invention example 116 | 11 | 10.0 | None | 0 | ◎ | ◎ | ◎◎◎ | ◎ |
| Invention example 117 | 18 | 5.0 | None | 0 | ◎ | ◎ | ◎◎◎ | ◎ |
| Invention example 118 | 23 | 6.7 | None | 0 | ◎ | ◎ | ◎◎◎ | ◎ |
| Invention example 119 | 30 | 2.0 | None | 0 | ◎ | ◎ | ◎◎◎ | ◎ |
| Invention example 120 | 28 | 8.3 | None | 0 | ◎ | ◎ | ◎◎◎ | ◎ |
| Invention example 121 | 40 | 7.0 | None | 0 | ◎ | ◎ | ◎◎◎ | ◎ |
| Invention example 122 | 46 | 6.7 | None | 0 | ◎ | ◎ | ◎◎◎ | ◎ |

TABLE 35-continued

| | Investigation result | | | | | | | |
|---|---|---|---|---|---|---|---|---|
| | Thin-wall deep drawn can | | Drawn and ironed can (DI can) | | | | | |
| Sample film | Adhesion after heating | Flavor property | Formability | Impact resistance (room temp.) | Impact resistance (low temp.) | Adhesion after forming | Adhesion after heating | Flavor Property |
| Invention example 98 | ◎◎ | ◎◎ | ◎ | ◎ | ◎◎◎ | ◎ | ◎◎ | ◎◎ |
| Invention example 99 | ◎◎ | ◎◎ | ◎ | ◎ | ◎◎◎ | ◎ | ◎◎ | ◎◎ |
| Invention example 100 | ◎◎ | ◎◎ | ◎ | ◎ | ◎◎◎ | ◎ | ◎◎ | ◎◎ |
| Invention example 101 | ◎◎ | ◎◎ | ◎ | ◎ | ◎◎◎ | ◎ | ◎◎ | ◎◎ |
| Invention example 102 | ◎◎ | ◎◎ | ◎ | ◎ | ◎◎◎ | ◎ | ◎◎ | ◎◎ |
| Invention example 103 | ◎◎ | ◎◎ | ◎ | ◎ | ◎◎◎ | ◎ | ◎◎ | ◎◎ |
| Invention example 104 | ◎◎ | ◎◎ | ◎ | ◎ | ◎◎◎ | ◎ | ◎◎ | ◎◎ |
| Invention example 105 | ◎◎ | ◎◎ | ◎ | ◎ | ◎◎◎ | ◎ | ◎◎ | ◎◎ |
| Invention example 106 | ◎◎ | ◎◎ | ◎ | ◎ | ◎◎◎ | ◎ | ◎◎ | ◎◎ |
| Invention example 107 | ◎◎ | ◎◎ | ◎ | ◎ | ◎◎◎ | ◎ | ◎◎ | ◎◎ |
| Invention example 108 | ◎◎ | ◎◎ | ◎ | ◎ | ◎◎◎ | ◎ | ◎◎ | ◎◎ |
| Invention example 109 | ◎◎ | ◎◎ | ◎ | ◎ | ◎◎◎ | ◎ | ◎◎ | ◎◎ |
| Invention example 110 | ◎◎ | ◎◎ | ◎ | ◎ | ◎◎◎ | ◎ | ◎◎ | ◎◎ |
| Invention example 111 | ◎◎ | ◎◎ | ◎ | ◎ | ◎◎◎ | ◎ | ◎◎ | ◎◎ |
| Invention example 112 | ◎◎ | ◎◎ | ◎ | ◎ | ◎◎◎ | ◎ | ◎◎ | ◎◎ |
| Invention example 113 | ◎◎ | ◎◎ | ◎ | ◎ | ◎◎◎ | ◎ | ◎◎ | ◎◎ |
| Invention example 114 | ◎◎ | ◎◎ | ◎ | ◎ | ◎◎◎ | ◎ | ◎◎ | ◎◎ |
| Invention example 115 | ◎◎ | ◎◎ | ◎ | ◎ | ◎◎◎ | ◎ | ◎◎ | ◎◎ |
| Invention example 116 | ◎◎ | ◎◎ | ◎ | ◎ | ◎◎◎ | ◎ | ◎◎ | ◎◎ |
| Invention example 117 | ◎◎ | ◎◎ | ◎ | ◎ | ◎◎◎ | ◎ | ◎◎ | ◎◎ |
| Invention example 118 | ◎◎ | ◎◎ | ◎ | ◎ | ◎◎◎ | ◎ | ◎◎ | ◎◎ |
| Invention example 119 | ◎◎ | ◎◎ | ◎ | ◎ | ◎◎◎ | ◎ | ◎◎ | ◎◎ |
| Invention example 120 | ◎◎ | ◎◎ | ◎ | ◎ | ◎◎◎ | ◎ | ◎◎ | ◎◎ |
| Invention example 121 | ◎◎ | ◎◎ | ◎ | ◎ | ◎◎◎ | ◎ | ◎◎ | ◎◎ |
| Invention example 122 | ◎◎ | ◎◎ | ◎ | ◎ | ◎◎◎ | ◎ | ◎◎ | ◎◎ |

TABLE 36

| | Entire resin layer | | | | Investigation result Thin-wall deep drawn can | | | |
|---|---|---|---|---|---|---|---|---|
| | Total resin | Thickness ratio of R1 layer to R2 layer | Pigment | | | Impact resistance | Impact resistance | Adhesion |
| Sample film | thickness (μm) | R1/R2 | Type | Content (wt %) *1) | Formability | (room temp.) | (low temp.) | after forming |
| Invention example 123 | 26 | 5.5 | None | 0 | ◎ | ◎ | ◎◎◎ | ◎ |

TABLE 36-continued

| | | | | | | | | |
|---|---|---|---|---|---|---|---|---|
| Invention example 124 | 26 | 5.5 | None | 0 | ◎ | ◎ | ◎◎◎ | ◎ |
| Invention example 125 | 26 | 5.5 | None | 0 | ◎ | ◎ | ◎◎◎ | ◎ |
| Invention example 126 | 26 | 5.5 | None | 0 | ◎ | ◎ | ◎◎◎ | ◎ |
| Invention example 127 | 26 | 5.5 | None | 0 | ◎ | ◎ | ◎◎◎ | ◎ |
| Invention example 128 | 26 | 5.5 | None | 0 | ◎ | ◎ | ◎◎◎ | ◎ |
| Invention example 129 | 26 | 5.5 | None | 0 | ◎ | ◎ | ◎◎◎ | ◎ |
| Invention example 130 | 26 | 5.5 | None | 0 | ◎ | ◎ | ◎◎◎ | ◎ |
| Invention example 131 | 26 | 5.5 | None | 0 | ◎ | ◎ | ◎◎◎ | ◎ |
| Invention example 132 | 26 | 5.5 | TiO$_2$ | 3 | ◎ | ◎ | ◎◎◎ | ◎ |
| Invention example 133 | 26 | 5.5 | TiO$_2$ | 7 | ◎ | ◎ | ◎◎◎ | ◎ |
| Invention example 134 | 26 | 5.5 | TiO$_2$ | 15 | ◎ | ◎ | ◎◎◎ | ◎ |
| Invention example 135 | 26 | 5.5 | TiO$_2$ | 30 | ◎ | ◎ | ◎◎◎ | ◎ |
| Invention example 136 | 26 | 5.5 | TiO$_2$ | 50 | ◎ | ◎ | ◎◎◎ | ◎ |
| Invention example 137 | 28 | 8.3 | None | 0 | ◎ | ◎ | ◎◎◎ | ◎ |
| Invention example 138 | 26 | 5.5 | None | 0 | ◎ | ◎ | ◎◎◎ | ◎ |
| Invention example 139 | 26 | 5.5 | None | 0 | ◎ | ◎ | ◎◎◎ | ◎ |
| Invention example 140 | 26 | 5.5 | None | 0 | ◎ | ◎ | ◎◎◎ | ◎ |
| Invention example 141 | 26 | 5.5 | None | 0 | ◎ | ◎ | ◎◎◎ | ◎ |
| Invention example 142 | 28 | 8.3 | None | 0 | ◎ | ◎ | ◎◎◎ | ◎ |

| | Investigation result | | | | | | | |
|---|---|---|---|---|---|---|---|---|
| | Thin-wall deep drawn can | | Drawn and ironed can (DI can) | | | | | |
| Sample film | Adhesion after heating | Flavor property | Formability | Impact resistance (room temp.) | Impact resistance (low temp.) | Adhesion after forming | Adhesion after heating | Flavor Property |
| Invention example 123 | ◎◎ | ◎◎ | ◎ | ◎ | ◎◎◎ | ◎ | ◎◎ | ◎◎ |
| Invention example 124 | ◎◎ | ◎◎ | ◎ | ◎ | ◎◎◎ | ◎ | ◎◎ | ◎◎ |
| Invention example 125 | ◎◎ | ◎◎ | ◎ | ◎ | ◎◎◎ | ◎ | ◎◎ | ◎◎ |
| Invention example 126 | ◎◎ | ◎◎ | ◎ | ◎ | ◎◎◎ | ◎ | ◎◎ | ◎◎ |
| Invention example 127 | ◎◎ | ◎◎ | ◎ | ◎ | ◎◎◎ | ◎ | ◎◎ | ◎◎ |
| Invention example 128 | ◎◎ | ◎◎ | ◎ | ◎ | ◎◎◎ | ◎ | ◎◎ | ◎◎ |
| Invention example 129 | ◎◎ | ◎◎ | ◎ | ◎ | ◎◎◎ | ◎ | ◎◎ | ◎◎ |
| Invention example 130 | ◎◎ | ◎◎ | ◎ | ◎ | ◎◎◎ | ◎ | ◎◎ | ◎◎ |
| Invention example 131 | ◎◎ | ◎◎ | ◎ | ◎ | ◎◎◎ | ◎ | ◎◎ | ◎◎ |
| Invention example 132 | ◎◎ | ◎◎ | ◎ | ◎ | ◎◎◎ | ◎ | ◎◎ | ◎◎ |
| Invention example 133 | ◎◎ | ◎◎ | ◎ | ◎ | ◎◎◎ | ◎ | ◎◎ | ◎◎ |
| Invention example 134 | ◎◎ | ◎◎ | ◎ | ◎ | ◎◎◎ | ◎ | ◎◎ | ◎◎ |
| Invention example 135 | ◎◎ | ◎◎ | ◎ | ◎ | ◎◎◎ | ◎ | ◎◎ | ◎◎ |
| Invention example 136 | ◎◎ | ◎◎ | ◎ | ◎ | ◎◎◎ | ◎ | ◎◎ | ◎◎ |
| Invention example 137 | ◎◎ | ◎◎ | ◎ | ◎ | ◎◎◎ | ◎ | ◎◎ | ◎◎ |

TABLE 36-continued

| | | | | | | | | |
|---|---|---|---|---|---|---|---|---|
| Invention example 138 | ◎◎ | ◎◎ | ◎ | ◎ | ◎◎◎ | ◎ | ◎◎ | ◎◎ |
| Invention example 139 | ◎◎ | ◎◎ | ◎ | ◎ | ◎◎◎ | ◎ | ◎◎ | ◎◎ |
| Invention example 140 | ◎◎ | ◎◎ | ◎ | ◎ | ◎◎◎ | ◎ | ◎◎ | ◎◎ |
| Invention example 141 | ◎◎ | ◎◎ | ◎ | ◎ | ◎◎◎ | ◎ | ◎◎ | ◎◎ |
| Invention example 142 | ◎◎ | ◎◎ | ◎ | ◎ | ◎◎◎ | ◎ | ◎◎ | ◎◎ |

*1) Pigment content means weight percentage (wt %) of pigment with respect to total film amount of entire resin and pigment. Pigment is added to R1 layer.

TABLE 37

| | Entire resin layer | | | | Investigation result Thin-wall deep drawn can | | | |
|---|---|---|---|---|---|---|---|---|
| | Total resin | Thickness ratio of R1 layer to R2 layer | Pigment | | | Impact resistance | Impact resistance | Adhesion |
| Sample film | thickness (μm) | R1/R2 | Type | Content (wt %) *1) | Formability | (room temp.) | (low temp.) | after forming |
| Comparative example 39 | 26 | 5.5 | None | 0 | ◎ | ◎ | ◎◎◎ | ◎ |
| Comparative example 40 | 26 | 5.5 | None | 0 | ◎ | ◎ | ◎◎◎ | ◎ |
| Comparative example 41 | 26 | 5.5 | None | 0 | ◎ | ◎ | ◎◎◎ | ◎ |
| Comparative example 42 | 26 | 5.5 | None | 0 | ◎ | ◎ | ◎◎◎ | ◎ |
| Comparative example 43 | 26 | 5.5 | None | 0 | ◎ | ◎ | ◎◎◎ | ◎ |
| Comparative example 44 | 26 | 5.5 | None | 0 | ◎ | ◎ | ◎◎◎ | ◎ |
| Comparative example 45 | 26 | 5.5 | None | 0 | ◎ | ◎ | ◎◎◎ | ◎ |
| Comparative example 46 | 26 | 5.5 | None | 0 | ◎ | ◎ | ◎◎◎ | ◎ |
| Comparative example 47 | 26 | 5.5 | None | 0 | ◎ | ◎ | ◎◎◎ | ◎ |
| Comparative example 48 | — | — | None | 0 | ◎ | ◎ | ◎◎◎ | ◎ |
| Comparative example 49 | — | — | None | 0 | ◎ | ◎ | ◎◎◎ | ◎ |
| Invention example 143 | 22 | 0.8 | None | 0 | ◎ | ◎ | ◎◎◎ | ◎ |
| Invention example 144 | 35 | 10.7 | None | 0 | ◎ | ◎ | ◎◎◎ | ◎ |
| Comparative example 50 | — | — | None | 0 | ◎ | ◎ | ◎◎◎ | ◎ |
| Comparative example 51 | — | — | None | 0 | ◎ | ◎ | ◎◎◎ | ◎ |
| Invention example 145 | 22 | 0.8 | None | 0 | ◎ | ◎ | ◎◎◎ | ◎ |
| Invention example 146 | 35 | 10.7 | None | 0 | ◎ | ◎ | ◎◎◎ | ◎ |

| | Investigation result | | | | | | | |
|---|---|---|---|---|---|---|---|---|
| | Thin-wall deep drawn can | | Drawn and ironed can (DI can) | | | | | |
| Sample film | Adhesion after heating | Flavor property | Formability | Impact resistance (room temp.) | Impact resistance (low temp.) | Adhesion after forming | Adhesion after heating | Flavor Property |
| Comparative example 39 | ◎◎ | ◎◎ | ◎ | ◎ | ◎◎◎ | ◎ | ◎◎ | ◎◎ |
| Comparative example 40 | ◎◎ | ◎◎ | ◎ | ◎ | ◎◎◎ | ◎ | ◎◎ | ◎◎ |

TABLE 37-continued

| | | | | | | | | |
|---|---|---|---|---|---|---|---|---|
| Comparative example 41 | ⊚⊚ | ⊚⊚ | ⊚ | ⊚ | ⊚⊚⊚ | ⊚ | ⊚⊚ | ⊚⊚ |
| Comparative example 42 | ⊚⊚ | ⊚⊚ | ⊚ | ⊚ | ⊚⊚⊚ | ⊚ | ⊚⊚ | ⊚⊚ |
| Comparative example 43 | ⊚⊚ | ⊚⊚ | ⊚ | ⊚ | ⊚⊚⊚ | ⊚ | ⊚⊚ | ⊚⊚ |
| Comparative example 44 | ⊚⊚ | ⊚⊚ | ⊚ | ⊚ | ⊚⊚⊚ | ⊚ | ⊚⊚ | ⊚⊚ |
| Comparative example 45 | ⊚⊚ | ⊚⊚ | ⊚ | ⊚ | ⊚⊚⊚ | ⊚ | ⊚⊚ | ⊚⊚ |
| Comparative example 46 | ⊚⊚ | ⊚⊚ | ⊚ | ⊚ | ⊚⊚⊚ | ⊚ | ⊚⊚ | ⊚⊚ |
| Comparative example 47 | ⊚⊚ | ⊚⊚ | ⊚ | ⊚ | ⊚⊚⊚ | ⊚ | ⊚⊚ | ⊚⊚ |
| Comparative example 48 | ⊚⊚ | ⊚⊚ | ⊚ | ⊚ | ⊚⊚⊚ | ⊚ | ⊚⊚ | ⊚⊚ |
| Comparative example 49 | ⊚⊚ | ⊚⊚ | ⊚ | ⊚ | ⊚⊚⊚ | ⊚ | ⊚⊚ | ⊚⊚ |
| Invention example 143 | ⊚⊚ | ⊚⊚ | ⊚ | ⊚ | ⊚⊚⊚ | ⊚ | ⊚⊚ | ⊚⊚ |
| Invention example 144 | ⊚⊚ | ⊚⊚ | ⊚ | ⊚ | ⊚⊚⊚ | ⊚ | ⊚⊚ | ⊚⊚ |
| Comparative example 50 | ⊚⊚ | ⊚⊚ | ⊚ | ⊚ | ⊚⊚⊚ | ⊚ | ⊚⊚ | ⊚⊚ |
| Comparative example 51 | ⊚⊚ | ⊚⊚ | ⊚ | ⊚ | ⊚⊚⊚ | ⊚ | ⊚⊚ | ⊚⊚ |
| Invention example 145 | ⊚⊚ | ⊚⊚ | ⊚ | ⊚ | ⊚⊚⊚ | ⊚ | ⊚⊚ | ⊚⊚ |
| Invention example 146 | ⊚⊚ | ⊚⊚ | ⊚ | ⊚ | ⊚⊚⊚ | ⊚ | ⊚⊚ | ⊚⊚ |

*1) Pigment content means weight percentage (wt %) of pigment with respect to total film amount of entire resin and pigment. Pigment is added to R1 layer.

What is claimed is:

1. A resin film of a two-layer construction comprising:
   (a) a resin layer R1 comprising a non-stretched resin film which consists essentially of a thermoplastic polyester resin containing 3 to 30 percent by weight in a weight fraction in the entire resin of a granular resin with a grain diameter of 0.1 to 5 μm, said granular resin is a modified polyolefin resin containing 2 to 20 percent by weight of a functional group, said functional group being a functional group selected from the group consisting of a carboxylic acid group and a carboxylic acid ester group, and
   (b) a polyester resin layer R0 containing at least one of polyethylene terephthalate and isophthalic acid copolymerized polyethylene terephthalate, as a basic skeleton,
   wherein the resin layer R1 and the resin layer R0 are laminated to each other.

2. The resin film according to claim 1, wherein the resin layer R1 has a thickness of 10 to 50 μm; the resin layer R0 has a thickness of 1 to 10 μm; and a thickness ratio of the resin layer R1 to the resin layer R0 is 2 to 10.

3. The resin film according to claim 1, which further comprises 5 to 40 percent by weight of a pigment.

4. The resin film according to claim 1, wherein said thermoplastic polyester resin is a polyester containing at least one of a polyethylene terephthalate and isophthalic acid copolymerized polyethylene terephthalate, as a basic skeleton.

5. The resin film according to claim 1, wherein the thermoplastic resin contains terephthalic acid and isophthalic acid, which are dicarboxylic acid components constituting the thermoplastic polyester resin, in a molar ratio of 97/3 to 85/15.

6. The resin film according to claim 1, wherein the resin layer R1 has a thickness of 15 to 25 μm and the resin layer R0 has a thickness of 3 to 5 μm.

7. The resin film according to claim 6, wherein the resin layer R0 has an intrinsic viscosity of 0.5 to 1.0 dl/g.

8. The resin film according to claim 1, wherein the resin layer R0 has an intrinsic viscosity of 0.3 to 2.0 dl/g.

9. A resin laminated metal sheet comprising a metal sheet and a resin, wherein at least one surface of the metal sheet is coated with the resin film as set forth in claim 1, so that the resin layer R1 is in contact with the metal sheet.

10. The resin laminated metal sheet according to claim 9, wherein a plane orientation coefficient in a direction parallel to a film surface of the resin film is lower than 0.010.

11. The resin laminated metal sheet according to claim 9, wherein the resin film is formed by extruding two types of resins comprising the resin layer R1 and the resin layer R0, simultaneously from one T die directly on a surface of the metal sheet.

12. The resin laminated metal sheet according to claim 9, wherein the metal sheet comprises iron.

13. A method for manufacturing a resin laminated metal sheet comprising heating a resin constituting the resin layer R1 as set forth in claim 1, and a resin constituting the resin layer R0 as set forth in claim 1, to a temperature in a range of the melting point of the thermoplastic polyester resin of the resin layer R1 plus 10° C. to said melting point plus 50° C. to melt both resin layer R0 and resin layer R1 to form two melted resins, and extrusion laminating the two melted resins in two layers on a surface of a metal sheet.

14. The manufacturing method for a resin laminated metal sheet according to claim 13, wherein the resin constituting the resin layer R1 as set forth in claim 1 and the resin constituting the resin layer R0 as set forth in claim 1 are inserted into separate extruding machines and are melted.

15. The resin film according to claim 1, wherein said functional group is a carboxylic acid group.

16. The resin film according to claim 1, wherein said functional group is a carboxylic acid ester group.

17. The resin film according to claim 1, wherein said modified polyolefin resin is a carboxylic acid modified polyolefin obtained by copolymerization, graft polymerization or block polymerization of a monomer containing a carboxylic acid group or a carboxylic acid ester group.

18. The resin film according to claim 17, wherein said monomer is selected from the group consisting of acrylic acid, methacrylic acid, vinyl acetate, vinyl propionate, maleic acid, maleic anhydride, itaconic acid, and an unsaturated carboxylic acid with 3 to 8 carbon atoms.

19. The resin film according to claim 17, wherein said monomer is monomethylester maleate.

20. The resin film according to claim 17, wherein said monomer is selected from the group consisting of methyl acrylate, methyl methacrylate, ethyl acrylate, ethyl methacrylate, n-propyl acrylate, n-propyl methacrylate, isobutyl acrylate, isobutyl methacrylate, n-butyl acrylate, n-butyl methacrylate, 2-hydroxyethyl carboxylate, 2-hydroxyethyl methacrylate, monomethylester maleate, glycidyl acrylate, glycidyl methacrylate, vinyl acetate, acrylamine and acrylamide.

21. A method for manufacturing a resin film comprising:
(a) inserting a thermoplastic polyester resin containing 3 to 30 percent by weight in a weight fraction in the entire resin of a granular resin with a grain diameter of 0.1 to 5 μm, said granular resin is a modified polyolefin resin containing 2 to 20 percent by weight of a functional group, said functional group being a functional group selected from the group consisting of a carboxylic acid group and a carboxylic acid ester group in an extruding machine as a raw material resin to melt the resin and form a molten resin,
(b) inserting a polyester resin layer R0 containing at least one of polyethylene terephthalate and isophthalic acid copolymerized polyethylene terephthalate, as a basic skeleton, in an extruding machine to melt the polyester resin and form a molten polyester resin, and
(c) forming a film comprising a two-layer construction by extruding the molten resin and the molten polyester resin from one T die.

* * * * *